(12) United States Patent
Shah

(10) Patent No.: US 11,818,461 B2
(45) Date of Patent: Nov. 14, 2023

(54) CONTEXT-CONTROLLED VIDEO QUALITY CAMERA SYSTEM

(71) Applicant: Nishant Shah, Aurora, IL (US)

(72) Inventor: Nishant Shah, Aurora, IL (US)

( * ) Notice: Subject to any disclaimer, the term of this patent is extended or adjusted under 35 U.S.C. 154(b) by 0 days.

(21) Appl. No.: 17/869,008

(22) Filed: Jul. 20, 2022

(65) Prior Publication Data
US 2023/0025009 A1    Jan. 26, 2023

Related U.S. Application Data

(60) Provisional application No. 63/223,592, filed on Jul. 20, 2021.

(51) Int. Cl.
*H04N 23/667* (2023.01)
*H04W 4/021* (2018.01)
*H04N 23/62* (2023.01)

(52) U.S. Cl.
CPC ........... *H04N 23/667* (2023.01); *H04N 23/62* (2023.01); *H04W 4/021* (2013.01)

(58) Field of Classification Search
CPC ........ H04N 5/772; H04N 23/90; H04N 23/62; H04N 23/633; H04N 23/631; H04N 23/667; H04W 4/021; G11B 27/34; G11B 27/031
USPC ...................................... 348/222.1
See application file for complete search history.

(56) References Cited

U.S. PATENT DOCUMENTS

| | | | |
|---|---|---|---|
| 8,274,544 B2 * | 9/2012 | Kurtz | H04N 7/147 348/14.08 |
| 8,442,265 B1 * | 5/2013 | Bosworth | H04N 21/44008 715/733 |
| 8,713,618 B1 | 4/2014 | Kuznetsov | |
| 9,230,602 B2 * | 1/2016 | Jaime | H04N 5/7605 |
| 9,275,140 B2 | 3/2016 | Marraud | |
| 9,436,875 B2 | 9/2016 | Curcio | |
| 9,583,144 B2 | 2/2017 | Ricciardi | |
| 9,721,165 B1 | 8/2017 | Bentley | |

(Continued)

FOREIGN PATENT DOCUMENTS

CN         10565757 b      10/2018
WO      WO2019157977 A1    8/2019

OTHER PUBLICATIONS

Search Report for PCT/US21/14753, dated Apr. 16, 2021.
(Continued)

*Primary Examiner* — Pritham D Prabhakher
(74) *Attorney, Agent, or Firm* — The Law Offices of Konrad Sherinian, LLC

(57) ABSTRACT

A context-controlled video quality camera system running a software application to perform video quality settings actions in response to triggering conditions suggesting a recording context in which particular values of one or more video quality settings are preferred. Triggering conditions include a geolocation of a camera device, a present time, and/or sensed ambient conditions. Video quality settings actions include either automatically adjusting settings to the particular values or prompting a user to select whether to adjust the settings. Rules having triggering conditions and corresponding video quality settings actions can include default rules of the software application. The rules can be updated on the user's own initiative or in response to identified triggering patterns of user activity, either automatically or as selected by a user in response to automatic pro.

4 Claims, 44 Drawing Sheets

(56) References Cited

U.S. PATENT DOCUMENTS

| | | |
|---|---|---|
| 9,767,364 B2 | 9/2017 | Oguchi |
| 10,230,866 B1 | 3/2019 | Townsend |
| 10,408,185 B2* | 9/2019 | Kassai .................. F02D 41/34 |
| 10,462,353 B2 | 10/2019 | Hoshino |
| 10,497,273 B2* | 12/2019 | Chen .................. H04N 21/231 |
| 10,560,749 B2* | 2/2020 | Zhang ................ H04N 21/4666 |
| 10,622,017 B1 | 4/2020 | Kiltsner |
| 10,909,384 B2 | 2/2021 | Matsumoto |
| 10,958,865 B2* | 3/2021 | Kennedy ............ H04N 21/4788 |
| 10,979,761 B2* | 4/2021 | Sekar ............... H04N 21/23418 |
| 10,986,307 B2* | 4/2021 | Rios ........................ H04N 5/44 |
| 11,372,917 B2* | 6/2022 | Zhang ..................... G06N 3/08 |
| 11,449,793 B2* | 9/2022 | Neumann .............. G16H 30/20 |
| 2008/0008458 A1 | 1/2008 | Gudipaty |
| 2008/0225119 A1 | 9/2008 | Murata |
| 2010/0238262 A1* | 9/2010 | Kurtz .................... H04N 7/142 |
| | | 348/14.01 |
| 2011/0052155 A1 | 3/2011 | Desmarais |
| 2012/0245958 A1 | 9/2012 | Lawrence |
| 2013/0073970 A1 | 3/2013 | Piantino |
| 2013/0101219 A1 | 4/2013 | Bosworth |
| 2014/0089816 A1 | 3/2014 | DiPersia |
| 2014/0376876 A1 | 12/2014 | Bentley |
| 2015/0087257 A1 | 3/2015 | Balram |
| 2015/0128172 A1 | 5/2015 | Liwerant |
| 2015/0262616 A1 | 9/2015 | Jaime et al. |
| 2015/0324636 A1 | 11/2015 | Bentley |
| 2016/0105634 A1 | 4/2016 | Marchese |
| 2016/0225408 A1 | 8/2016 | Khan |
| 2016/0322078 A1 | 11/2016 | Bose |
| 2017/0004139 A1 | 1/2017 | Wong |
| 2017/0019744 A1* | 1/2017 | Matsumoto .......... G06V 10/147 |
| 2017/0060531 A1 | 3/2017 | Abbo |
| 2017/0270930 A1 | 9/2017 | Ozmeral |
| 2017/0300280 A1 | 10/2017 | Tsukuda |
| 2018/0013976 A1* | 1/2018 | Rios ........................ H04N 5/77 |
| 2018/0124306 A1 | 5/2018 | Mikawa |
| 2018/0160031 A1* | 6/2018 | Hoshino ................ H04N 5/783 |
| 2018/0280783 A1 | 10/2018 | Gordon |
| 2018/0293906 A1 | 10/2018 | Chen |
| 2018/0301169 A1* | 10/2018 | Ricciardi ............. G11B 27/036 |
| 2019/0032622 A1 | 1/2019 | Kassai |
| 2019/0045153 A1 | 2/2019 | Kennedy |
| 2019/0174189 A1 | 6/2019 | Zhang |
| 2019/0197187 A1 | 6/2019 | Zhang |
| 2019/0267041 A1* | 8/2019 | Ricciardi ......... H04N 21/23418 |
| 2019/0289359 A1 | 9/2019 | Sekar |
| 2019/0379822 A1 | 12/2019 | Leong |
| 2021/0004715 A1 | 1/2021 | Neumann |

OTHER PUBLICATIONS

Bazarevsky, Mobile Real-time Video Segmentation, Google Research Article, Mar. 1, 2018, located at https://ai.googleblog.com/2018/03/mobile-real-time-video-segmentation.html.

Unknown, Video AI, Google Cloud Article, Unknown Date of Publication, located at https://cloud.google.com/video-intelligence/.

* cited by examiner

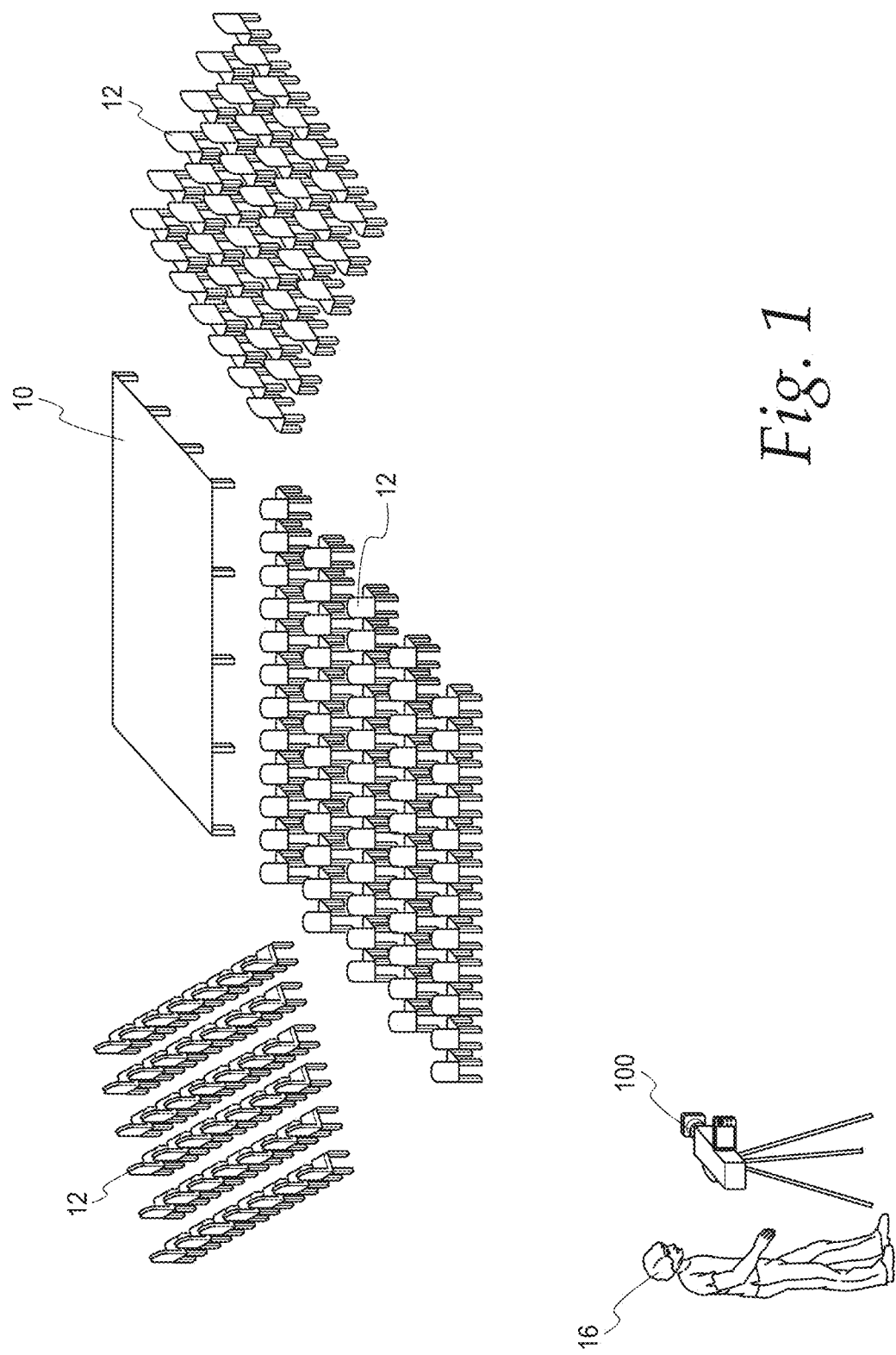

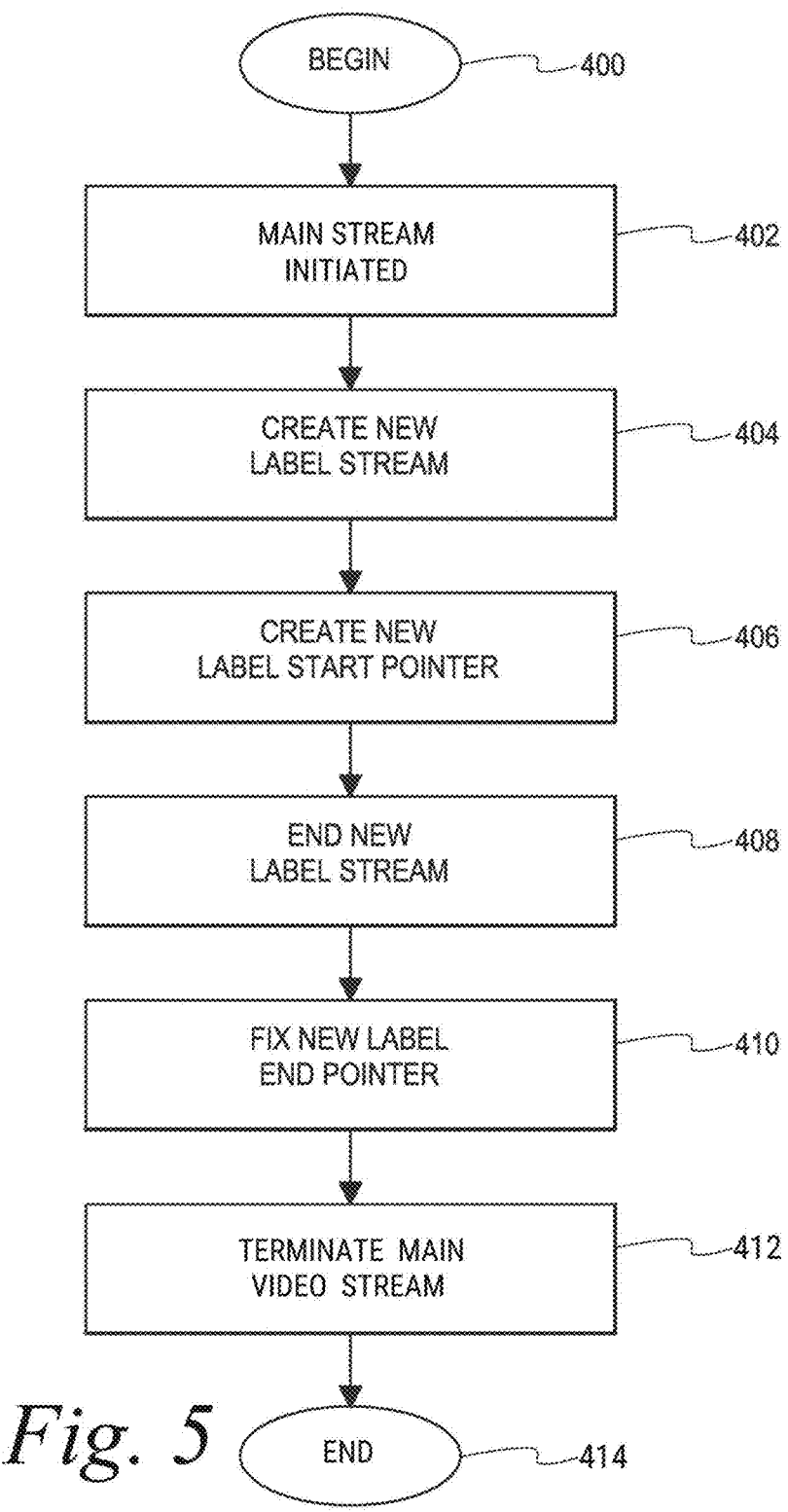

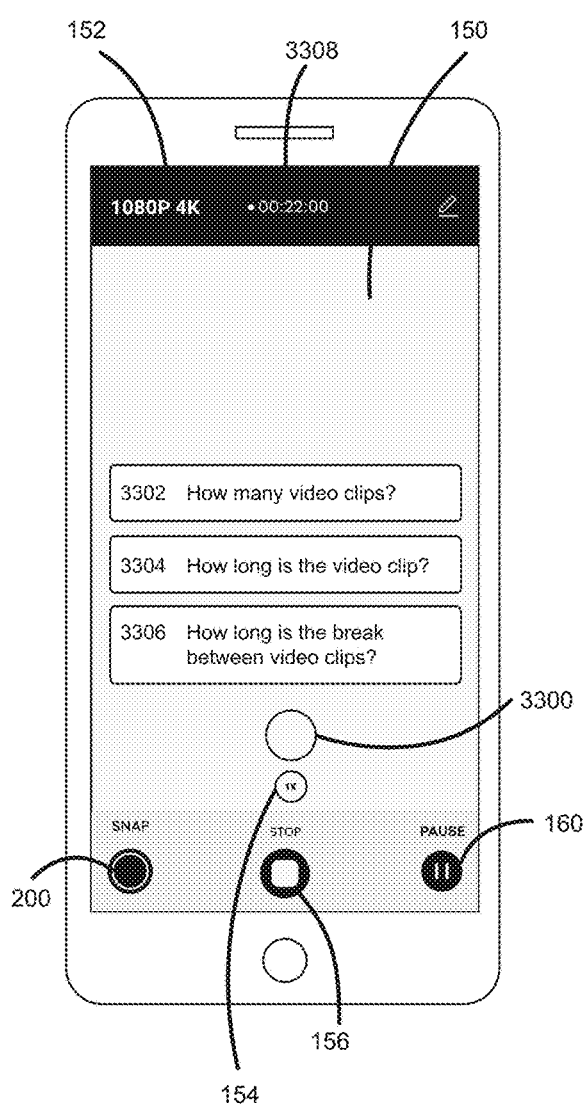 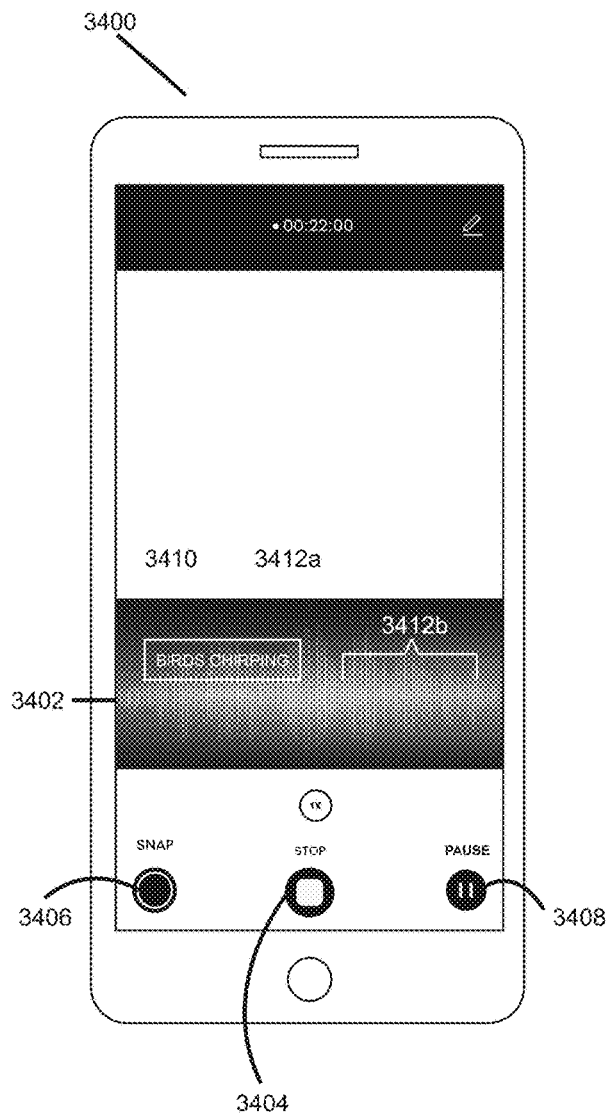
FIG. 33
FIG. 34

Settings
Camera Settings
▷ Auto Start Clip 
✂ Cut Clip & Start next Clip immediately 
Dont S
after Re
> Pause the recording when receiving call or app goes background
> ( Watch Video )
‖ Pause the Recording whenApp goes background 
*Fig. 36*

CONTEXT-CONTROLLED VIDEO QUALITY CAMERA SYSTEM

CROSS-REFERENCE

This application claims the benefit of U.S. provisional application No. 63/223,592, filed Jul. 20, 2021 and entitled SYSTEM AND METHOD FOR VIDEO RECORDING WITH AUTO-PAUSE FUNCTION, which is incorporated herein for all purposes in it entirety.

FIELD OF THE DISCLOSURE

The present disclosure relates to video recording systems, and more particularly, to a video recording system and method for viewing, network sharing, and customizing a video, in which a main stream of video captured on a camera is selectively viewed, segmented into logically spliced-together video clips, and shared on a network during a teleconference. In another aspect, it relates to video camera system that automatically varies video quality settings.

BACKGROUND

Video cameras have become ubiquitous. In particular, every smartphone produced can now record video in at least HD resolution, and many are capable of recording video at 4K resolution or even higher. Video cameras are now frequently used to record important events. For example, parents often will record their children's events, such as athletic contests, concerts, school plays, and other events. People often record other personal events, including weddings, graduations, and vacations, to name a few. Entertainment events, such as sporting events, theater performances, and other events, are also often recorded. Also, video cameras are often now used for public safety purposes. Security cameras are used by both governmental and private entities to secure certain locations, and traffic cameras are now commonly used for both speed and red-light policing. In addition, cameras are sometimes used in operating rooms so that a precise record of surgery can be maintained. Recording the surgery allows any mistakes to be ascertained after the surgery, which simplifies any resulting litigation. Similarly, recording a surgery allows a surgeon to prove that she executed a surgery within the standard of care.

The use of video recordings allows the details of the recordings to be kept forever, as long as sufficient digital storage is available. Given that large volumes of cloud storage are now available at nominal costs, it can be assumed that sufficient digital storage is available to store any video that is taken.

However, network bandwidth is still comparatively expensive in terms of both money and time. In particular, typical high-speed Internet download speeds range between 10 Mbps to 100 Mbps. Given that 4K video recorded at 30 frames per second requires approximately 375 MB of data, a typical high-speed Internet user might spend nearly an hour to download a 10-minute video, and the time to download a two-hour performance would be truly prohibitive. In most cases, however, the person downloading the video is only interested in a small portion of a video. For example, in the case of a school talent competition, a parent downloading the video is likely only interested in their child's performance; accordingly, the parent is likely interested in five minutes of a two-hour performance.

Presently, the only way that a parent could download a video of only their child's performance would be for the videographer or an editor to "slice" the recording of the talent show into several smaller videos using post-processing software. For example, an editor could produce individual videos of each child's performance and label them appropriately in the school's video folder. This process would require the editor to use video editing software to identify natural breaks in the talent show performances (such as when each performer left the stage), and cut the main video file at those breaks using the video editing software. This process is time-consuming and requires the use of a second piece of highly technical software.

Accordingly, a need exists for the simplified creation of videos from a main video based on a specific event. Such an event could include different performances at a talent show, different acts in a play, a period within an athletic competition, changes of a traffic signal for traffic camera, or different phases of operation for an operating room camera.

In addition, presently the only way to append a new video clip to the end of an existing video file is first to record the new video clip to a first new video file that contains only the new video segment, and then to use video editing software to splice together the existing video file with the first new video file, thereby creating a second new combined video file that contains the new video segment appended to the end of the existing video file. The post-recording step of splicing together the first new file with the existing file to create the second new combined video file not only requires additional post-recording work by the user, but also that the user remember to perform the post-recording splicing-together step. The more time passes before a user remembers the need to splice the first new video file to the existing video file, the more likely the user will be to lose track of the name or location of the new video file, the existing video file, or both, thus requiring still more work of tracking down one or both files in order to splice them together.

Accordingly, a need exists for the simplified aggregation of newly recorded video directly to an existing video file, without an intervening step of creating a separate new video file containing only the newly recorded video.

In addition, digital video cameras are used in a number of situations which call for adjusting one or more settings. For example, different video quality settings may be desired for recording a sporting event than for recording a nature scene. In other situations, different settings may be desired depending on how the resulting digital video file will be used. For example, a user may desire maximum preservation of data in a digital video file that the user will subsequently edit using video editing software. In another example, certain settings may be desired when the user will share the resulting digital video file on a particular platform. However, the ubiquity of video cameras has led to there being many more regular users of the technology than may be conversant in or even aware of such settings. Further, even a more proficient video camera user may not remember or have time to adjust settings as desired for a particular situation before starting to record.

Accordingly, a need exists for a video camera that automatically adjusts video quality settings based on context.

OBJECTIVES OF THE DISCLOSURE

It is an objective of the disclosure to provide a video recording system that allows an operator to easily mark one or more slices of a main video recording as comprising separate video streams in real-time.

It is another objective of the disclosure to provide a video recording system that allows a videographer to mark one or more slices of a main video recording as comprising separate video streams in real-time.

It is another objective of the disclosure to provide a video recording system that allows a remote monitor to mark one or more slices of a main video recording as comprising separate video streams in real-time.

It is another objective of the disclosure to provide a smartphone that allows a videographer to mark one or more slices of a main video recording as comprising separate video streams in real-time.

It is another objective of the disclosure to provide a video recorder that allows a videographer to mark one or more slices of a main video recording as comprising separate video streams in real-time.

It is another objective of the disclosure to provide an add-on device for use with a video recorder that allows a videographer to mark one or more slices of a main video recording as comprising separate video streams in real-time.

It is another objective of the disclosure to provide a smartphone that allows a remote monitor to mark one or more slices of a main video recording as comprising separate video streams in real-time.

It is another objective of the disclosure to provide a networked video recorder that allows a remote monitor to mark one or more slices of a main video recording as comprising separate video streams in real-time.

It is another objective of the disclosure to provide a networked add-on device for use with a video recorder that allows a remote monitor to mark one or more slices of a main video recording as comprising separate video streams in real-time.

It is another objective of the disclosure to provide a simple-to-use user interface allowing a user to mark one or more slices of a main video recording as comprising separate video streams in real-time.

It is yet another objective of the disclosure to provide a video recording system that associates and labels a video stream with an event.

Another objective is to securely store the event-labeled video stream in a remote data storage unit for easy access through a network.

It is yet another objective of the disclosure to allow a user to organize video streams by event names associated with different events.

Another objective is to allow a user to associate a main video stream, or slices of the main video stream to an event.

Yet another objective is to allow a user to store the event names of the video streams in a remote data storage unit.

It is yet another objective of the disclosure to allow a user to segregate the events in individual folders in the remote data storage unit.

Another objective is to provide a network that allows for easy access to the event-labeled video streams.

Yet another objective is to provide for remote access to the event-labeled video streams.

It is yet another objective of the disclosure to enable automatic creation of an event based on integration with a user's calendar, social media, and other similar instrumentalities.

Another objective is to allow a user to define events associated with a main video stream that have sub-events associated with spliced together segments of the main video stream.

Yet another objective is to provide a system that includes querying tools to search video streams across events, sub-events, timestamps, and locations.

Yet another objective is to provide a system that automatically produces a folder in the remote data storage unit for an event or sub-event, simultaneous with video production.

Yet another objective is to allow a professional to record an event and make different clips (event/sub-event names) available for download through a network.

It is an objective of the disclosure to provide a video recording system that allows a camera operator, or a system user, to visually interact with multiple network members in a live teleconference.

Yet another objective is to allow a user to label selected sections of the teleconference in real time for easy identification and viewing.

It is another objective of the disclosure to allow a user to selectively view and rewind sections of a video along a video timeline.

Yet another objective is to allow a user to label the re-wound video section for easy identification and viewing.

Yet another objective is to remind a camera operator to begin recording with the camera after a non-recording duration, such as 5-10 seconds, has passed after the software application has opened and no recording is initiated.

It is yet another objective of the disclosure to integrate a voice recognition software and associated modules into the system, so as to enable a system user to utilize voice commands. The commands being operable to, for example, view and edit the video clips; initiate a teleconference; and rewind/advance the video timeline.

Another objective is to set up multiple, selectively viewable video clips of a medical procedure in advance, so that a medical professional can learn and note the steps of the medical procedure prior to performing.

It is yet another objective of the disclosure to provide a video recording system that is operable on electronic cameras and recording devices.

Another objective is to enable the camera operator, or system user, to selectively view, edit, network, and operate a main stream of video, or video clips thereof, in an organized and network-friendly manner.

Yet another objective is to provide a video recording system with a pause control feature to automatically create video clips spanning alternating intervals between successive user activations of a pause control.

Yet another objective is to provide a user-friendly video recording system.

Yet another objective is to provide a video recording system that allows a user to initiate recording of a new video stream so as to cause the new video stream to be appended automatically to an existing video stream of an existing video file.

Yet another objective is to provide a video recording system that automatically determines a context of a video recording that has been initiated and automatically adjusts one or more video recording settings to a value desired for the context.

Yet another objective is to provide a video recording system that allows a user to display export boxes on a digital viewfinder screen while recording, each export box showing a portion of a recording frame that will be exported to a video file with a corresponding aspect ratio.

Yet another objective is to provide a video recording system that inserts a transition clip between successive spliced sections of a main video recording stream when creating a main video file from the main video recording stream.

Other advantages of this disclosure will be clear to a person of ordinary skill in the art. It should be understood, however, that a system, an apparatus or a method could practice the disclosure while not achieving all the enumerated objectives and that the claims define the protected disclosure.

SUMMARY OF THE DISCLOSURE

The present disclosure provides a video recording system and method for labeling networked meetings and video clips from a main stream of video. The video recording system allows a system user to selectively view and label a main video stream or video clips. A rewind control rewinds the main stream of video, and then allows the user to label the selected video clip from a start pointer to an end pointer. The video recording system also allows network members to teleconference while recording a main stream of video. Any of the network members can label selected sections of the teleconference in real time. Further, a recording alert control automatically displays a reminder message to a camera operator after a non-recording duration, such as 5 to 10 seconds, after the software application is opened and stabilized. This feature is useful when a camera operator forgets to activate a record control. A voice control feature enables voice command activation of the controls as well.

Aspects of the present disclosure address one or more of the objectives mentioned above by describing a system and method for creating multiple related video streams out of a single main video stream. This summary is not intended to identify key or critical elements or aspects of the disclosure, nor is it intended to set forth or delineate the scope of the claims of this application for patent. The following summary merely presents some of the concepts of the disclosure in a simplified form as a prelude to the more detailed description provided below.

In some embodiments, the video recording system comprises a body, including a lens. The lens may include a wide-angle lens to capture an entire scene, and a zoom lens to capture a center action of the scene. The features outlined herein; i.e., the ability to create additional streams; are utilized along with the multiple lens system.

An image sensor, such as a CMOS sensor, CCD sensor, or other equivalent image sensor, is disposed within the body and optically coupled to the lens, i.e., light gathered by the lens is directed to the image sensor. The image sensor produces a stream of digital video data that is analyzed and framed by a video processor that is coupled to the image sensor. The video processor writes digital video frame data to a storage device, such as FLASH memory.

The video recording system also includes a processor that is coupled to the storage device and maintains a logical main stream of digital video. The logical main stream includes a start pointer and an end pointer. The start pointer is set to the first location of storage where the video for the particular stream was recorded, and the end pointer is set to the location of storage holding the most recently written frame of digital video data. Also, the video recording system includes an clip control coupled to the processor that, on activation, creates a second logical stream of video. The second logical stream of the video includes a start pointer that is set to the most recent value of the end pointer of the logical main stream of video data.

In an additional embodiment of the disclosed video recording system, the second logical stream of video further comprises a second end pointer, and, when the clip control is activated a second time, the second end pointer is set to the value of the end pointer of the logical main stream at the time that the clip control is activated the second time.

Also, when the clip control is activated a second time, a name can be assigned to the second stream of video. The name can either be automatically generated, using, for example, a date and time index, or the name can be entered manually by a user, or set by some other means, such as utilizing an event or sub-event as set forth herein.

Additional logical streams of video can be created by activating the clip control again.

The clip control can be, for example, a hard button, a touch display on a smartphone, a voice control, or another type of control. In addition, in certain embodiments, the video recording system can be network controlled. In such an embodiment, the video recording system will include a network port and will stream video data to a remote site. It will also receive network commands, including activation of the clip control to create and manage additional streams from the remote site.

The disclosed video recording system can be implemented as, for example, a smartphone, a digital camcorder, or a digital camera.

In some embodiments, a second embodiment of the video recording system and method is configured to associate and label a video stream with an event. The event-labeled video stream, or multiple logically subdivided/split and spliced-together sections of the main video stream (hereinafter termed "spliced [sections of the main video stream]" for short), may then be stored in a remote data storage unit for easy access through a network. Multiple video recording systems and network members can share and access the video streams directly from the remote data storage unit.

In another embodiment, the video recording system is operable to record an event. The event can be a calendar event, a user-generated event, a social media event, or a holiday event, which are all recordable as video or images. The recorded event generates a main video stream. The main video stream, or spliced sections thereof, are labeled with an event name. By associating the video streams with the event, the video streams can be organized and accessed based on events.

The event-organization feature is in addition to labeling the video streams with a name, time stamp, or location, as described above. This allows for event-based organization, name-based organization, time-based organization, and location-based organization of video streams. In this manner, the video recording system allows for selective querying of the video streams across events, labels, time stamps, and locations.

The video recording system includes an event control that serves to label the event with an event name prior to recording. The event control can be, for example, a hard button, a touch display on a smartphone, a voice control, or another type of control. When the event control is activated, a keyboard can appear to allow a user-defined event name to be entered in an event name text box. Once the event name is selected, the done/save button can be pressed to save the event name.

After naming the event, a record control feature of the video recording system is activated to video record the event. The video recording generates a main video stream of the event. In this manner, the main video stream is both associated with the event and is labeled with the event name.

The record control initiates video recording of the event. As described above, the recording can be a physical main stream stored on the video recorder, or a logical main stream that activates a start pointer and an end pointer to delimit the main video stream into multiple labeled video streams. In both cases, the video stream is associated with the event name, and organized based on the event.

The event-labeled video streams can also be labeled with a name, location, or time stamp through use of a stream control feature on the video recording system. When the stream control is first activated, a keyboard appears to allow a stream name to be entered in a label name control, such as, a text box. Once the name is selected, the done/save button can be pressed to save the name for the newly created labeled video stream. The stream control can be activated a second time to mark the end limit of a spliced labeled video stream.

The event-labeled video stream may be stored and segregated by event name in a remote data storage unit that is in communication with a storage device in the video recording system. When the record control is active, the video stream associated with the event automatically transmits to the remote data storage unit for storage. Or the video stream associated with the event can be manually transmitted to the remote data storage unit through activation of a remote storage control feature. The remote storage control can be, for example, a hard button, a touch display on a smartphone, a voice control, or another type of control.

The video streams associated with the event are accessible by multiple video recording systems through a network. The video recording systems communicate with the remote data storage unit, and with each other, through the network. Network members can indicate a video stream and event are associated and provide the event name. Any member of the network can share and access the event-labeled video stream based on the event name. A network administrator can regulate access to the video streams in the data storage unit. This regulation can include recording the event, and selectively making the event-labeled video streams accessible to network members.

A third embodiment of the video recording system and method is configured to create numerous video editing, viewing, network sharing, and customizable functionalities to facilitate camera and video operation by a camera operator or a system user. In essence, the video recording system enables the camera operator, or system user, to selectively view, edit, network, and operate a main stream of video, or video clips thereof, in an organized and network-friendly manner. Voice commands, selective viewing of sections of the video clip, reminder messages, and other intelligent camera functionalities work to create a synergistic video recording and viewing function.

In some embodiments, the video recording system comprises a camera having a body that supports an image sensor. A lens is optically coupled to the image sensor. The image sensor produces a stream of digital video data upon activation of a record command from the camera. A video processor couples to the image sensor. The video processor processes the stream of digital video data and produces digital video frame data. The digital video frame data comprises video-related data, i.e., images, colors, pixels, etc. A storage device couples to the video processor. The storage device is configured to store the digital video frame data for viewing, editing, and networking a main video stream generated therefrom.

In other embodiments, the video recording system comprises a processor that operatively couples to the storage device. The processor is configured to maintain a main stream of video. The main stream of video is generated from the digital video frame data stored in the storage device. In one possible embodiment, the main stream of video comprises a video timeline that is defined by a start pointer and an end pointer. The end pointer is continuously updated to point to the most recent digital video frame data stored in the storage device.

In yet other embodiments, the video recording system comprises a teleconference control. The teleconference control is operatively coupled to the processor. Upon activation, the teleconference control generates streams of digital video data produced by one or more network members. The teleconference control also displays the subsequently generated main stream of video between the network members, so that the teleconference may be viewed, edited, stored, and shared at a later time.

In some embodiments, the video recording system comprises a rewind control that couples to the processor. The rewind control is effective for reviewing previously viewed sections of the main video stream or video clip. Upon activation, the rewind control is adapted to rewind the digital video frame data towards the start pointer of the video timeline.

In yet another embodiment, the video recording system comprises a recording alert control operatively coupled to the processor. After a non-recording duration, the recording alert control displays a reminder message to a camera operator. The reminder message indicates to the camera operator that the camera is not recording. The recording alert control may actuate after the software application is opened, and no recording occurs.

In yet another embodiment of the video recording system, the video recording system comprises a voice control that is operatively coupled to the processor. The voice control also couples to a speech software development module. Upon activation, the voice control is configured to receive a voice signal, such as a verbal command from a system user. Upon receiving the voice signal, the speech software development module parses the voice signal to obtain a voice recognition result. The speech software development module then determines whether the voice recognition result matches one or more operating parameters. The operating parameters comprise commands to control various controls and features of the video recording system.

In yet another embodiment, the video clips comprise a video narrative for a medical procedure. Such video clips enable a medical professional to selectively view the medical procedure video clips; thereby receiving instruction and lesson prior to performing the medical procedure.

In yet another embodiment, the reminder message comprises a statement to a video camera operator to produce the digital video frame data, i.e., activate the recording function.

In yet another embodiment, the non-recording duration is between 5 to 10 seconds.

In yet another embodiment, the network members are disposed remote from one another and are linked by a telecommunications subsystem.

In yet another embodiment, the video recording system further comprises a timer that couples to the storage device. The timer is configured to track the video timeline of the main stream video, and to provide a counting function for the video timeline and rewind control.

In yet another embodiment, the rewind control, on activation, is adapted to rewind the digital video frame data about 5 seconds, towards the start pointer of the video timeline.

In yet another embodiment, the teleconference control is adapted to display the subsequently generated main stream of video between the network members in real time.

In yet another embodiment, the multiple video recording systems communicate with a remote data storage unit, and with each other, through a network.

In yet another embodiment, a video recording system includes a pause control feature to automatically create video clips spanning alternating intervals between successive user activations of a pause control.

In yet another embodiment, a video recording system includes an append video control to record a new video stream to be appended to an existing video stream of an existing video file. When a user has activated the append video control to initiate recording of the new video stream, the system will automatically create a new video file containing the new video stream appended to the existing video stream and/or automatically modify the existing video file by appending the new video stream to the existing video stream.

In yet another embodiment, a video recording system with automatic video quality settings control is adapted and configured to automatically determine when a triggering condition exists for a video quality settings adjustment, and in response to the triggering condition, to adjust or prompt for adjustment one or more settings based on the triggering condition.

In yet another embodiment, a video recording system includes an export box feature to display a plurality of export boxes of different aspect ratios within a digital viewfinder display area of a video recording in progress, each export box designating circumscribed portions of the digital viewfinder display area as image frames of a video file to exported from the recording with the aspect ratio corresponding to the export box.

In yet another embodiment, a video recording system is adapted and configured to insert a transition clip between successive discontinuous video clips of a main video recording stream when creating a main video file from the main video recording stream.

In yet another embodiment, the network may include, without limitation, an Internet, an IEE 802.11 wireless network, a 4G cellular network, a 5G cellular network, and a wired network.

In yet another embodiment, the storage device may include, without limitation, a USB flash drive, an internal solid state drive, a portable external hard drive, a network attached storage, a server, a database, a processor, a digital library, a floppy drive, a tape drive, or a cloud storage provider.

Other systems, devices, methods, features, and advantages will be or become apparent to one with skill in the art upon examination of the following drawings and detailed description. It is intended that all such additional systems, methods, features, and advantages be included within this description, be within the scope of the present disclosure, and be protected by the accompanying claims and drawings.

BRIEF DESCRIPTION OF THE DRAWINGS

Although the characteristic features of this disclosure will be particularly pointed out in the claims, the disclosed method and system, and how it may be made and used, may be better understood by referring to the following description taken in connection with the accompanying drawings forming a part hereof, wherein like reference numerals refer to like parts throughout the several views and in which:

FIG. 1 is a perspective view of a stage surrounded by rows of seating being recorded by a video recording system.

FIG. 5 is a simplified flow chart illustrating the software operation of a video recording system constructed per this disclosure.

FIG. 33 is screenshot of an automated recording control allowing automated recording of multiple video clips.

FIG. 34 is a screenshot of an audio function utilizing the stream functions disclosed herein.

FIG. 36 is a screenshot of a video recording system with a toggle switch for an auto-pause function.

Figure 2A:
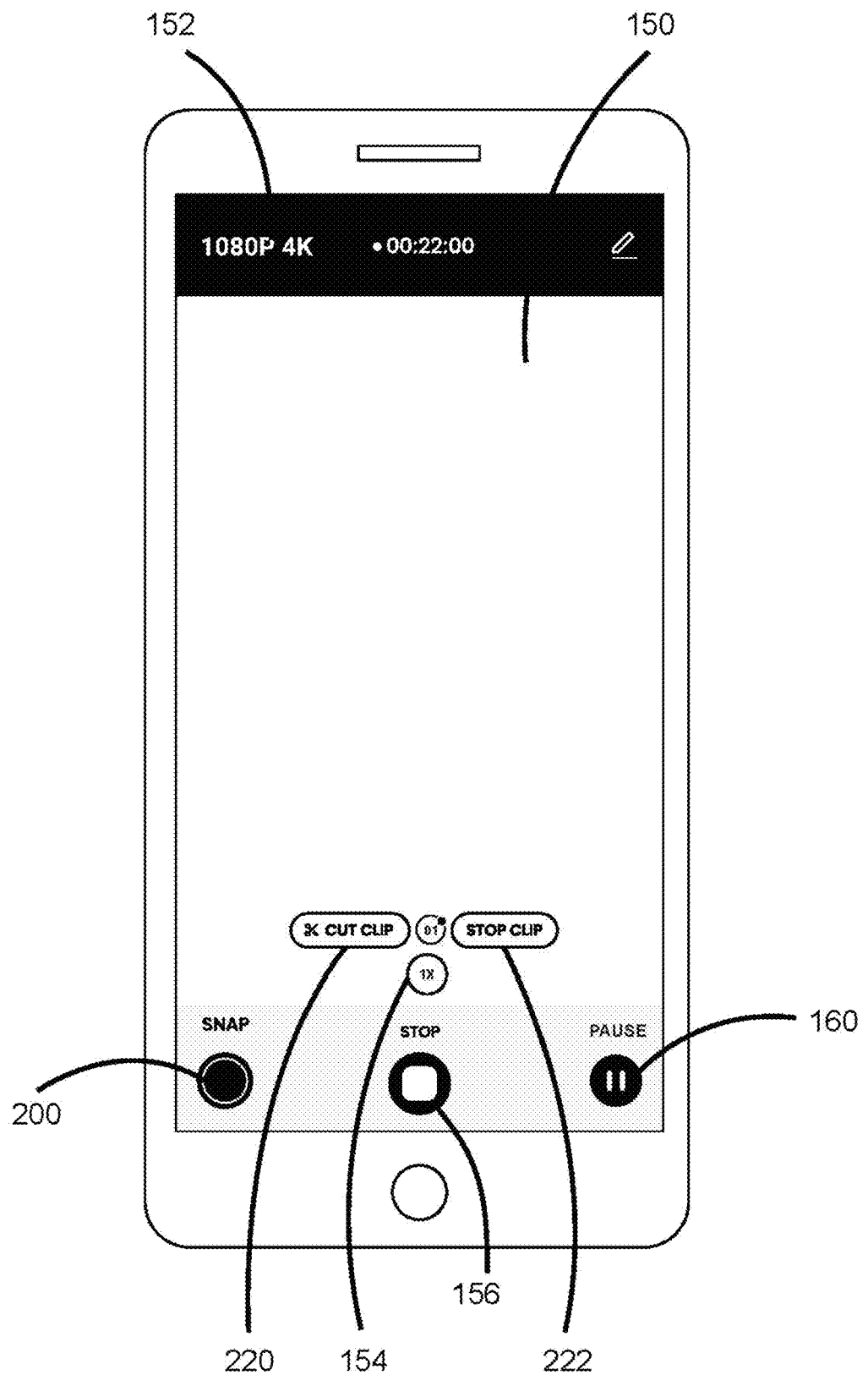
FIGS. 2a through 2f are screenshot views of an exemplary touchscreen user interface for a video recording system constructed per this disclosure.

A person of ordinary skills in the art will appreciate that elements of the figures above are illustrated for simplicity and clarity and are not necessarily drawn to scale. The dimensions of some elements in the figures may have been exaggerated relative to other elements to help to understand the present teachings. Furthermore, a particular order in which certain elements, parts, components, modules, steps, actions, events and/or processes are described or illustrated may not be required. A person of ordinary skills in the art will appreciate that, for simplicity and clarity of illustration, some commonly known and well-understood elements that are useful and/or necessary in a commercially feasible embodiment may not be depicted to provide a clear view of various embodiments per the present teachings.

DETAILED DESCRIPTION

In the following description of exemplary systems and methods embodying aspects of the disclosure, reference is made to the accompanying drawings, which form a part hereof, and in which are shown by way of illustration various example devices, systems, and environments in which aspects of the disclosed system and method can be practiced. Other specific arrangements of parts, example devices, systems, and environments, can be used, and structural modifications and functional modifications can be made without departing from the scope of the disclosed system and method.

Turning to the Figures and FIG. 1 in particular, a video camera 100 films a performance on stage 10 surrounded by numerous chairs 12. As explained herein, the video camera 100 can be a digital camcorder, a digital camera, or even a smartphone. In particular, an operator 16 aims the video camera at performers (not shown) on the stage and records their performance. A person of ordinary skill in the art would understand that while the disclosed system and method are depicted as recording a performance on a stage, the functional and structural features of the disclosed system and method can be translated to other environments with little or no modification. For example, the disclosed system and method can easily be translated for use in security cameras, traffic cameras, and operating room cameras.

Turning to FIGS. 2a through 2f, an exemplary interface for the camera operator is disclosed. The exemplary interface operates on a video device that includes, for example, a lens and image sensor. In particular, the exemplary interface is shown as being implemented on a smartphone, tablet, or other handheld assistants. However, it should be understood that the principles of the interface can easily be used on other types of devices as well, such as digital camcorders, digital cameras, or remote-control software operating on a computer or other device. The exemplary interface includes a video area 150, which depicts a real-time view of a scene captured from the lens. The exemplary interface also includes a resolution indicator 152. In particular, as depicted, video resolution is presently set at 1080P, but an option for 4K video is also present. By pressing the 4K portion of the resolution indicator 152 a user can change the recorded video resolution from 1080P to 4K. Other resolutions can also be used, and no particular resolution is a limitation of this disclosure. The exemplary interface also includes a zoom control 154. As depicted, the zoom control 154 allows a user to cycle through several zoom options, such as 1×, 2×, and 4×. Alternatively, the zoom control 154 can be pressed to the left to zoom out and to the right to zoom in, with near analog granularity. Other zoom interfaces are also possible, and the specific configuration and use of the zoom control 154 is not a limitation of this disclosure. By adjusting the zoom control 154, the scene depicted in the video area 150 will either zoom in or out accordingly, depending on how the zoom is being adjusted.

Figure 2B:
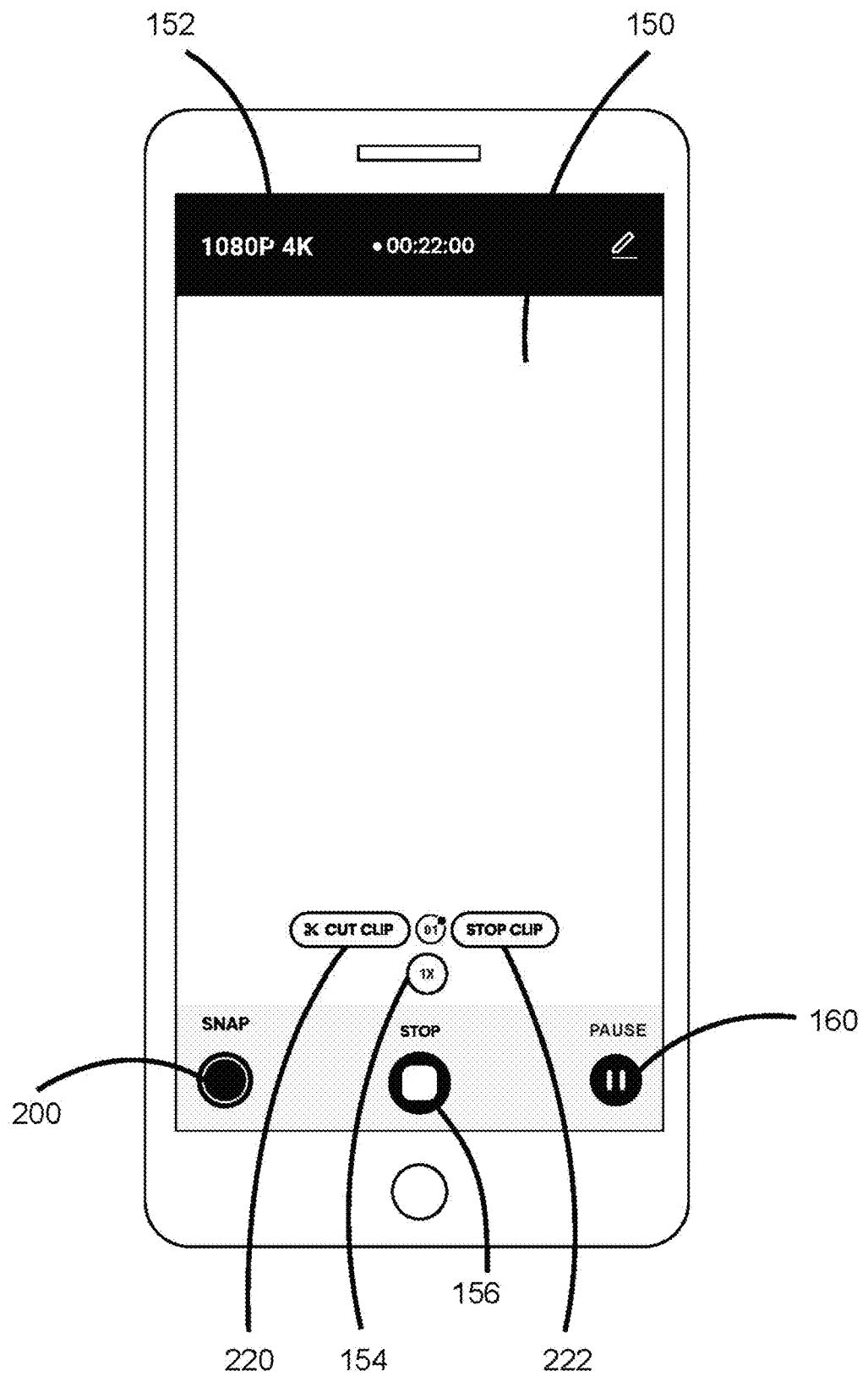

The exemplary interface also includes a record control 156. In FIGS. 2a and 2b, the record control 156 is illustrated as an actuatable area of a touchscreen, the area being indicated to a user by a displayed symbol or "button" image. The record control 156 allows the user to initiate the recording of video or cause the recording of video to pause or stop. The record control 156 is shown as inactive (not recording) in FIG. 2a and active (recording) in FIG. 2b. In particular, as depicted, a circle is displayed in the middle of the actuatable area when the record control 156 is inactive (not recording), and a square is displayed in the middle of the actuatable area when it is active (recording). It should be understood that many other representations of the record control 156 and its active and inactive state can be utilized and still fall within the scope of the disclosed system and method.

The exemplary interface also includes a pause control 160. The pause control 160 disclosed herein works differently than a pause button as described in the prior art. Typically, when the record control 156 is not active, the pause control 160 will be displayed as inactive; i.e., grayed out. However, when the record control 156 is active, a main stream (either video, audio, or both) is being recorded and the pause control 160 can be activated. When the pause control 160 is first activated, the main stream which is being recorded will be paused, and a physical stream will be committed to storage. When the pause control 160 is first activated the physical stream, referred to herein as a scene, that is committed will be comprise the main stream physical stream from when recording was first stated until when the pause control 160 was activated. When the pause control 160 is activated a second time, the main stream starts to record again. If the pause control 160 is activated a third time, the main stream will be paused again and an additional scene will be committed to storage, with the additional scene starting at the point that the pause control 160 was activated a second time and ending at the point when the pause control 160 was activated a third time. As the pause control 160 is activated additional times the functionality will be similar to that described.

The exemplary interface also includes a number of new controls, including a cut clip control 220 and a stop clip control 222. When activated the cut clip control 220 a keyboard, such as a smartphone system keyboard, can appear to allow a stream name to be entered in a label name control, such as, for example, a text box 164. Once the name is selected, the done/save button 166 can be pressed to save the name for the newly created label stream. When the cut clip control 220 is pressed, and as explained further herein, the video recording system 100 will create an additional label stream. In particular, the video recording system 100 will continue to record the main video stream, which is hereafter referred to as the main video stream. In addition, the video recording system 100 will also create a new label stream starting at the time index that the cut clip control 160 is activated and continuing until the stop clip control 222 is activated. The new label stream created by the cut clip control 220 is a subset of the main stream; i.e., it contains the same video and audio content as the main stream except that it is limited to the video encompassed by a starting time index and an ending time index.

When the stop clip control 222 is pressed, the new label stream is assigned an end time index, and the new label stream is closed. When a label stream is being actively recorded a visual indication can be displayed; for example a number for the particular label stream being recorded can be displayed.

The exemplary interface also includes a snap control 200. The snap control, when activated, will commit a still image of the present screen to storage; i.e., it will take a screenshot of the instant video image.

It should be noted that the system disclosed in FIGS. 2a-2f can be utilized with camera systems (or smartphone, tablet, and other systems) that utilized multiple cameras or multiple lenses. For example, it is known in the art to record from multiple cameras or lenses simultaneously; for example, a wide angle camera or lens can be used to record an entire scene (such as an entire stage), while a zoom camera or lens can be used to record the center of a scene (such as a part of the stage where the action is).

Figure 3:
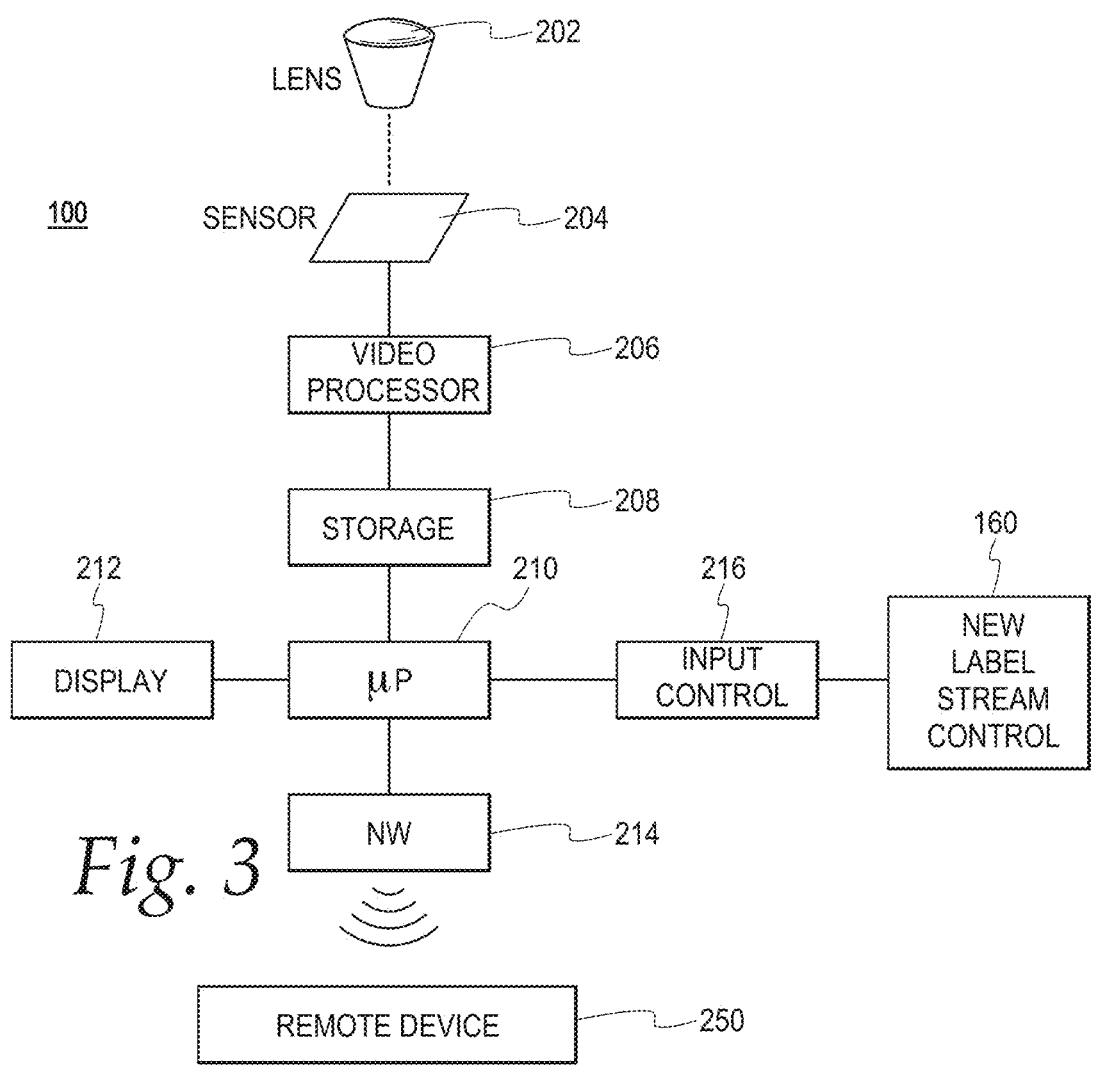
FIG. 3 is a simplified block diagram of a video recording system constructed per this disclosure.

Turning to FIG. 3, a simplified block diagram of a video recording system 100 is depicted. In particular, the primary components of a video recording system 100 are depicted, whether the actual video recording system 100 is a smartphone, a digital camera, or a digital camcorder. Typically, the components of the video recording system 100 will reside in a body (not shown in this figure), although it is possible in certain implementations that different components can reside in separate enclosures, such as in the embodiment depicted in FIG. 7. The video recording system 100 will generally include a lens 202. The lens can be, for example, a small curved glass lens with a focal length of about 18 mm to 55 mm, although it should be noted that the characteristics of the lens, and even the inclusion of the lens, is not a limitation of this disclosure. The lens focuses incoming light onto an image sensor 204. The image sensor 204 can be, for example, a CCD sensor, a CMOS sensor, or another equivalent image sensor. In addition, the size of the sensor 204 can vary from full-frame or larger down to arbitrarily small sensors. Typically, the output of an image sensor 204 will be processed by a video processor 206, which will process the video from the image sensor 204 and write or commit full frames of video to storage 208. The video processor 206 may process data from the image sensor 204 at a frame rate such as, for example, 60 Hz, although other frame rates, such as 15 Hz, 24 Hz, 30 Hz, 90 Hz, 120 Hz, 240 Hz, 480 Hz, 960 Hz, 1920 Hz, or other, arbitrary frame rates can also be used. The video processor 206 may write frame data directly to storage 208 via a DMA channel. However, the processor 210 can also read data from the video processor (or directly from the image sensor 204) and write the frame data to storage 208. Accordingly, in certain embodiments of the disclosed video recording system 100, the video processor 206 is entirely extraneous and is not a limitation of this disclosure.

The storage 208 used by the video recording system 100 will typically be FLASH memory, although the primary limitation is that the write speed of the storage 208 is sufficient for the frame rate that the video recording system 100 is operated. The amount of storage can vary, but 1 GB of storage can hold a bit less than 20 minutes of 1080P video at 60 FPS (frames per second). The FLASH memory modules may, for example, be UFS 3.1 FLASH memory or a similar type of FLASH memory that offers sufficient read/write performance.

The microprocessor 210 reads frame data from storage and displays it in real-time on the display 212. The microprocessor 210 also performs housekeeping activities, such as configuring the video processor 206, interfacing with external devices (not shown), accepting input controls from input control components 216, and interfacing with an external network 214. The microprocessor 210 can be any suitably fast microprocessor or microcontroller that has appropriate interface capabilities, ranging from an 8-bit device, such as a Microchip® PIC® variant, or similar device, to a 64 bit ARM or x86 device, such as, for example, an ARM Cortex A76 variant.

The input control components 216 allow the camera operator to control the operation of the video recording system 100. The input control components 216 can include, for example, a touch screen system, or a collection of buttons, sliders, joysticks, gesture controls, voice controls, and other input control components, as are typical in video recording systems. The stream control 160, which can function similarly to the cut clip control discussed previously, is one of the input controls activatable by the input control components 216.

The display 212 can be, for example, a Liquid Crystal Display (LCD), an LED or an OLED display, or another type of display as long as the display is of sufficient resolution and refresh rate for the video camera operator to obtain a reasonable view of the scene that is being recorded. In certain implementations, the display 212 can be a touch-sensitive display, so that touch-sensitive input control components can be implemented as needed.

The network interface 214 will typically be wireless using a variant of 802.11, although other wireless networking technology, or even a wired network, can be employed. For example, a 4G or 5G cellular network could also be used, as their transfer speeds are fast enough to accommodate the video streaming and transfer speed required of the network interface 214. The network interface 214 can be employed for a variety of purposes, including remote control by a remote operator. In such a scenario, the processor 210 may run software, including a video server that will stream the recorded video to a remote site, as well as software to accept various network commands from the remote site. When utilized, the remote device 250 can oversee the operation of the video recording system 100. For example, the remote device 250 can send a command to create a new label stream or terminate a label stream that is presently recording. In certain implementations, the video may not be streamed to the remote site so that lower bandwidth implementations, like Bluetooth®, Zigbee®, or Z-Wave®, could be used. A remote device without streamed video would allow for the implementation of a remote device 250 that could serve solely as a label control 160 and allow the camera operator to hold the remote device 250 in one hand to manage label streams while viewing an event in a location distant from the video camera.

It should be noted that certain embodiments may not include all of the components illustrated in FIG. 3 and described above. For example, a "screen capture" implementation of the disclosed video recording system 100 (which could be used for teleconferencing for example) would not require a lens 202, an image sensor 204, or a video processor 206. In addition, such an embodiment may not require a network interface 214 or a remote device 250. Other embodiments may similarly not require certain components. For example, the network interface 214 can interface directly with the video processor 206 and even the image sensor 204, so that video can be directly streamed to a remove device 250 via the network interface 214. In addition, certain other components, such as a microphone, may be present in the video recording system 100, but have been omitted for brevity and clarity.

Figure 4:
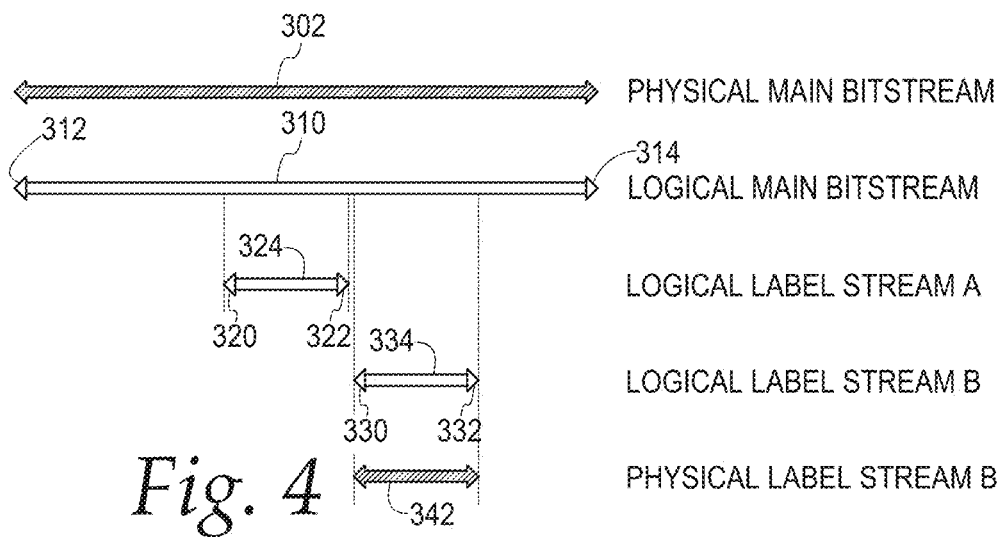
FIG. 4 is a structure diagram illustrating the different types of streams discussed herein and the relationship between those different types of streams.

FIG. 4 visually depicts different stream types. While the terms "video stream" or "stream" are used herein, it should be understood that a stream can include both video and audio. At the top is shown the physical main stream 302. The physical main stream 302 is shown as filled in to show that this stream occupies physical memory locations in the storage 208; i.e., it has been written to a physical medium. Generally, a given video recording system 100 will only have one active physical main stream 302 at a time. The physical main stream 302 is instantiated when, for example, the user activates the record control 156. Beneath the physical main stream 302 is a logical main stream 310, which is shown as an outline to indicate that it is strictly a logical construction, i.e., it exists as a pair of pointers to physical memory locations. In particular, a logical stream consists of a start pointer 312—in the case of the logical main stream, the start pointer will point to the start of the physical main stream. The logical stream also includes an end pointer 314—in the case of the logical main stream, the end pointer will point to the memory locations in storage 208 holding the most recent frame of video that has been recorded. The end pointer 314 of the logical main stream will be updated after every frame. It should be noted that the creation of a logical main stream 310 is a matter of programming convenience, and the disclosed video recording system 100 can be implemented without creating a logical main stream 310.

Figure 2C:
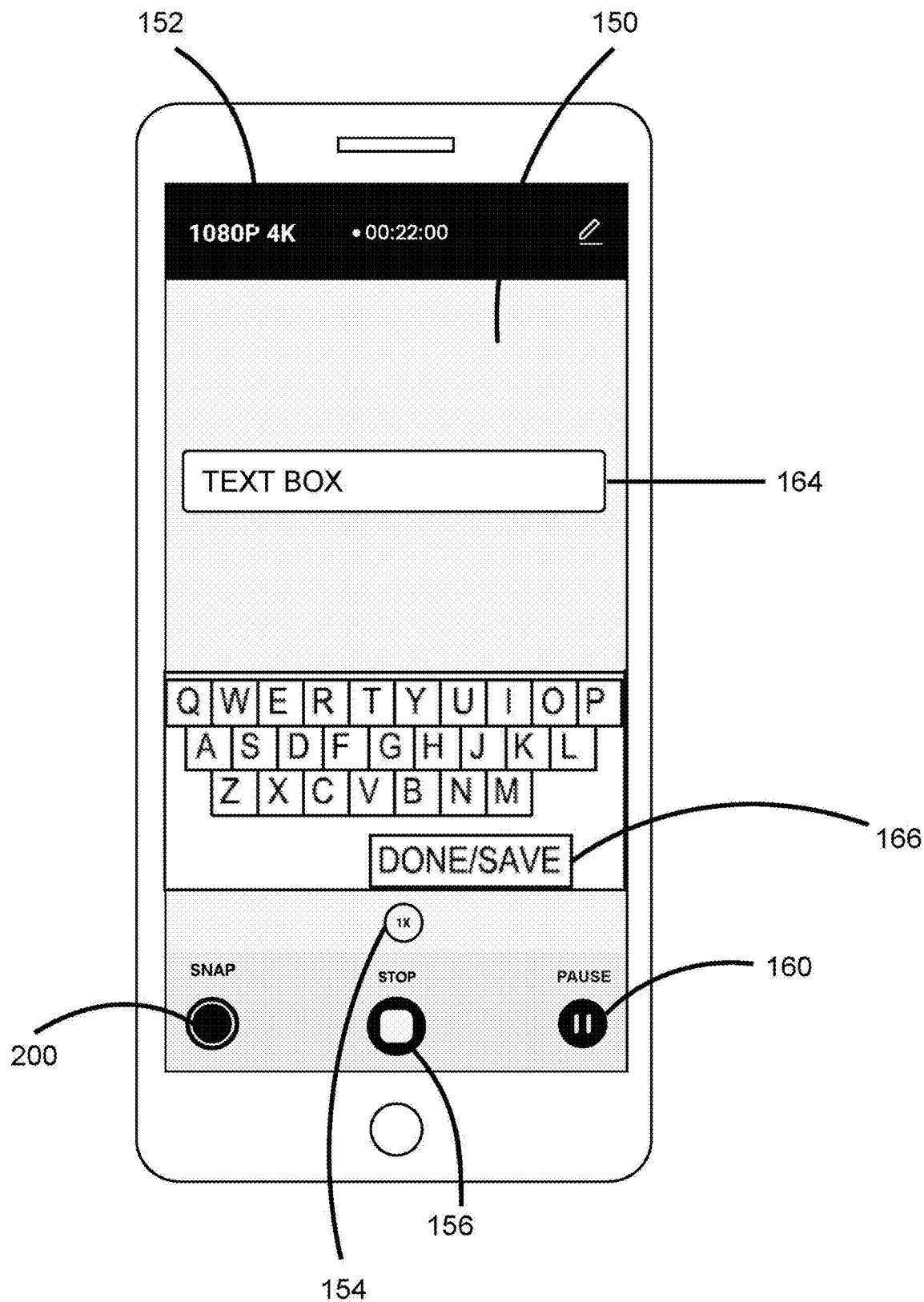
Figure 2D:
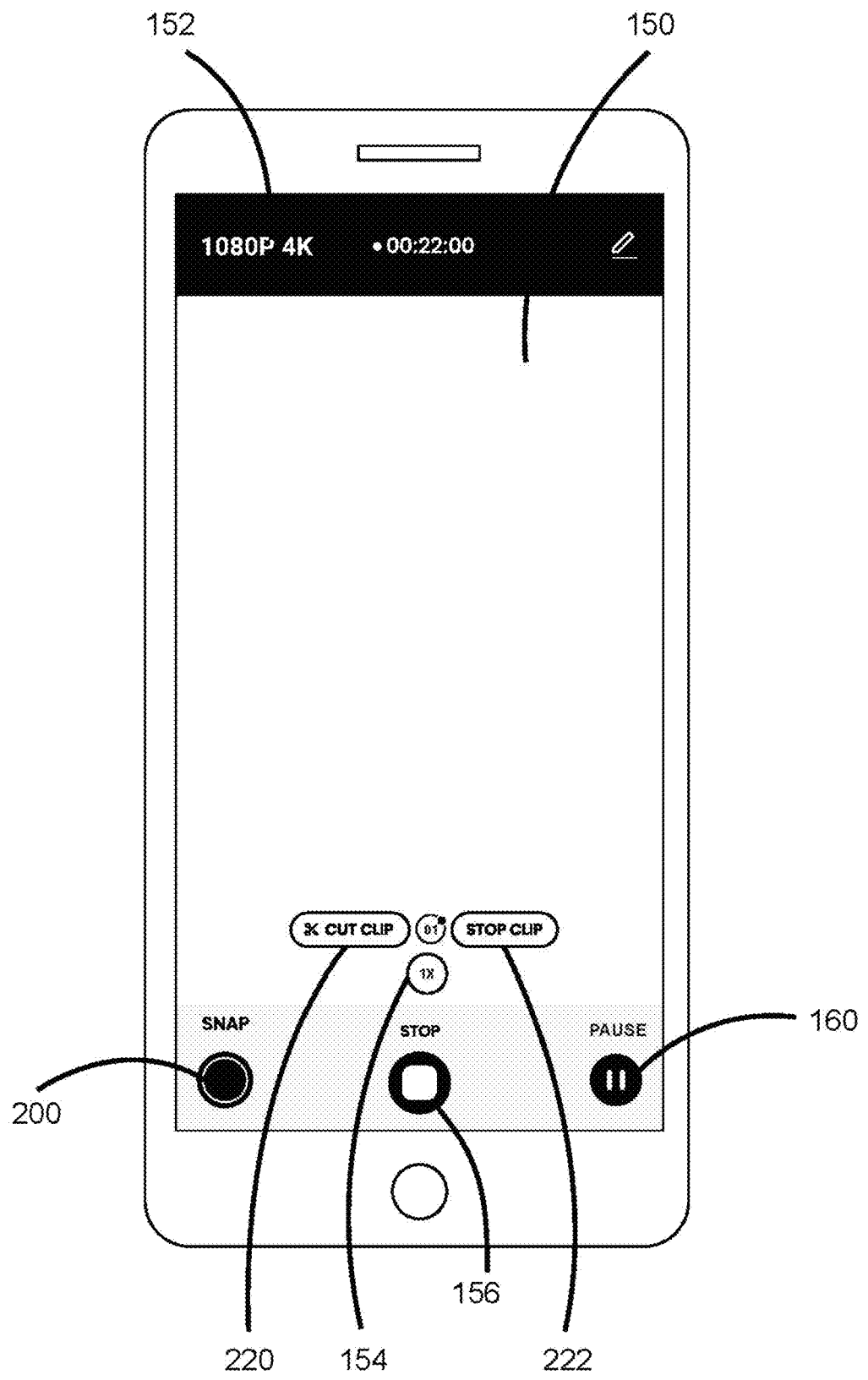
Figure 2E:
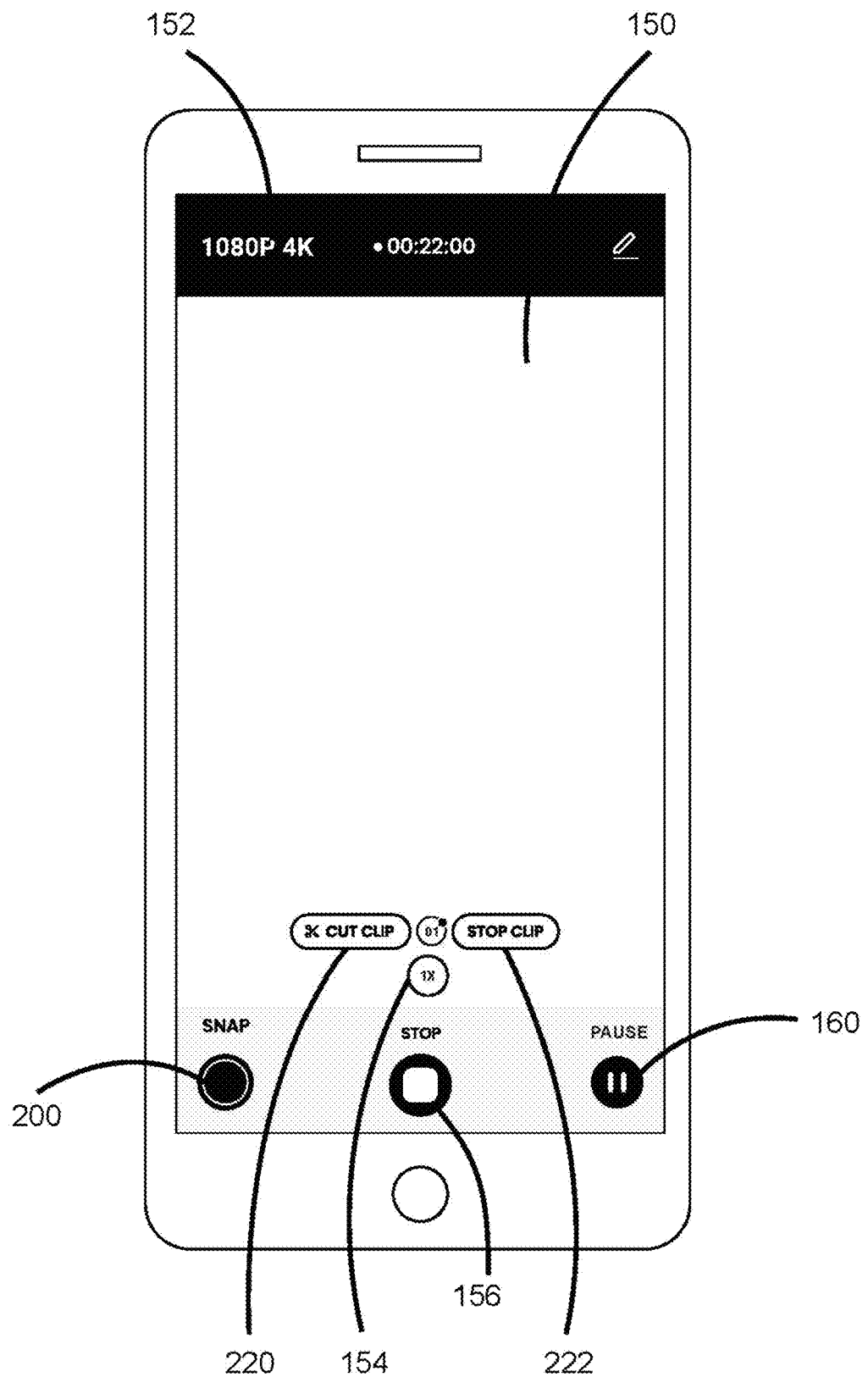
Figure 2F:
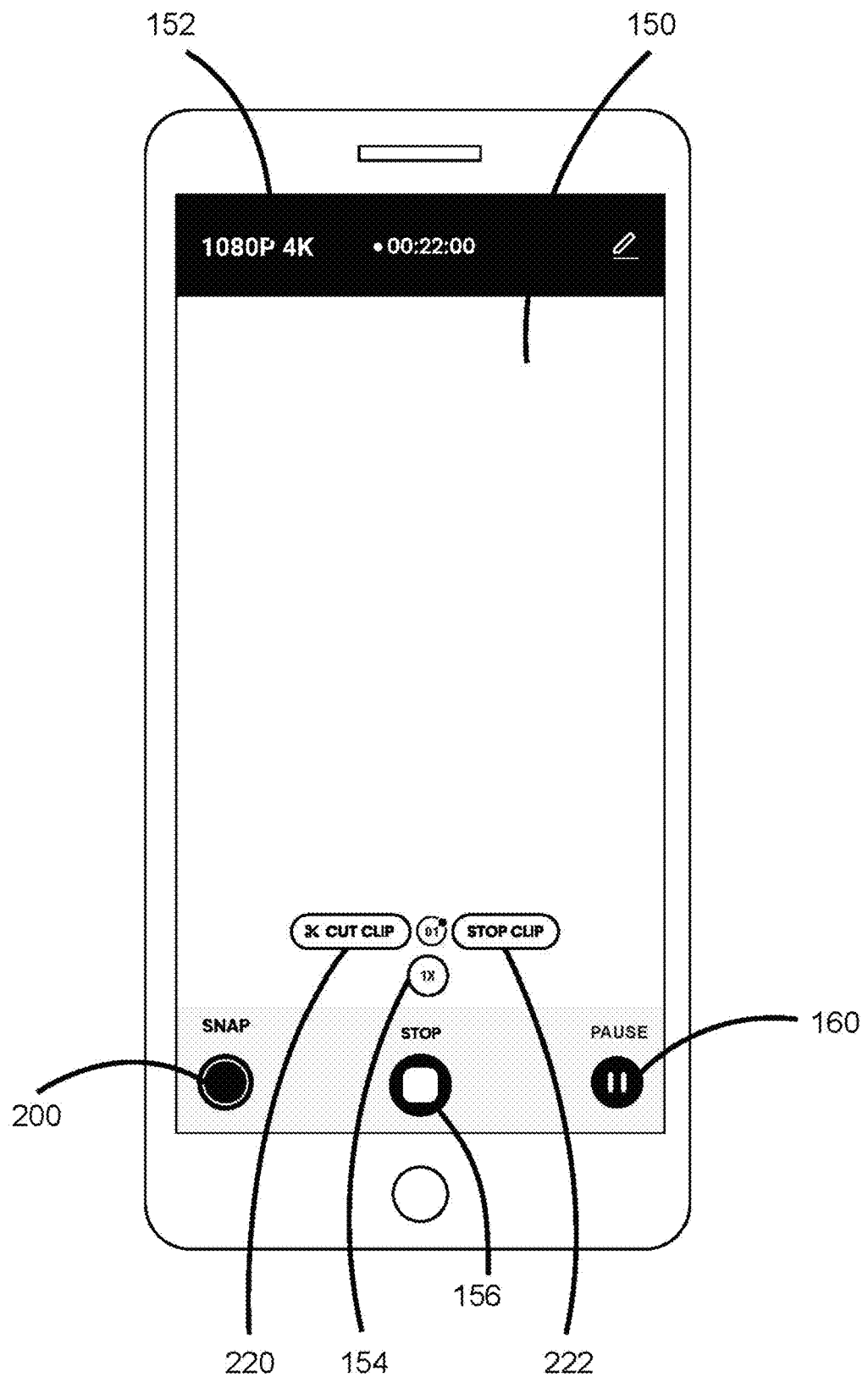

When a label stream is created, it can be created as a logical stream, and its start pointer is assigned to the present end pointer 314 of the logical main stream 310. This operation corresponds to, for example, a user activating a cut clip control 220. As the video is recorded and stored in the physical main bitstream 302 and tracked by the logical main stream 310, the end pointer of the label stream is continuously updated to match the end pointer of the logical main stream; i.e., it will point at the latest frame of video that has been recorded. When the label stream is ended, its end pointer is fixed to the value of the end pointer 314 at the time that the label stream is ended. The fixing of the end pointer of the label stream can correspond to a press of the stop clip control 222, as depicted in FIGS. 2D and 2E. For example, logical label stream A 324 has its start pointer 320 pointing to a first-time index of the logical main stream 310, and its end pointer 322 pointing to a second-time index of the logical main stream 310 that is later than the first-time index. Logical label stream B 334 was created a short time after the end of logical label stream A; accordingly, the start pointer 330 of logical label stream B has a later time index than the end pointer 322 of logical label stream A. Similarly, the end pointer 332 of logical label stream B 334 has a somewhat later time index than the start pointer 330 of logical label stream B 334. While label streams can be utilized in a strictly logical format, in certain cases, it may be desirable to write the label streams to actual physical storage. In such a case, a physical stream can be created. For example, in the case of logical label stream B 334, a corresponding physical stream 342 is also shown. Similarly, the creation of logical label streams can be done away with entirely, and physical streams can be created instead, which will result in duplication of memory storage used for the label streams.

Turning to FIG. 5, a simplified flowchart depicting the operation of a video recording system 100 constructed in accordance with this disclosure is shown. In particular, in step 400, the video recording system 100 is initiated, i.e., it is turned on; startup tasks are performed, etc. In step 402, the record control 156 is activated, and a main stream initiated. As explained above, this would create both a physical main stream and a logical main stream. This step corresponds to, for example, the activation of the record control 156, as depicted in FIGS. 2a and 2b. In step 404, a new label stream is created, and in step 406, the new label stream start pointer is created. As explained above, the new label stream's start point is set to the present end pointer of the logical label stream. This operation corresponds to, for example, the activation of the cut clip control 220, as depicted in FIGS. 2b and 2c. In step 408, the label stream is ended, and its end pointer is fixed to the most recent value of the logical main stream in step 410. This operation corresponds to, for example, activation of the stop clip control 222, as depicted in, for example, FIGS. 2d and 2e. In step 412, the main stream is terminated, which is usually accomplished by the user pressing the record control 156 again to cease recording, as depicted in, for example, FIGS. 2e and 2f. In step 414, the video recording system 100 is turned off, ending the operation of the system.

Figure 6B:
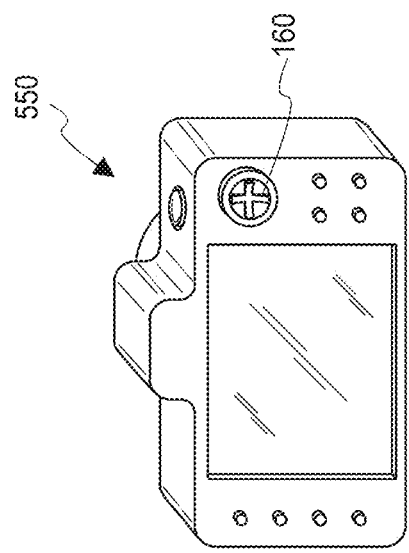
FIG. 6b is a perspective view of a digital camera implementing the label stream feature disclosed herein.
Figure 6A:
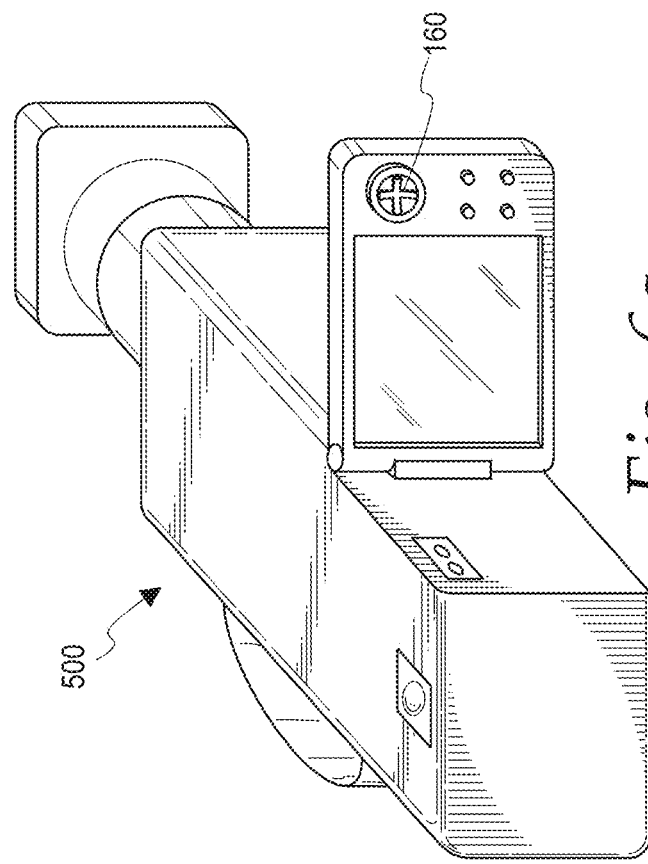
FIG. 6a is a perspective view of a digital camcorder implementing the label stream feature disclosure herein.

While the user interfaces for the creation of label streams have been shown in the context of a smartphone implementation, FIGS. 6a and 6b illustrate how a digital camcorder 500 and the digital camera 550 could utilize the disclosed label stream feature respectively. In particular, the addition of a stream control 160 to the standard controls already present in a digital camcorder 500 or a digital camera 550, along with the disclosed software changes, would allow implantation of disclosed label stream feature.

Also, one additional embodiment of the label stream system is envisioned. In particular, a software implementation for use with existing digital cameras and digital camcorders could also be constructed, so long as the existing device supported live streaming. Such an implementation would have the advantage of being able to continue to use an expensive, well-functioning camera, while still enjoying the benefits disclosed herein.

Figure 7:
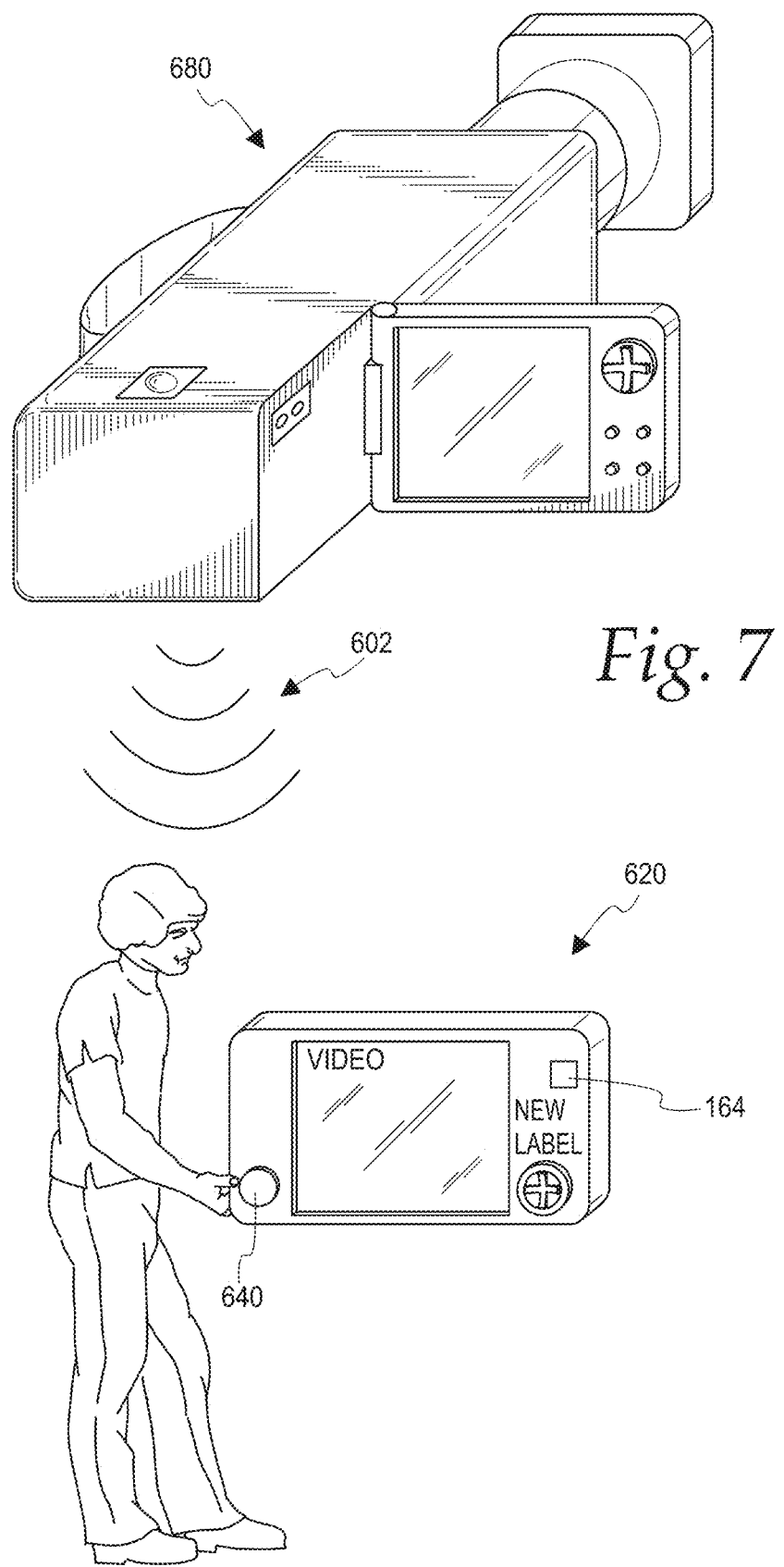
FIG. 7 is a perspective view of a video recorder system utilizing a wireless control device live streaming video to a wireless control device.

Turning to FIG. 7, an embodiment of such a label stream system is pictured. In particular, a digital recording device 680 has an integrated live streaming function with which it broadcasts video data over a wireless network 602, such as an 802.11 network. A wireless control device 620 receives the live stream from the digital recording device 680 over the wireless network 602. The wireless control device 620 will include certain components similar to the video camera 100 of FIG. 3, including a display, which can again be a touch-sensitive display, a processor, storage, and input control components, such as UI widgets that are displayed on the touch-sensitive display, or other buttons, sliders, joysticks, and voice controls. In addition, the wireless control device will contain a wireless network port. Software operating on the wireless network 602 implements the label stream functionality disclosed herein. In particular, the software implements a stream control 160, as well as a label name control 164 that could function similarly to the embodiment previously disclosed herein.

Figure 8:
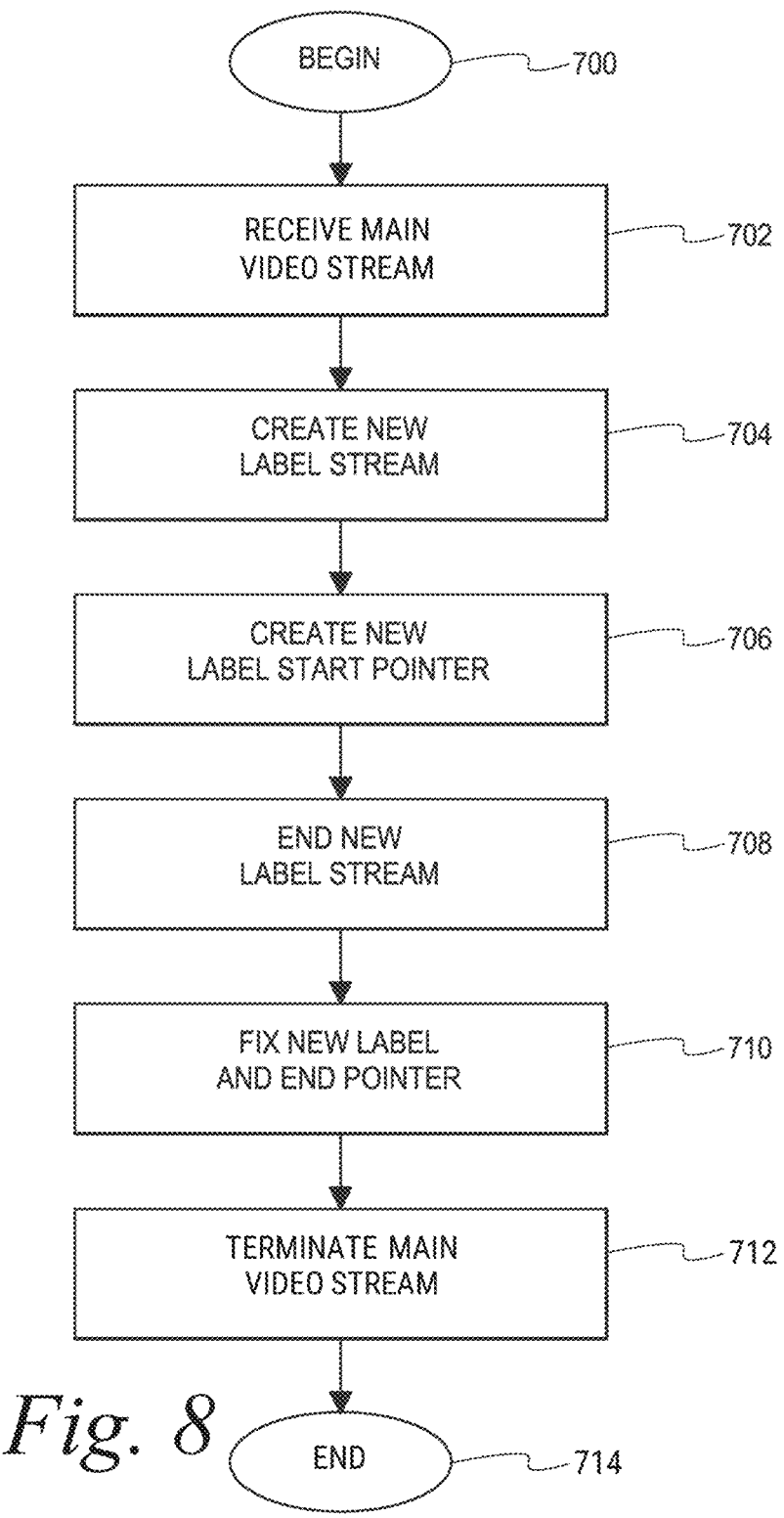
FIG. 8 is a simplified flow chart illustrating the operation of a wireless control device, implementing the label stream functionality disclosed herein.

Turning to FIG. 8, a simplified flowchart depicting the operation of a video recording system 100 utilizing the live streaming embodiment of FIG. 7. In particular, in step 700, the video recording system 100 is initiated, i.e., it is turned on, the network 602 is initiated, etc. In step 702, the live stream is initiated by the digital camcorder 500 and received by the wireless control device 620. In accordance with the previous embodiment, this would create both a physical main stream that is recorded into persistent storage on the wireless control device 620 and a logical main stream. In step 704, a new label stream is created, and in step 706, the new label stream start pointer is created. As explained above, the new label stream's start pointer is set to the present end pointer of the logical label stream. In step 708, the label stream is ended, and its end pointer is fixed to the most recent value of the logical main stream in step 710. In step 712, the live stream is terminated, which can be accomplished by the digital camcorder ceasing its live stream or a user pressing the terminate function 640 on the wireless control device. In step 714, the video recording system 100 is turned off, ending the operation of the system.

The structure of the disclosed video recording system 100 has been set forth herein. With regard to its application, this system can have several advantageous uses. The first application would be for the recording of a live performance that will consist of numerous subparts, such as, for example, a school talent show. At such a performance, the video camera operator could create a separate label stream for each performance, and name the streams appropriately; i.e., a first label stream could be named John Smith (assuming that John Smith was the student performing), while a second label stream could be named Ann Jones. Then, the individual label streams could be exported to a website, and parents could then download only the video applicable for their child.

The disclosed video recording system 100 could also be integrated into a security camera system deployed at, for example, a workplace. The disclosed video recording system 100 could be adapted to create separate label streams for each event, such as a particular location within the workplace (like the kitchen or shop floor) over a particular time frame, such as 10 AM to 10:30 AM.

The disclosed video recording system 100 could also be integrated into a traffic camera system deployed at a stoplight. Separate label streams could be created every time that a traffic light changed states, such as from green to red or vice versa. Such a system would allow the system operators to easily identify applicable video when, for example, a person that received a violation notice due to the traffic camera system chose to challenge that violation.

Similarly, the disclosed video recording system 100 could be integrated into an operating room black box system. As an operation proceeded, the video camera operator could create different label streams for each phase of the operation; i.e., preparation, initial incision and cut down, tumor resection, closure, and clean up (assuming the procedure involved the removal of a tumor). Such a system would allow a subsequent viewer to easily access only the part of the operation that was of concern.

Figure 9:
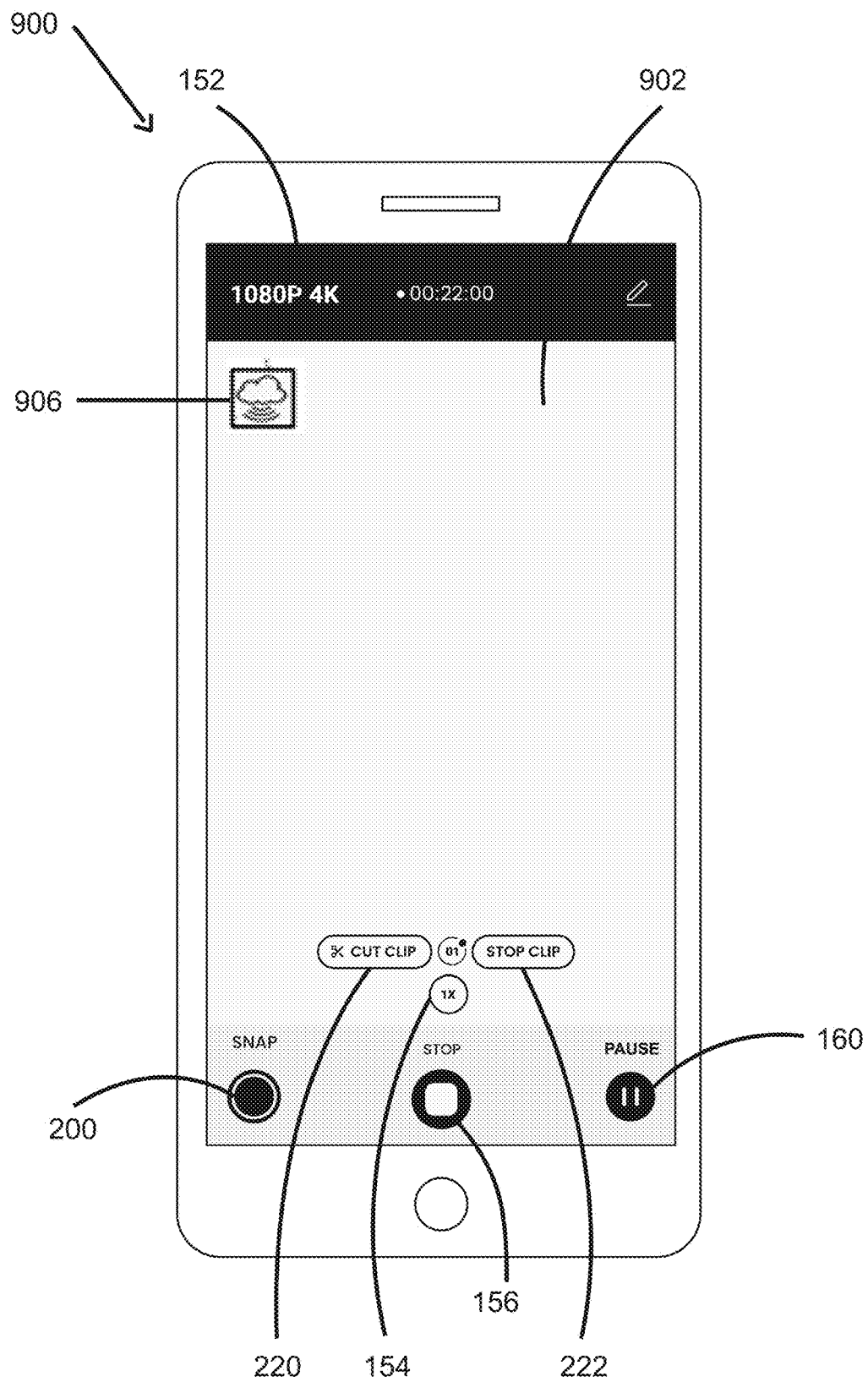
FIG. 9 is a screen shot view of an event being recorded by a video recording system.

Turning now to FIG. 9, another embodiment of a video recording system 900 is unique in that the recorded video streams are associated with an event 902, which is labeled with a corresponding event name 1104. This association of the video streams with an event 902 is a unique labeling feature that helps organize media streams for easy identification and access. In some embodiments, the event 902 can be a calendar event, a user-generated event, a social media event, or a holiday event. As referenced, the event 902 is a school play that is being recorded with the video recording system. However, in other embodiments of the present disclosure, any organized activity, special event, or large gathering can be considered an event 902.

Continuing with FIG. 9, a cut clip control 220 allows the system user to create additional clips as discussed earlier herein, and then label the video clips with a name. A stop clip control 222 terminates the recording of the video clip (label stream), after a desired length of video has been recorded. It should be noted that clip and label stream are used interchangeably herein. Thus, when the cut clip control 220 is activated, a keyboard, such as a smartphone system keyboard, can appear to allow a stream name to be entered in a label name control 164, such as, for example, a text box. Once the name is selected, a done/save button can be pressed to save the name for the newly created label stream.

Figure 11:
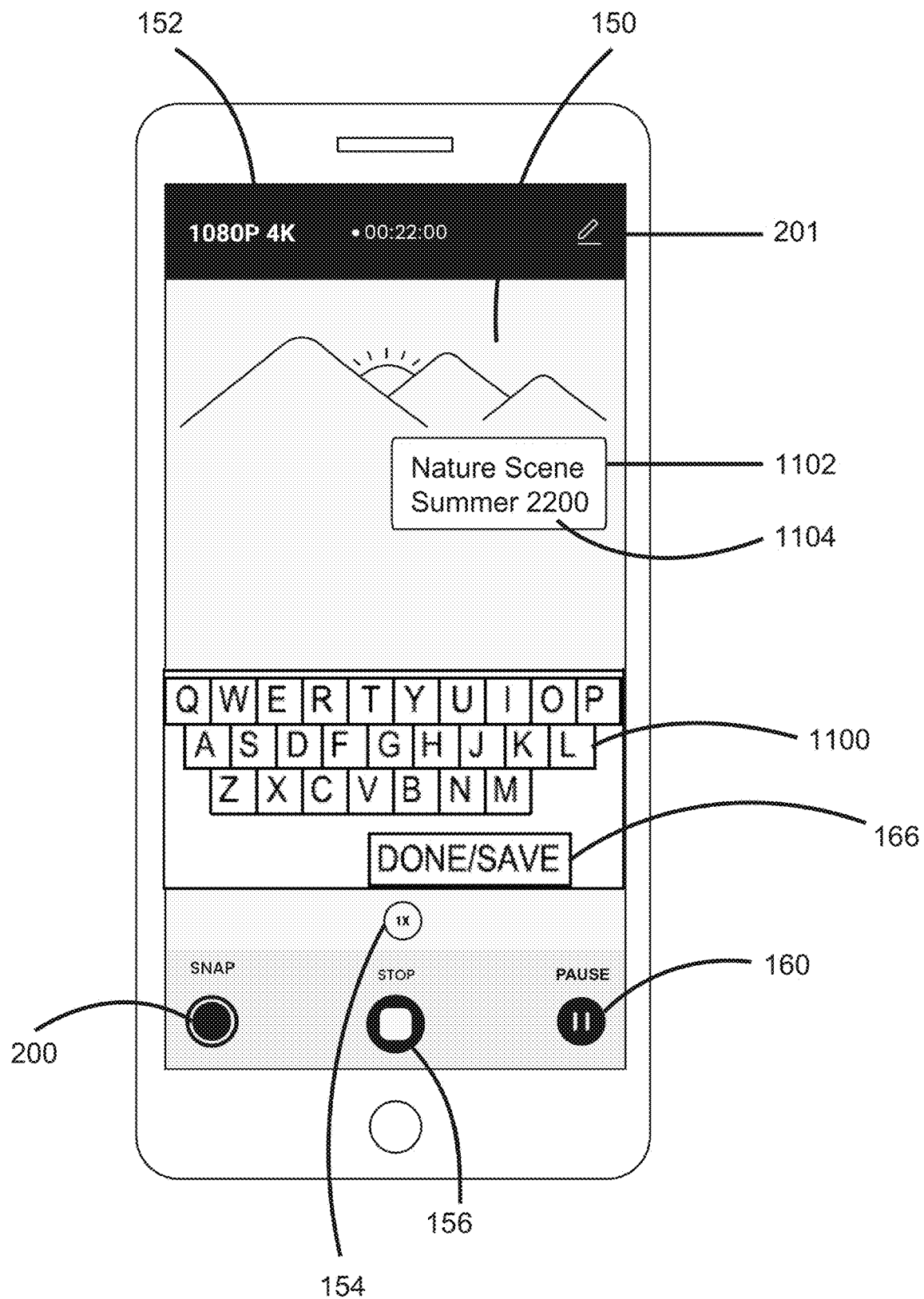
FIG. 11 is a screen shot view of an event of a nature scene being recorded by a video recording system, showing the keyboard used for entering an event name.

As FIG. 11 shows, the video recording system 900 is configured with a unique event control 201 for labeling the event 902 with an event name 1104, before recording the video or images that associate with the event 902. In one non-limiting embodiment, the video recording system 900 labels the event 902 with a user-defined event name.

For example, FIG. 11 references a nature scene at the lake labeled with an event name of "Nature Scene—Summer 2020". The user may review the video clip of the nature scene in the future by looking up and playing the file "Nature Scene—Summer 2020". In another example, a warehouse inventory job is filmed and labeled as "Warehouse #10— Inventory Jan. 7, 2020". In yet another example, a security camera in front of a gas station records the interior of the gas station 24/7. The event can be rush hour, which is defined as a busy time of the day. The event can be labeled, "Security—Friday 11 am-2 pm" or "Security—Friday—Rush Hour".

Figure 12:
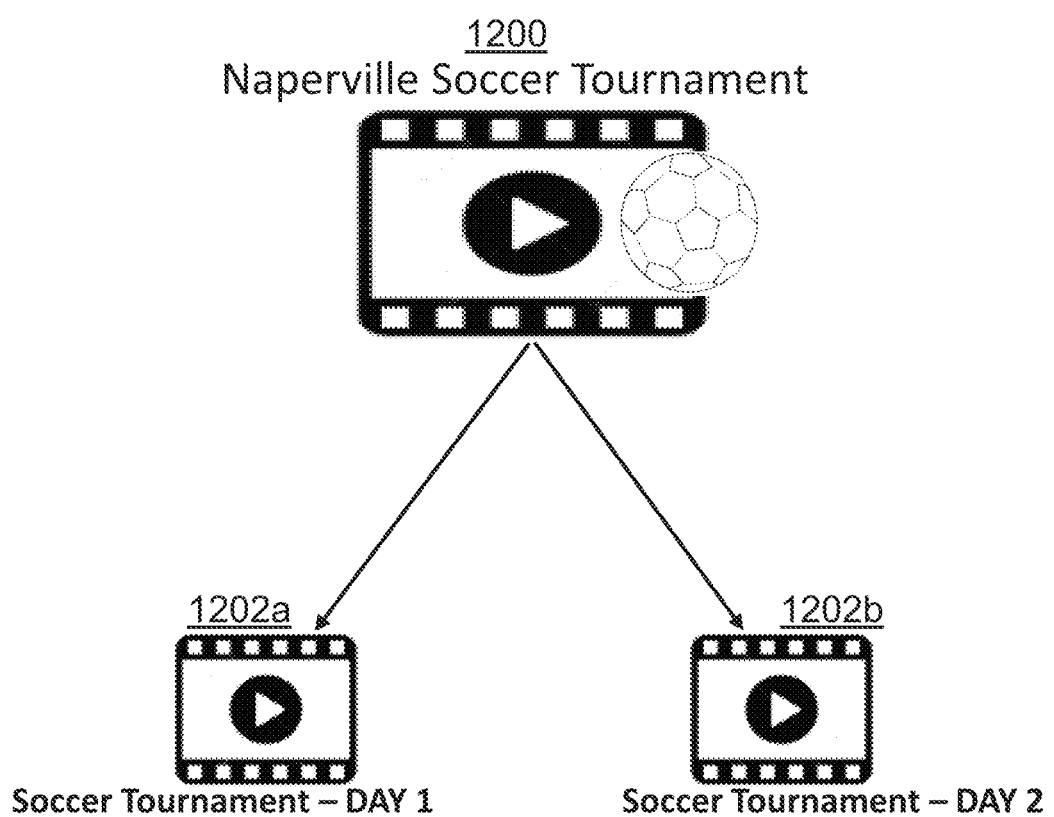
FIG. 12 is a block diagram showing the relationship between an event and multiple subevents.

Turning to FIG. 12, in alternative embodiments of the video recording system 900, an event 1200 comprises one or more subevents 1202a, 1202b. The subevents 1202a-b are simply spliced sections of the video stream for the event 1200. Thus, the recorded event 1200 can be organized into smaller sections of video streams. FIG. 12 references a block diagram, showing the relationship between a soccer tournament event 1200 and two corresponding subevents 1202a-b.

In this example, the event 1200 is a Naperville Soccer Tournament, which occurs over a span of two days. Two subevents 1202a, 1202b of the soccer tournament event 1200 are broken down into the individual days: "Day 1—Playoffs—A vs B" (Sub Event 1); and "Day 2—Playoffs—C vs D" (Sub Event 2). By breaking down the soccer tournament event 1200, into video streams of separate days, the operator can access the desired playoff game, or more specific video timelines and locations that make up the event 1200 can be selectively viewed. In yet another embodiment, the subevents 1202a-b can be broken down into sub-subevents, and so on. For example, "Day 1 Playoffs—A vs B" is spliced into a "First Half of the Game" and a "Second Half of the Game". Furthermore, the events 1200 and subevents 1202a-b can be stored in folders 1306a-c and subfolders for organizing the video streams in a desired configuration.

Further, the video recording system 900 can film an event 902 that encompasses the entirety of a main video stream, or a spliced section of the main video stream. It is significant to note that this event-organization feature is in addition to the labeling feature, described above, in which spliced streams of the main video stream are labeled with a name, time stamp, or location. Thus, by associating the video streams with events, along with other names and labels, the video recording system 900 allows for selective querying of the video streams across various types of events, labels, time stamps, locations, and other categories known in the art of video.

The event labeling is also useful for organizing video streams to be more easily identified and accessed. By associating the main video stream with an event 902, the video streams can be organized for selection based on the type of event 902. Thus, used in conjunction with the name labeling described above, the video streams are adapted for event-based organization, name-based organization, time-based organization, and location-based organization.

As referenced in FIG. 11, the video recording system 900 includes an event control 201 for labeling the event 902 with a user-defined event name 1104. In some embodiments, the event control 201 may include, without limitation, a hard button, a touch display on a smartphone, a voice control operated by voiced recognition software, or another type of control that is operable on the body of the video recording system. The event control 201, along with any of the other controls, may appear and disappear based on the needs of a particular scenario.

The event control 201 is activated by the operator to enable labeling of the event 902 with an event name 1104 to as user-defined specification. The event 902 is generally labeled prior to commencement of recording. This pre-recording labeling feature helps the operator in managing the labeling and organization of events while recording the video.

Typically, when the event control 201 is not activated, labeling is not possible, i.e., as it is depicted in FIG. 9. However, when the event control 201 is activated, a keyboard 1100, such as a smartphone system keyboard, can appear to allow an event name 1104 to be entered in an event name control box 1102. The event name control box 1102 may include a graphical depiction of a text box into which alphanumeric digits are entered.

As shown in FIG. 11, the keyboard 1100 is configured to allow the event name 1104 to be entered in the event name control box 1102. This can be performed by typing, speaking, or other data entry means. For example, the operator can simply type or voice the desired event name 1104 into the keyboard 1100. Once the event name 1104 is selected, the done/save button 166 can be pressed to save the event name 1104 for the newly created event-labeled video stream. After naming the event 902, the record control in the video recording system 900 is activated to video record the event 902.

As described above, when recording the event 902, the record control and stream control enable either a full feature main video stream to be produced, or a spliced labeled video stream. When the record control 156 is activated, a main stream is initiated. As explained above, this would create both a physical main stream and a logical main stream. This step corresponds to, for example, the activation of the record control 156, as depicted in FIGS. 2a and 2b.

Also as described above, the video streams can be labeled with a name, location, or time stamp through use of the stream control 160. This labeling function can be in conjunction with the event name 1104 given to the video stream. Thus, when the record control 156 is active, the stream control 160 can be activated to create a name, time stamp, or location label for the video stream.

It is significant to note that the video streams can be labeled, solely with an event name 1104. Whereby, the video stream is not labeled with a name, a time stamp, or a location. Conversely, the video streams may be labeled with a name, a time stamp, and a location label; yet have no event name 1104 associated therewith.

It is also significant to note that while the label video streams are spliced sections of the main video stream; the event 902 can be associated with an entire main video stream, or a spliced section of the main video stream, i.e., labeled video stream. The number of video clips, length of video clips, and duration between multiple video clips can also be labeled to assist in subsequent searches or a desired video clip. The user can enter the name of the video clip after the recording has started and all of the video clips will be named accordingly.

The video recording system 900 is also unique in that the video clip is stored as a file, which can be either automatically labeled by default; or labeled by the operator, and members of a network 1300. Thus, both the file and the video clip contained therein can be labeled with a user-defined, or default name. In one possible embodiment, when the user does not enter the event name or the video clip name, the video clip, or file thereof, may be labeled by default. This helps the user organize the video clips in a less random manner. Thus, a default file naming scheme provides a logical set of rules that facilitate labeling, and subsequent searching, for a video clip.

In one possible embodiment of the default file naming scheme, the manual input of a file, or video clip, label takes precedence over any default labels. The user-named video clip labels may be organized in alphabetic order, or by date, file size, or other organization means known in the art. Furthermore, while watching a video clip on a computer, a companion app on the phone, tablet, or smartwatch enables the video clip being watched to be saved, and potentially labeled.

However, if no label is provided, a default of "Event #" is used. Event # may include, for example: Event1; Event2; and Event3. Alternatively, a user can enter a name for an event, such as "NatureScene," which could correspond to records being named as "NatureScene1" indicates a morning video clip of a lakeside, "NatureScene2" may be an afternoon video clip of a lakeside, and "NatureScene3" may be a night time video clip of a lakeside. Furthermore, video clips in an event can be named similarly, i.e., Event1Clip1 and Event1Clip2, or NatureScene1Clip1, NatureScene1Clip2, etc. For example, "School Play1 Video Clip2"; and "School Play 1 Video Clip2". Similar labeling can include, Event1Snap1 and Event1Snap2. In yet another embodiment, a video clip of a nature scene can be labeled [Event Name] #scene [Name], for example: 1 . . . 2 . . . 3, etc., where [Event Name] corresponds to any base name and [Name] corresponds to any scene name.

It should be noted that a user can enter a name before or after recording of a particular event has started. For example, a user can press the record control 156 and then (after recording has started) activate the event control 201 and enter a name for the event as described above.

Alternatively, the user can assign a name for a folder, in which case the naming will be as follows: AssignName1 and AssignName2. Thus, in this example, the folder could be labeled SchoolLecture1 and SchoolLecture2. The video clips inside the folders may then be labeled: AssignName1Lecture1 and AssignName1Lecutre2. For example, SchoolLecture1MathLesson1 and SchoolLecture1MathLesson2, with both math lessons (MathLesson1 and MathLesson2) being in the same folder, SchoolLecture1. Snaps may be labeled similarly.

It is significant to note that if the media is copied from an outside source into a folder; i.e., from a standard camera into this app using an SD card or similar, the folder name will be prefixed to the existing name. In one embodiment, AssignName1Video1 and AssignName1Video2 could be the name of video clips copied from an outside source.

Furthermore, if the video clip is copied from a first folder to a second folder, the old folder prefix is removed and the new folder is inserted. Thus, OldfolderName1Clip1 becomes NewfolderName1Clip[X], where X is one greater than the highest numbered clip in the folder. For example, if SchoolLecture1MathLesson1 is the highest number clip name in a folder, the next clip copied into the folder will be named SchoolLecture1MathLesson2. Such labeling schemes help the operator, or members of a network 1300, to better organize the video clips.

Turning to FIG. 12, the relationship between an event 1200 and sub-events 1202a and 1202b is depicted.

Figure 13:
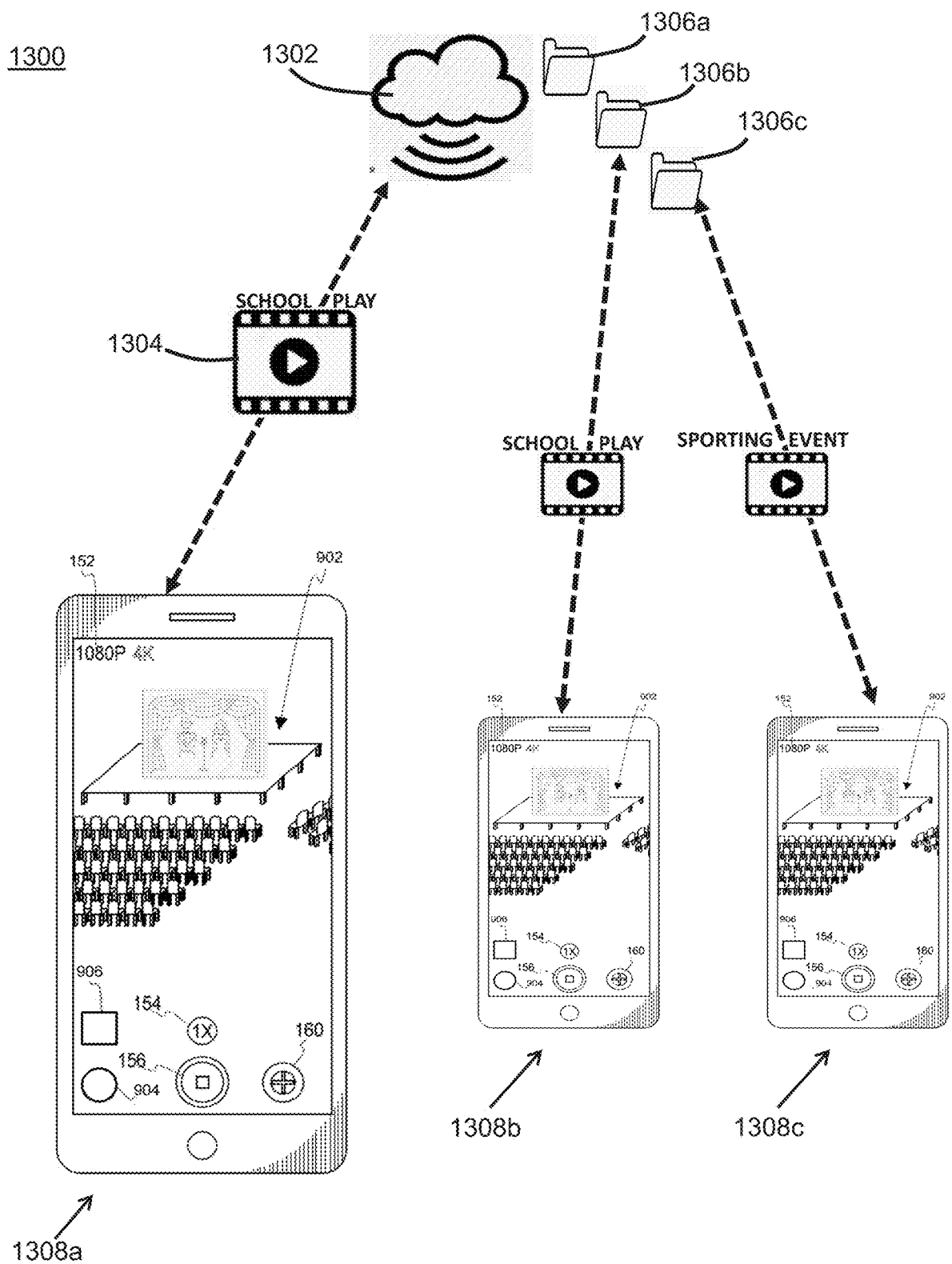
FIG. 13 is a block diagram of a network for multiple video recording systems to access an event-labeled video steam from a remote data storage unit.

Turning to FIG. 13, the video recording system 900 is also unique in that the event-labeled video stream 1304 is securely storable for organized identification and access by the operator, or members of a network 1300. In one embodiment, the event-labeled video stream 1304 stores directly into the storage device 208 that is coupled to the video processor (See FIG. 3).

The storage device 208 used by the video recording system 900 may include a FLASH memory. Although the primary limitation is that the write speed of the storage is sufficient for the frame rate that the video recording system 900 is operated. The amount of storage can vary, but 1 GB of storage can hold a bit less than 20 minutes of 1080P video at 60 FPS (frames per second). The FLASH memory modules may, for example, be UFS 3.1 FLASH memory or a similar type of FLASH memory that offers sufficient read/write performance. Furthermore, from the storage device of the video recording system 900, the event-labeled video stream 1304 can be saved on a USB, disc, UFS 3.1 FLASH memory, or other external storage device that offers sufficient read/write performance, as is known in the art.

Also, from the storage device, the event-labeled video stream 1304 can be directly accessed and viewed by the operator. The video stream may be viewable directly on the video recording system through a digital display 212, such as shown in FIG. 7. The display 212 can be, for example, a Liquid Crystal Display (LCD), an LED or an OLED display, or another type of display as long as the display is of sufficient resolution and refresh rate for the video camera operator to obtain a reasonable view of the scene that is being recorded. In certain implementations, the display 212 can be a touch-sensitive display, so that touch-sensitive input control components can be implemented as needed.

In a second possible video storage embodiment, the event-labeled video stream 1304 is manually transmitted to a remote data storage unit 1302 for storage thereon. In this storage configuration, the remote data storage unit 1302 is in communication with the storage device and/or the processor of the video recording system 900. In some embodiments, the remote data storage unit 1302 may include, without limitation, a cloud, a server, a database, a processor, a digital library, and a records storage site.

This remote transmission, storage, and organization to the remote data storage unit 1302 can be performed automatically, or through manual transmission of the video stream. For example, in automatic transmission, the event-labeled video stream 1304 is automatically transmitted and stored in the remote data storage unit 1302 without input from the operator. For example, integrated software in the storage device triggers the transmission of video streams to the remote data storage unit 1302 when the record control 156 is activated to begin recording video. Thus, when the record control is active, the video stream associated with the event 902 automatically transmits to the remote data storage unit 1302 for storage.

However, in other embodiments, it may be advantageous for the operator to manually initiate the transmission of event-labeled video stream 1304 to the remote data storage unit 1302. Thus, the video recording system 900 provides a remote storage control 906. The remote storage control 906 displays on the interface, adjacent to the event control 200 (See FIG. 13). The remote storage control 906 is configured for activation by the operator to manually initiate transmission of the video streams to the remote data storage unit 1302. Conversely, the operator can activate the remote storage control 906 to initiate transmission of the video streams from the remote data storage unit 1302 to the storage device in the video processor. In this arrangement, the event-labeled video stream 1304s transmit in both directions, per request of the operator.

The remote storage control 906 may include, without limitation, a hard button, a touch display on a smartphone, a voice control operable with voice recognition software, or another type of control. Thus, the video stream associated with the event 902 can be manually transmitted to the remote data storage unit 1302 through activation of the remote storage control 906.

Figure 10:
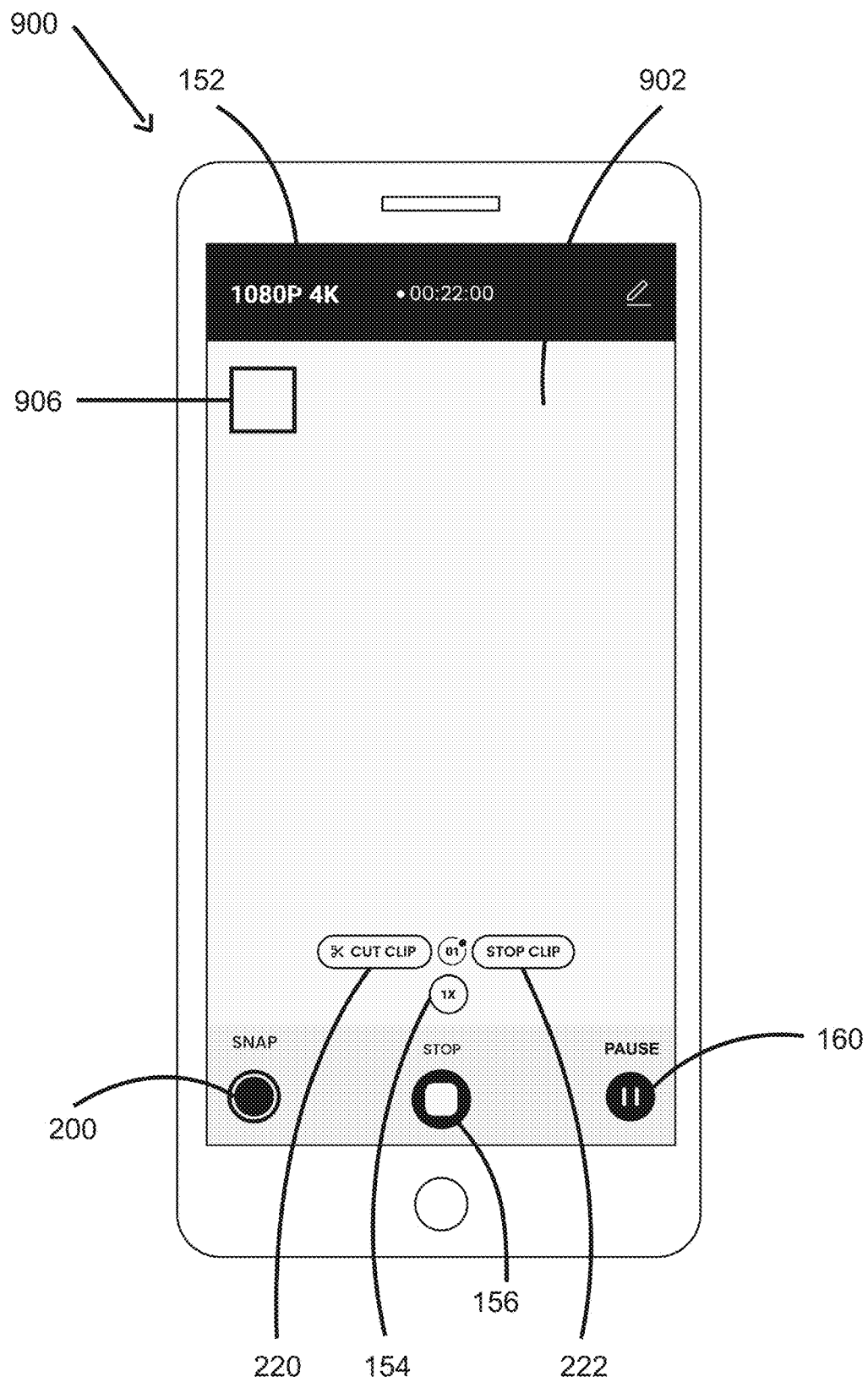
FIG. 10 is a screen shot view of the event being recorded by a video recording system.

As depicted in FIGS. 9 and 10, the remote storage control 906 is depicted with a logo of a cloud in the middle of a square control button when inactive, and an empty square when activated to transmit an event-labeled video stream 1304. It should be understood that many other representations of the remote storage control 906 and its active and inactive state can be utilized and still fall within the scope of the disclosed system and method. In addition, the transmission of content to a remote storage unit 1302 can be done entirely in the background; i.e., without any indication to the user at all.

Turning now to FIG. 13, the event-labeled video stream 1304 is not only stored but segregated in the remote data storage unit 1302. This helps organize the video streams for easy identification and access. Thus, the remote data storage unit 1302 is adapted to both, store and segregate the logical main stream of video that is labeled with the event name 1104. For this purpose, the remote data storage unit 1302 comprises multiple folders 1306*a-c*.

In one possible embodiment, the folders 1306*a*, 1306*b*, 1306*c* are configured to segregate multiple main video streams of video labeled with the event name 1104. The folders 1306*a-c* can themselves be labeled with indicia to differentiate between the different event name 1104*s* applied to the video streams contained therein. The folders can also be labeled with the event name 1104. A date and time stamp may also be associated with the folders to indicate when the video stream was created.

As referenced in FIG. 13, the video recording systems 1308*a*, 1308*b*, 1308*c* communicate with the remote data storage unit 1302, and with each other, through a network 1300. In some embodiments, the network 1300 may include, without limitation, an Internet, an IEE 802.11 wireless network 1300, a 4G cellular network 1300, a 5G cellular network 1300, and a wired network 1300.

Consequently, the network 1300 allows multiple members to remain in communication with regards to the event-labeled video streams. In this manner, multiple video recording systems 1308*a-c* may simultaneously access the video streams associated with the event 902 from the remote data storage unit 1302.

Continuing with FIG. 13, the network 1300 includes multiple video recording systems 1308*a-c* that are operated by different members of the network 1300. Any network member can share an event name 1104, so that other members can access the corresponding video stream. The network members can also access the remote data storage unit 1302 to download and view the video streams associated with the event name 1104. The event name 1104, or other labeling, i.e., name, time stamp, location, helps network members identify and access the desired video streams.

In another possible embodiment, the network 1300 is controlled by a network administrator who regulates access to the video streams that are stored and transmitted to and from the data storage unit 1302. This regulation can include recording the event 902, applying an event name 1104 to the event 902, and making the different event names and labeled video streams accessible to select members of the network 1300. For example, the network administrator may require a password or credentials before granting access to an event name; and thereby viewing the event-labeled video stream 1304. In another example, the administrator allows a sporting event to be made accessible to network members who pay a fee to watch.

In yet other embodiments, the network 1300 utilizes a network interface 214. The network interface 214 allows the event control 200 and the input control to be activated by a network command. For example, the network interface 214 can interface directly with the video processor 206 and even the image sensor 204, so that video can be directly streamed to the remote data storage unit 1302 via the network interface 214. In addition, certain other components, such as a microphone, may be present in the video recording system 900, but have been omitted for brevity and clarity.

Figure 14:
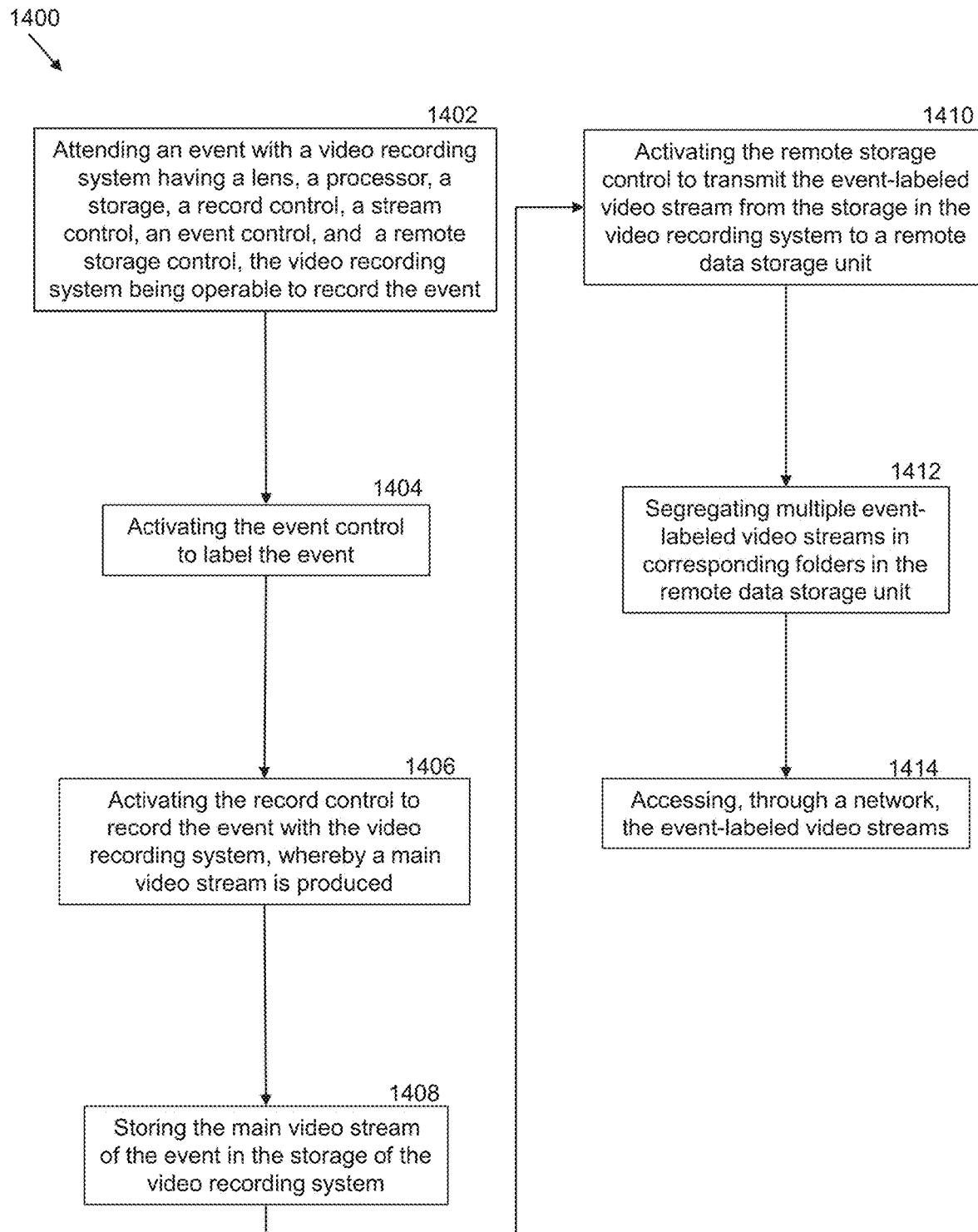
FIG. 14 is a simplified flow chart illustrating an exemplary method for associating a video recording to an event per this disclosure.

Turning to FIG. 14, a simplified flowchart depicts a method 1400 for associating a video recording to an event. The method 1400 may include an initial Step 1402 of attending an event with a video recording system having a lens, a processor, a storage, a record control, a stream control, an event control, and a remote storage control, the video recording system being operable to record the event. FIG. 3, a simplified block diagram of a video recording system 100 is depicted. In particular, the primary components of a video recording system 100 are depicted, whether the actual video recording system 100 is a smartphone, a digital camera, or a digital camcorder. Typically, the components of the video recording system 100 will reside in a body (not shown in this figure), although it is possible in certain implementations that different components can reside in separate enclosures, such as in the embodiment depicted in FIG. 7. At this point, the video recording system 900 is initiated, i.e., it is turned on; startup tasks are performed, etc.

The method may further comprise a Step 1404 of activating the event control to label the event. The event control 200 is activated by the operator to enable labeling of the event 902 with an event name 1104 to as user-defined specification. The event 902 is generally labeled prior to commencement of recording. This pre-recording labeling feature helps the operator in managing the labeling and organization of events while recording the video.

A Step 1406 includes activating the record control to record the event with the video recording system, whereby a main video stream is produced. The record control 156 allows the user to initiate the recording of video or cause the recording of video to pause or stop.

In some embodiments, a Step 1408 may include storing the main video stream of the event in the storage of the video recording system. The video recording system 900 is also unique in that the event-labeled video stream 1304 is securely storable for organized identification and access by the operator, or members of a network 1300. In one embodiment, the event-labeled video stream 1304 stores directly into the storage device 208 that is coupled to the video processor (See FIG. 3).

A Step 1410 comprises activating the remote storage control to transmit the event-labeled video stream from the storage in the video recording system to a remote data storage unit. In another embodiment, the remote storage control 906 is activated to transmit the event-labeled video stream to the remote data storage unit 1302 for storage. At this point, the main video stream is terminated, which is usually accomplished by the user pressing the record control 156 again to cease recording, as depicted in, for example, FIGS. 2*e* and 2*f*.

The method 1400 may further comprise a Step 1412 of segregating multiple event-labeled video streams in corresponding folders in the remote data storage unit. The video recording system 900, an event 1200 comprises one or more subevents 1202*a*, 1202*b*. The subevents 1202*a-b* are simply spliced sections of the video stream for the event 1200. Thus, the recorded event 1200 can be organized into smaller sections of video streams. The events 1200 and subevents 1202*a-b* can be stored in folders 1306*a-c* and subfolders for organizing the video streams in a desired configuration.

A final Step 1414 includes accessing, through a network, the event-labeled video streams. The network 1300 allows multiple members to remain in communication with regards to the event-labeled video streams. In this manner, multiple video recording systems 1308*a-c* may simultaneously access the video streams associated with the event 902 from the remote data storage unit 1302. A network administrator may be used to regulate access and organization of the event-labeled video streams. Thereafter, the video recording system 900 is turned off, ending the operation of the system.

As discussed above, the disclosed system is an effective video recording tool for operating the system 100. The disclosed recording instrument and software applications provide a user-friendly tool to record and edit videos that are labeled as events and subevents of the larger events. The disclosed features also allows the recorded videos and video clips to be shared on a network. Thus, with the disclosed system, an operator can easily record an event, and then edit and modify the video recording, such that the video clips or sections of the recording can be saved, viewed, and shared.

Figure 15:
FIG. 15 is a screenshot of a mobile communication device displaying multiple events.

For example, FIG. 15 is a screenshot of a mobile communication device 1500 displaying multiple events. The events listed include: A College Gathering event 1502, a My Summer Camp event 1504, an Emma Making Cake event 1506, and a James Wedding Anniversary event 1508. Further, a recorded icon 1510 indicates if the event has been recorded yet, or simply labeled in preparation for recording. As shown, the College Gathering event 1502 has been recorded and is ready for viewing.

Figure 16:
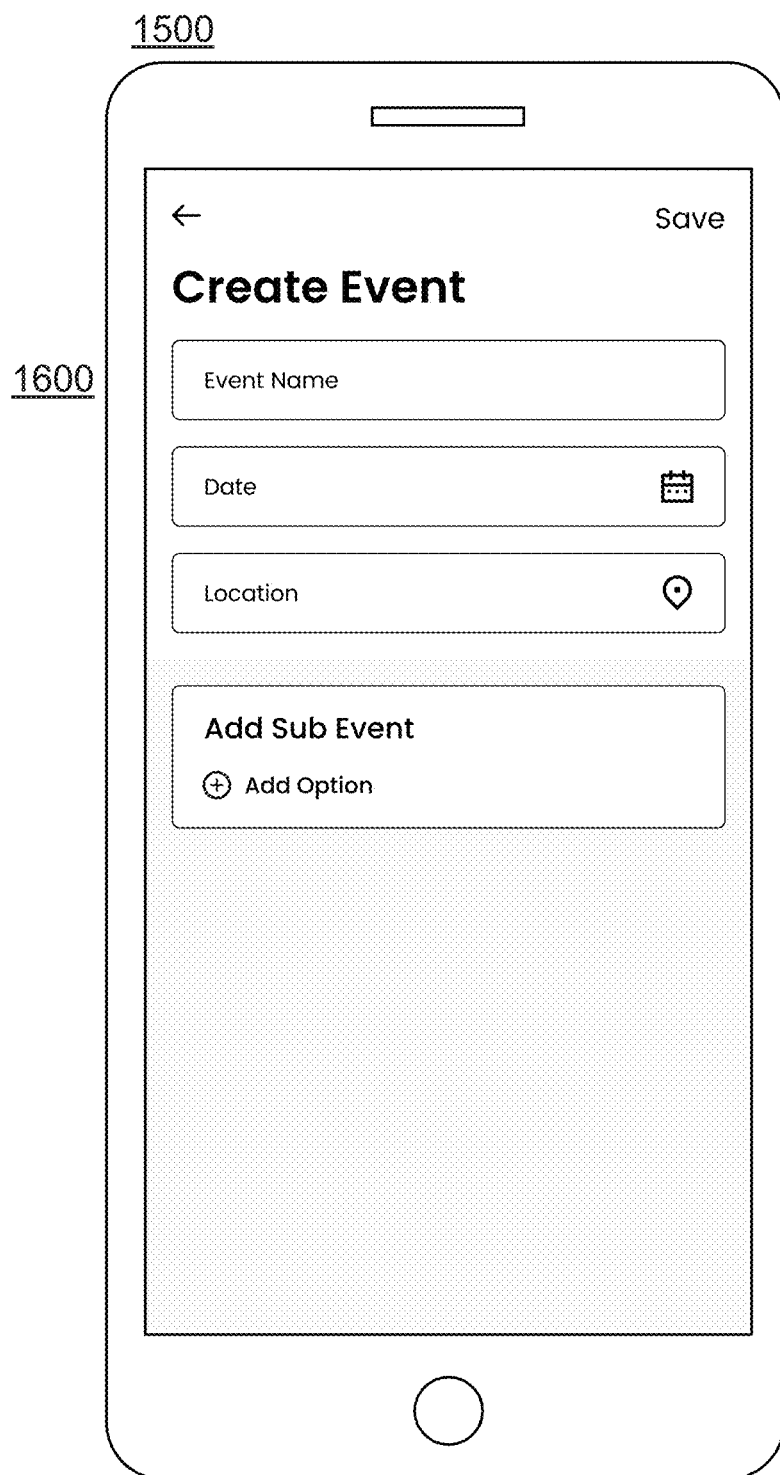
FIG. 16 is a screenshot of a mobile communication device providing an event text box to label the events.

The aforementioned events have user-defined labels. So, as FIG. 16 illustrates, a screenshot a mobile communication device 1500 constructed in accordance with this disclosure provides an event text box 1600 to label the events. The user can simply type in the desired name for the event to be recorded. A keyboard automatically appears to enable the typing function. Though in certain embodiments, a voice recognition function can be utilized.

Figure 17:
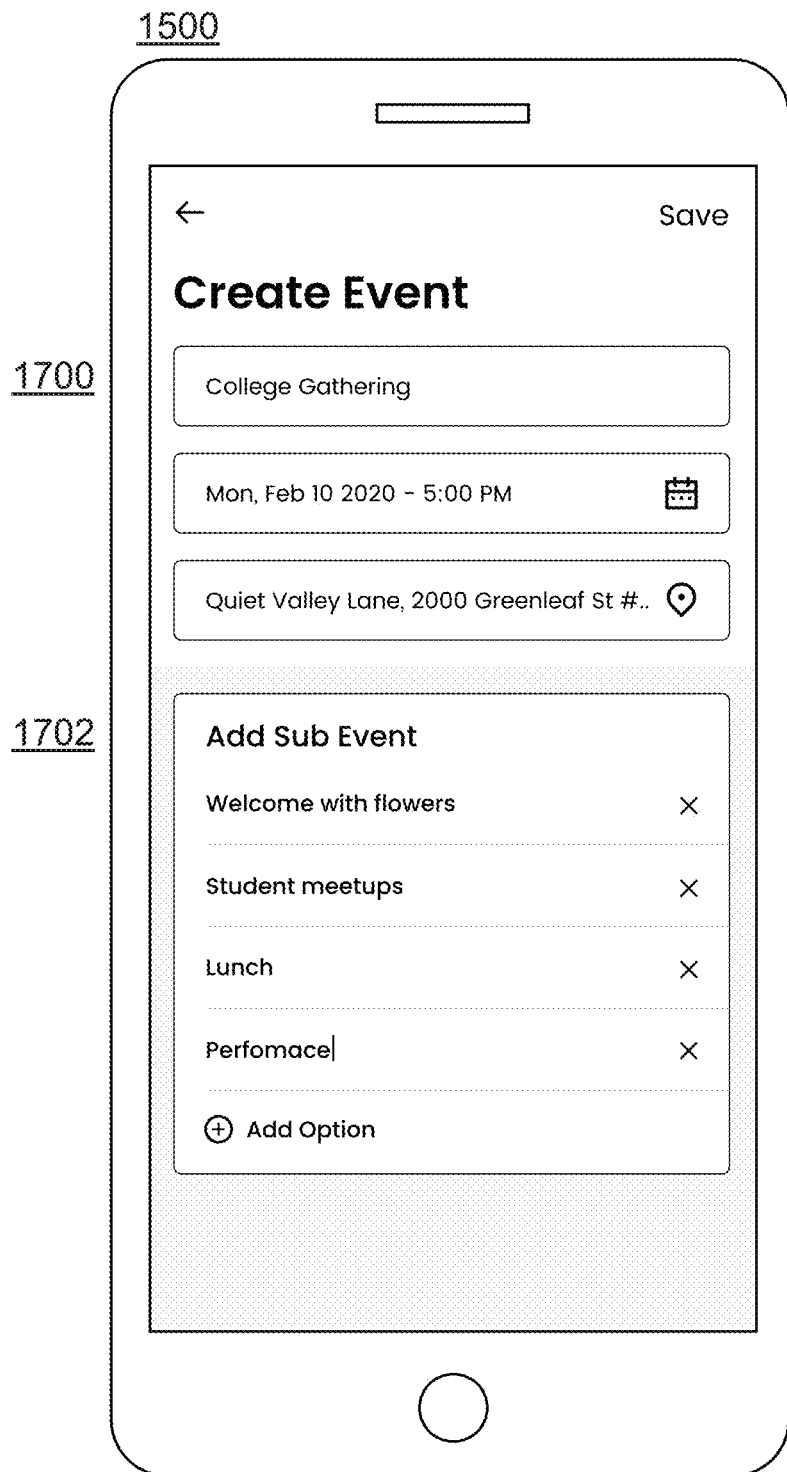
FIG. 17 is a screenshot of a mobile communication device displaying an event of a College Gathering, the location of the event, and the date and time of the event.
Figures 18, 18A:
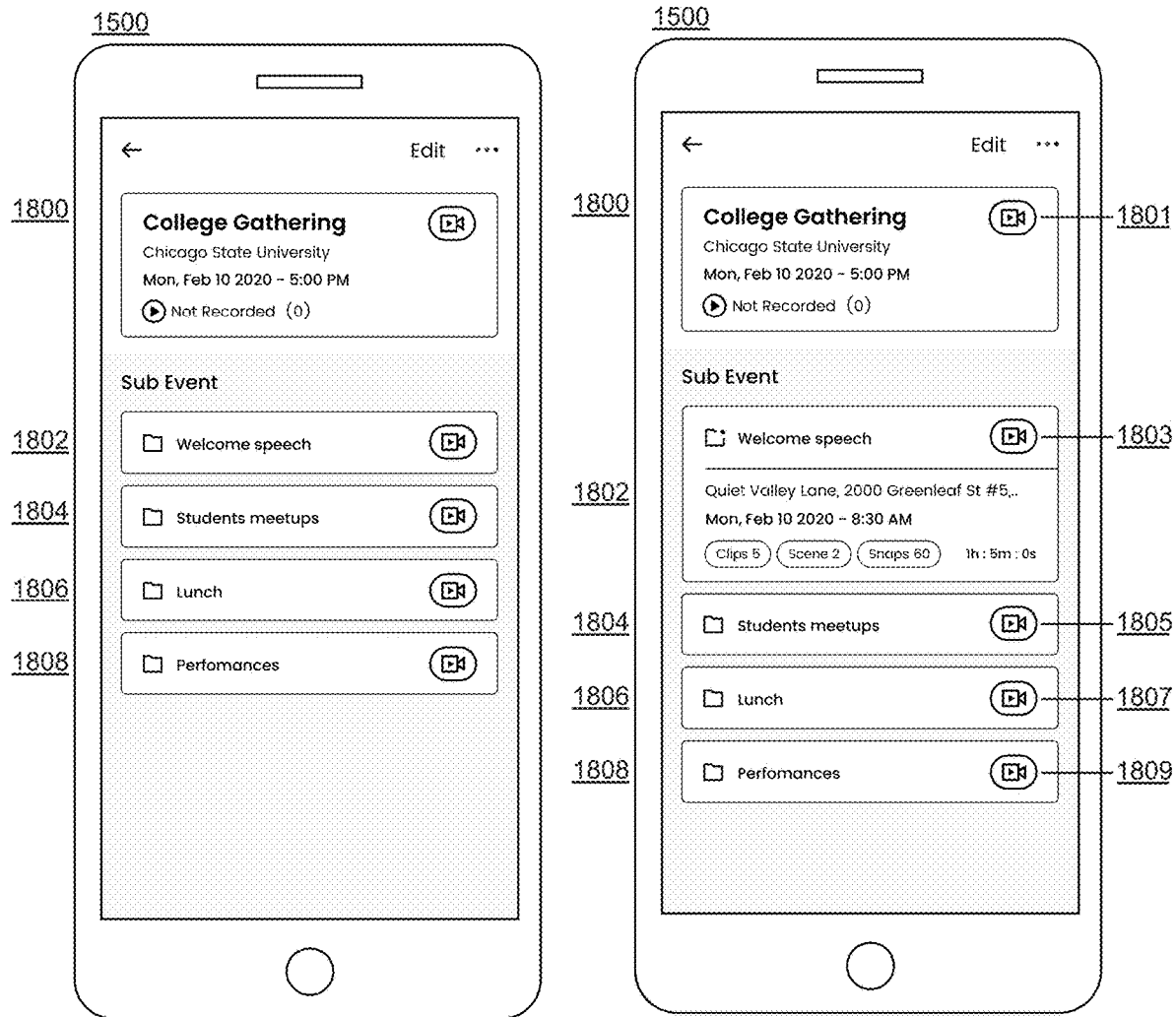
FIG. 18 is a screenshot of a mobile communication device displaying the subevents of the College Gathering event.
FIG. 18a is a screenshot of a mobile communication device displaying an expanded subevent of the College Gathering event.

FIG. 17 is a screenshot of a mobile communication device 1500 with the event of a College Gathering 1700, the location of the event, and the date and time of the event, which are displayed in the event text box. A subevent text box 1702 is also available to label the subevents, if any are used. FIG. 18 is a screenshot of a mobile communication device 1500 displaying the subevents of the College Gathering event. The event 1800 displays in detail, including location and time. The subevents for the College Presentation event are labeled: Welcome Speech 1802; Student Meetups 1804; Lunch 1806; and Performances 1808. Both the events and subevents are ready for viewing.

FIG. 18*a* illustrates one manner in which events and subevents can be assigned to specific clips. In particular, if a user presses the camera icon 1801 associated with the College Gathering event control 1800, the software application will immediately begin to record a clip associated with the College Gathering event. Similarly, if a user should press the camera icon 1803 associated with the Welcome speech sub event, the software application will immediately begin to record a clip associated with the College Gathering event and Welcome speech sub event. Similarly, if the user presses one of the camera icons 1805, 1807, 1809 associated with the student meetups subevent, lunch sub event, or performances sub event, the software application will begin to record the appropriate clip which will be associated with the appropriate sub event and the College Gathering event.

Similarly, if a user should start recording the College Gathering event by, for example, pressing on the camera icon 1801 next to the College Gathering event control, a main stream associated with the College Gathering event will begin recording. If the user should then press the cut clip control 220 (referring to FIG. 10), the main stream associated with the College Gathering event will continue to record while a label stream associated with the welcome speech subevent will begin to record. If the user should press the cut clip control 220 again the main stream associated with the College Gathering event will continue to record, the label stream associated with the welcome speech sub event will terminate, and a label stream associated with the student meetups sub event will begin to record. This can continue with the lunch sub event and the performances sub event, all of which were setup prior to the commencement of recording.

Figure 24:
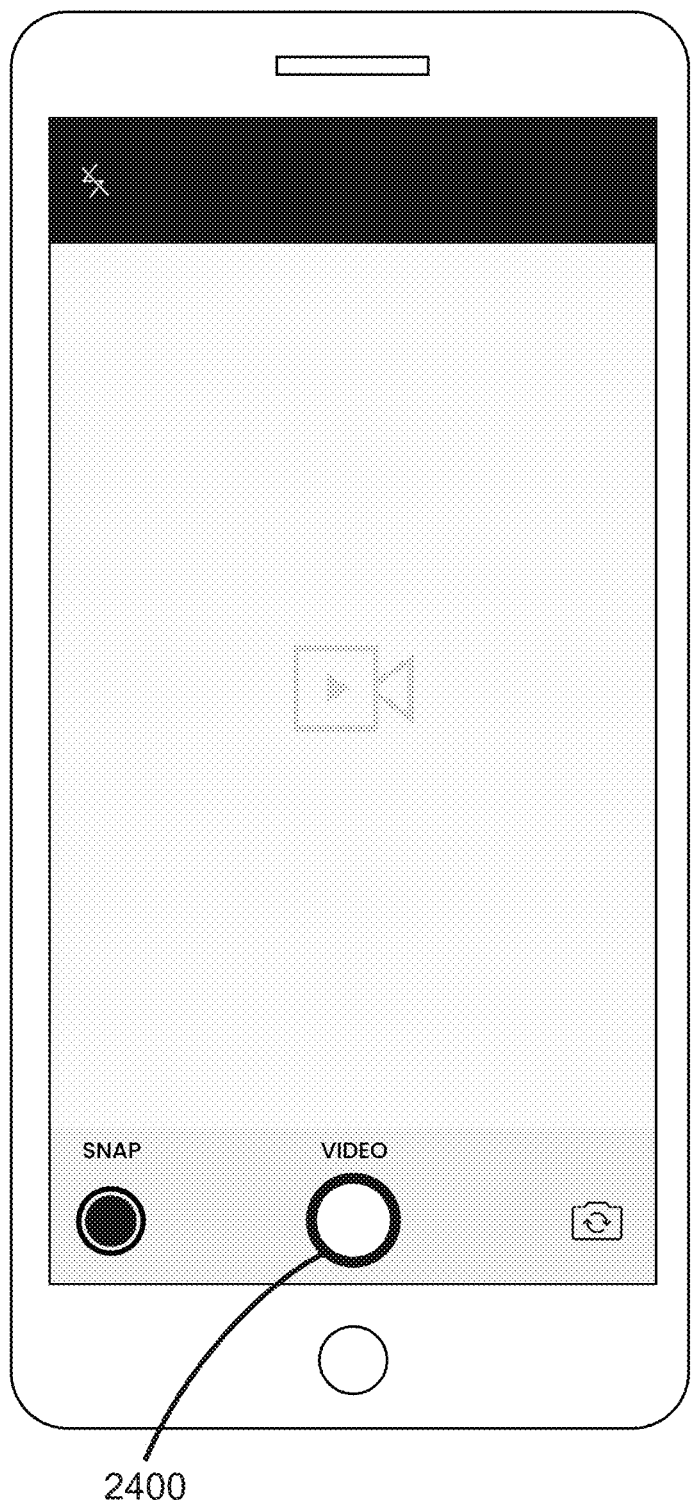
FIG. 24 is a screenshot of a mobile communication device displaying a recording, and offering the option to Stop Clip.

Similarly, referring to FIG. 24, if the record button 2499 is pressed (without pressing the camera icon 1801 associated with the College Gathering event control) the software application will record a main stream that can be associated with an event based on the time and location of the event. For example, if a location function places the recording device at or near Chicago State University and the record button is placed between 2 PM and 5 PM on Monday Feb. 10, 2020, the main stream can be associated with the College Gathering event. If the user should then press the cut clip control 220 (referring to FIG. 10), the main stream associated with the College Gathering event will continue to record while a label stream associated with the welcome speech subevent will begin to record. If the user should press the cut clip control 220 again the main stream associated with the College Gathering event will continue to record, the label stream associated with the welcome speech sub event will terminate, and a label stream associated with the student meetups sub event will begin to record. This can continue with the lunch sub event and the performances sub event.

Figure 19:
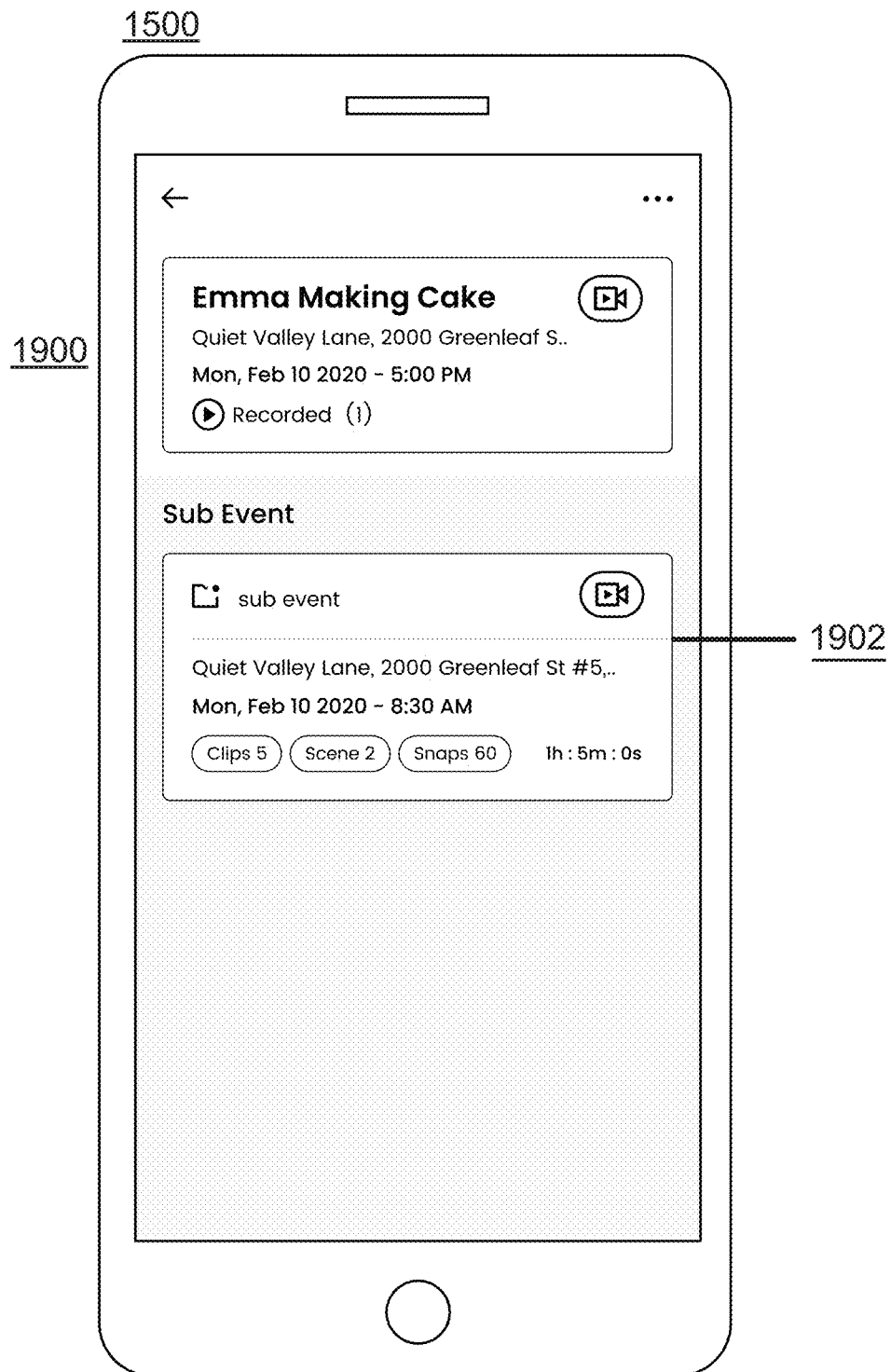
FIG. 19 is a screenshot of a mobile communication device with a fully entered subevent.
Figure 20:
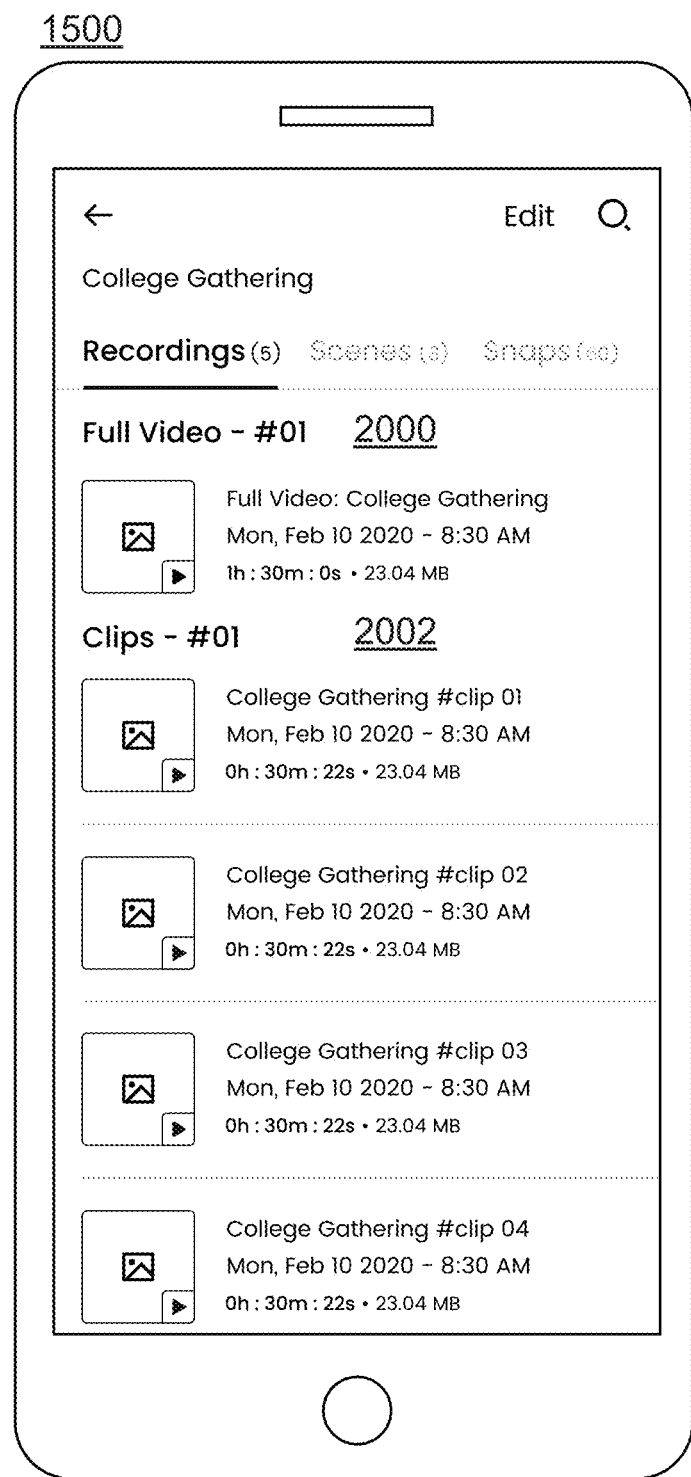
FIG. 20 is a screenshot of a mobile communication device displaying video recordings of the College Gathering event, including the main video, and clips of the video.

FIG. 19 is a screenshot of a mobile communication device 1500 with a fully entered subevent. The event 1900 is Emma Making Cake and includes a subevent 1902 (video clip) with an address, date, and time for the video clip. In some embodiments, a thumbnail image of the full recordings is displayed. For example, FIG. 20 is a screenshot of a mobile communication device 1500 displaying video recordings of the College Gathering event, showing the entire video 200, and clips of the video 2002.

Figure 21:
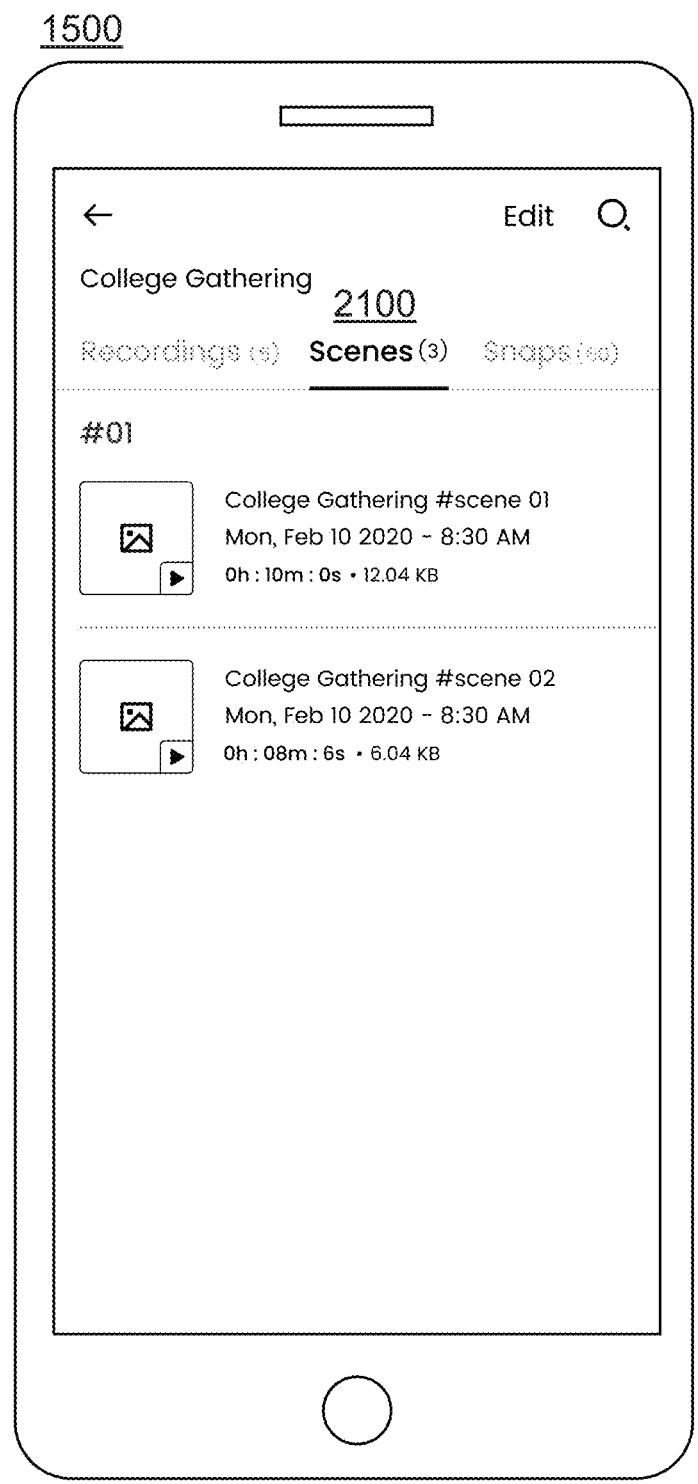
FIG. 21 is a screenshot of a mobile communication device displaying scenes of the recording for the College Gathering event.
Figure 22:
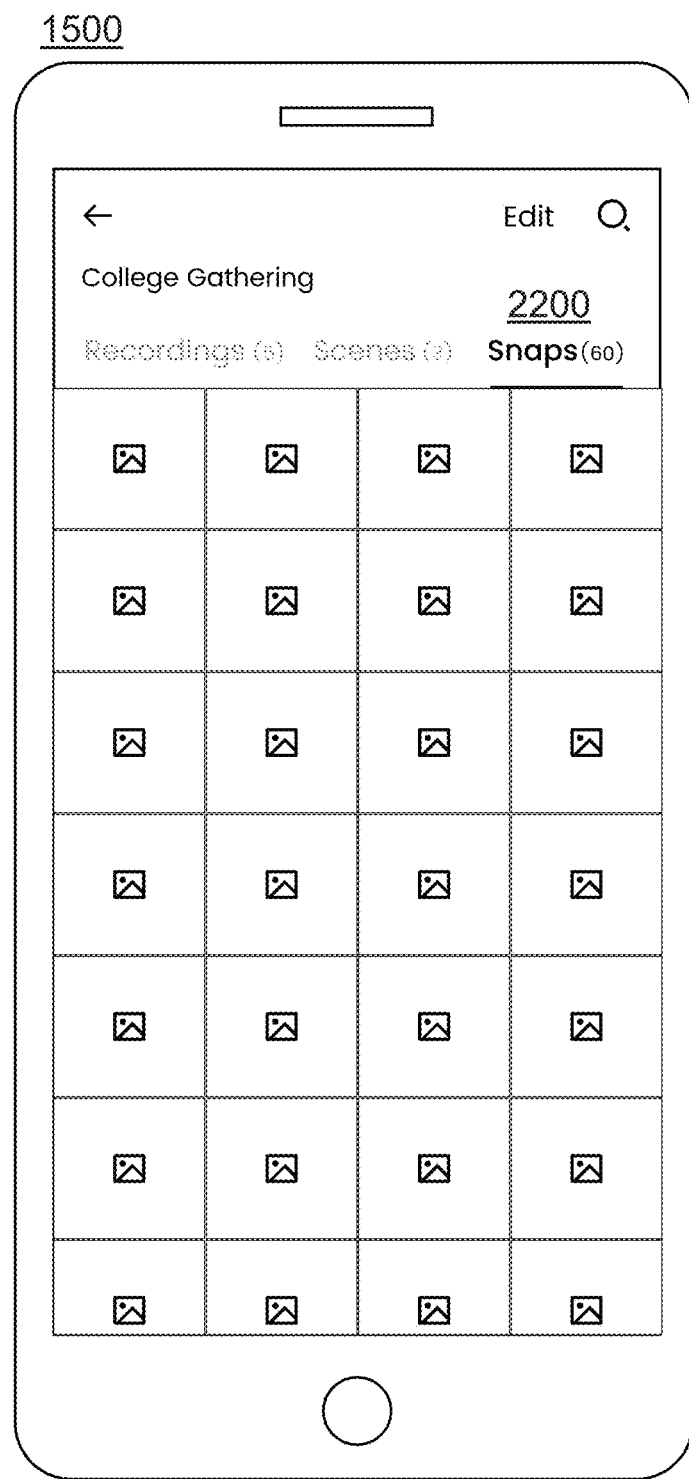
FIG. 22 is a screenshot of a mobile communication device displaying snapshot images of the College Gathering event.

Continuing, with the event and subevent displays, FIG. 21 is a screenshot of a mobile communication device 1500 displaying scenes 2100 of the recording for the College Gathering event 1700. And finally, FIG. 22 is a screenshot of a mobile communication device 1500 displaying snapshot images 2200 of the scenes of the recording for the College Gathering event. The thumbnails allow for quick identification of a desired recording or video clip.

Figure 23:
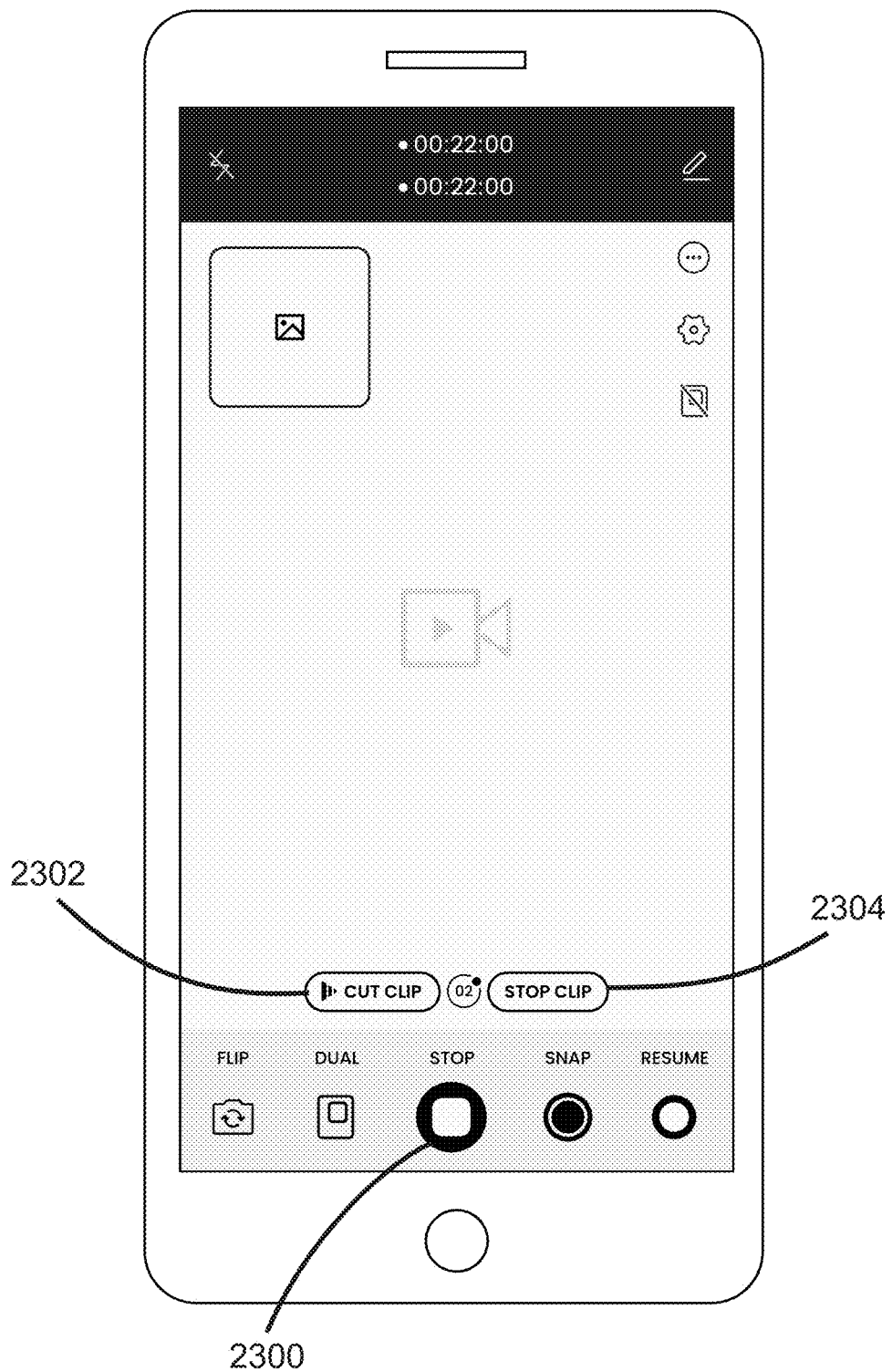
FIG. 23 is a screenshot of a mobile communication device displaying a Record button for recording the event, and also displaying a Cut Clip button that functions to end an old clip, and start a new clip of the recording.

FIG. 23 is a screenshot of a mobile communication device 1500 displaying a Record button 2300 for recording the event, and also displaying a Cut Clip button 2302 that functions to terminate an old clip; i.e., finalize the end pointer of the old clip to the point in time that the cut clip button 2302 is activated, and start a new clip recording; i.e., set the start pointer of a new clip to the instant that the cut clip button 2302 is activated. A stop Clip 2304 button allows the recording of the video clip to cease. It is significant to note that while Stop Clip button 2304 does stop the video clip, the main video stream continues to be recorded. Thus, in this configuration, the recording of the College Gathering event 1700 continues unimpeded. FIG. 24 is a screenshot of a mobile communication device 1500 displaying a Record button 2400 for recording the event without displaying the Stop Clip button.

Figure 25:
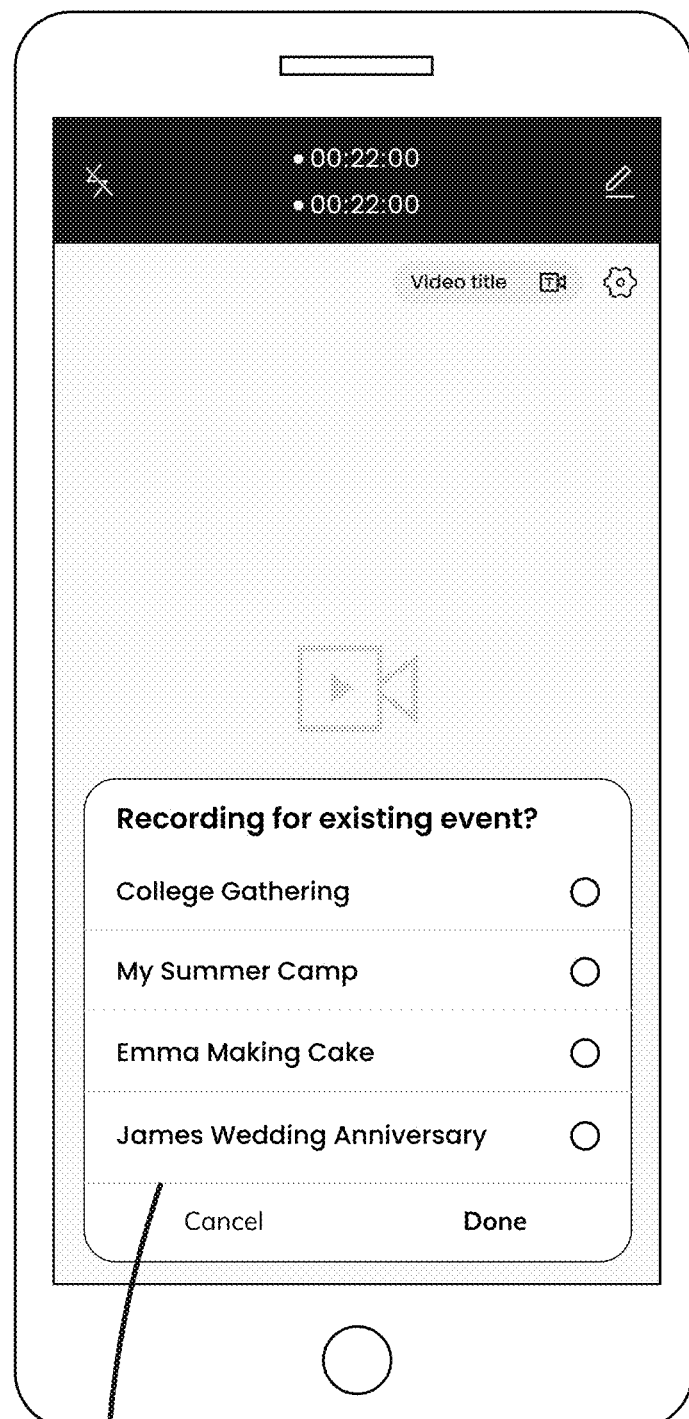
FIG. 25 is a screenshot of a mobile communication device displaying a pop-up box allowing a user to associate an event with a recording.

It is significant to note that the disclosed mobile communication device allows for recording from both the front and back side of the mobile communication device 1500 if such cameras are available. These dual recording views provide greater flexibility to the recording operator during production of the video. This also allows the recording operator to be seen in a selfie-styled video recording. For example, FIG. 23 shows the mobile communication device recording from the front facing camera. FIGS. 24-25 show the recording from the rear camera, as the College Gathering event 1700 is being recorded.

Finally, FIG. 25 references a screenshot of a mobile communication device 1500. As illustrated a pop-up event selection box 2500 appears during the recording, requesting the operator to indicate whether the present recording is for a prior created event. Specifically, the pop-up event selection box 2500 inquires whether the recording is for an existing event, or a new event. If for an existing event, the video recording may be spliced to the event for further processing, labeling, etc. Thus, this feature works to help the operator edit and label the recordings. These events can be gathered from the user's calendar, social media, or can have been setup manually in advance by the user. For example, a user's social media may have "College Gathering" with a date, time, and location corresponding to the date and time that the user is beginning the recording along with the user's location. Accordingly, "College Gathering" is offered as a possible event. Similarly, the user may have a calendar entry for attending "My Summer Camp" during the time period that the recording is being made, and accordingly, "My Summer Camp" is offered as a possible event. Similarly, the user may have created in advance the events "Emma Making Cake" and "James Wedding Anniversary."

As illustrated, the disclosed recording instrument and software applications provide a user-friendly tool to record and edit videos that are labeled as events and subevents of the larger events. The disclosed mobile communication device also allows the produced videos and video clips to easily be shared on a network. As depicted, a smartphone like device is shown; however, in other embodiments of the system, other types of cameras and video recording tools and apps may also be used, consistent with the described components and functions.

A third embodiment of a video recording system 2600 and method 3300 is referenced in FIGS. 26-33. The video recording system 2600, hereafter "system 2600" is operable with a camera that captures, stores, and displays images and videos; and then enables labeling sections of the video clips with a name. The system 2600 allows the camera to manipulate the capture and production of videos for viewing, network sharing, and rewinding; and then labeling the sections of video with a teleconference name in real time with a teleconference, and with a rewind name to a selected section along a video time line. Thus, a camera operator, or system user, is provided with a user-friendly camera feature that creates a main stream of video, or video clips thereof, and allows the video clips to be labeled in real time during a teleconference and while rewinding the video clips. This is accomplished through various controls accessible from the camera that enable voice commands, selective viewing of sections of the video clip, reminder messages, and other intelligent camera functionalities that work in harmony to create synergistic video recording, editing, viewing, and labeling functions.

In one unique feature of the system, a teleconference control allows multiple network members to teleconference in real time; and also label selected sections of the logical main video stream of the teleconference with a teleconference name in real time. Sections of the teleconference may be labeled with a teleconference name in real-time, and then subsequently reviewed. Such networking features also allow multiple video recording systems to operate on the same network.

In another unique feature of the system, a rewind control feature enables selective viewing and labeling of different scenes from the main video stream, or spliced video clip. The respective controls are activated to rewind the video along a video timeline. In one non-limiting embodiment, the video timeline comprises a non-linear timeline editor. A time stamp visually indicates the relative position of the video to the video timeline. The rewind control is activated by the system user to rewind the video clip for a selected duration, i.e., 5 seconds. The system user may label any section of the video timeline with a rewind name, and then selectively view that section of video.

Continuing with the unique features offered by the system 2600, a recording alert control is configured to automatically display a reminder message to a camera operator after determining that no recording has been initiated after a non-recording duration after the software application is activated. The recording alert control may be useful if camera operator forgets to initiate the record function or is unfamiliar with the recording functions of the camera.

Figure 26:
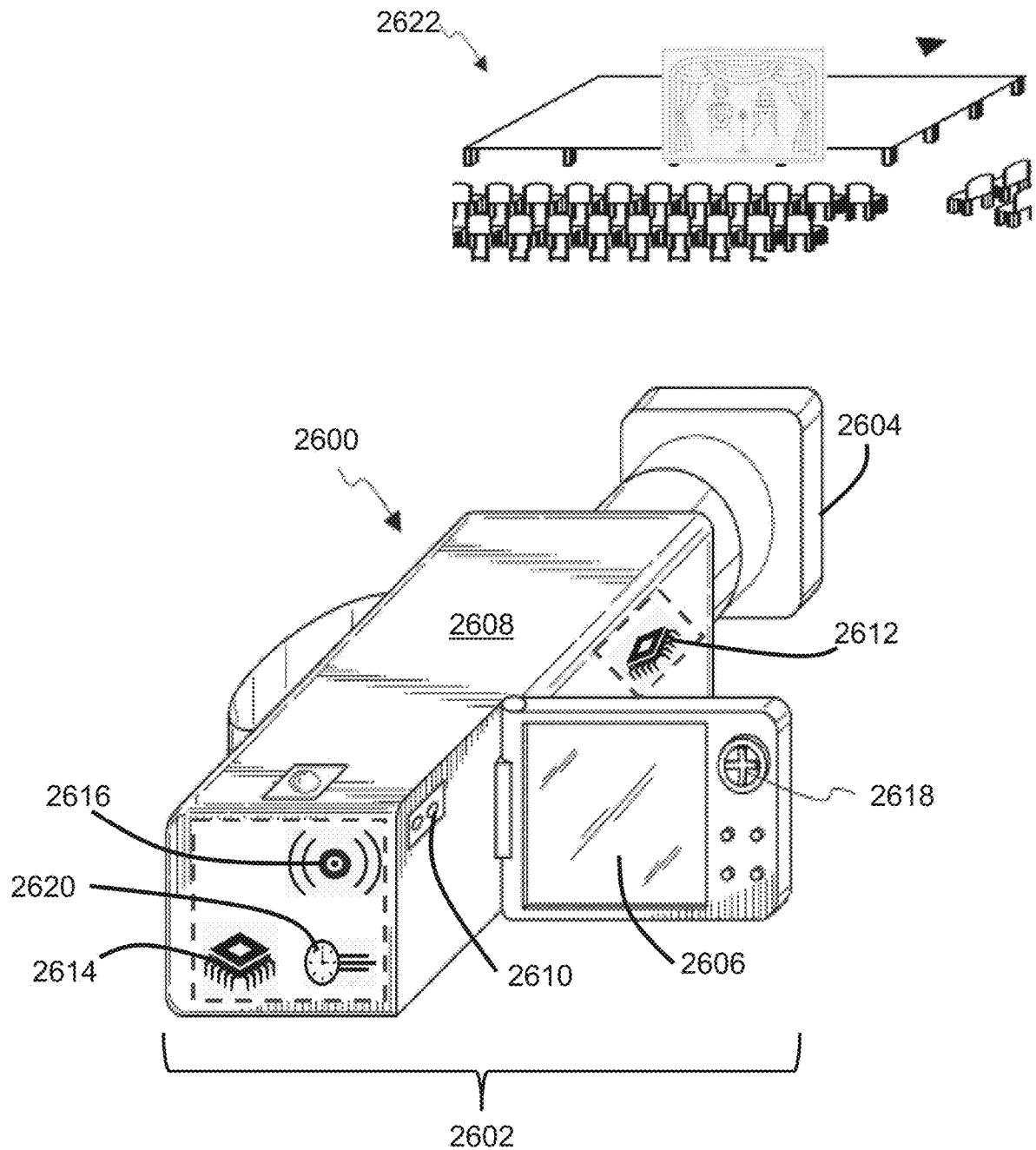
FIG. 26 is a perspective view of an exemplary camera recording an event.

Turning now to FIG. 26, the system 2600 comprises a camera 2602, though which the video is captured, edited, stored, and viewed. The camera 2602 is configured to position in proximity of an event 2622, so as to record an image or video of the event 2622. The subsequently produced stream of digital video data is then viewed, stored, and edited, as desired. In some embodiments, the event 2622 may include, without limitation, a calendar event, a user-generaterd event, a social media event, or a holiday event. As FIG. 26 references, the event 2622 is a school play that is being recorded with the camera 2602.

In some embodiments, the camera 2602 may be a digital video camera 2602. The camera 2602 has a body 2608, sized and dimensioned for ease of holding while recording. The body 2608 supports an image sensor 2616, as is known in the art of cameras. The image sensor 2616 produces a stream of digital video data upon activation of a record command from the camera 2602.

In some embodiments, the camera 2602 also includes a lens 2604 that is optically coupled to the image sensor 2616. The lens 2604 is configured to optimize capture of light for optimal recording of digital data that is produced into a main stream of video. In one non-limiting embodiment, the main stream of video comprises a logical main stream of video as set forth and described herein.

Continuing with FIG. 26, the camera 2602 may also have one or more switches/buttons 2618, and a digital display 2606 for viewing the main stream of video, or accessing the various controls, described below. The digital display 2606 may include, without limitation, a Liquid Crystal Display (LCD), an LED or an OLED display, or another type of display as long as the display is of sufficient resolution and refresh rate for the video camera operator to obtain a reasonable view of the scene that is being recorded.

In some embodiments, a video processor 2614 couples to the image sensor 2616. The video processor 2614 processes the stream of digital video data and produces digital video frame data. The digital video frame data comprises video-related data, i.e., images, colors, pixels, known in the art. A storage device 2610 couples to the video processor 2614. The storage device 2610 is configured to store the digital video frame data.

Once stored, the digital video data can be accessed for viewing, editing, sharing, and networking a main stream of video generated from the digital video frame data. In some embodiments, the storage device 2610 may include, without limitation, a USB flash drive, an internal solid state drive, a portable external hard drive, a network attached storage, a server, a database, a processor 2612, a digital library, a floppy drive, and a tape drive. The digital video frame data stored in the storage device 2610 may be transmitted to a remote data storage unit or processed directly in the camera 2602.

Continuing with the configuration of the camera 2602, a processor 2612 operatively couples to the storage device 2610. The processor 2612 is configured to maintain a main stream of video. The main stream of video is generated from the digital video frame data stored in the storage device 2610. In one possible embodiment, the main stream of video comprises a video timeline that is defined by a start pointer 2804a and an end pointer 2804b. The end pointer 2804b is continuously updated to point to the most recent digital video frame data stored in the storage device 2610 (See FIG. 28).

Figure 27:
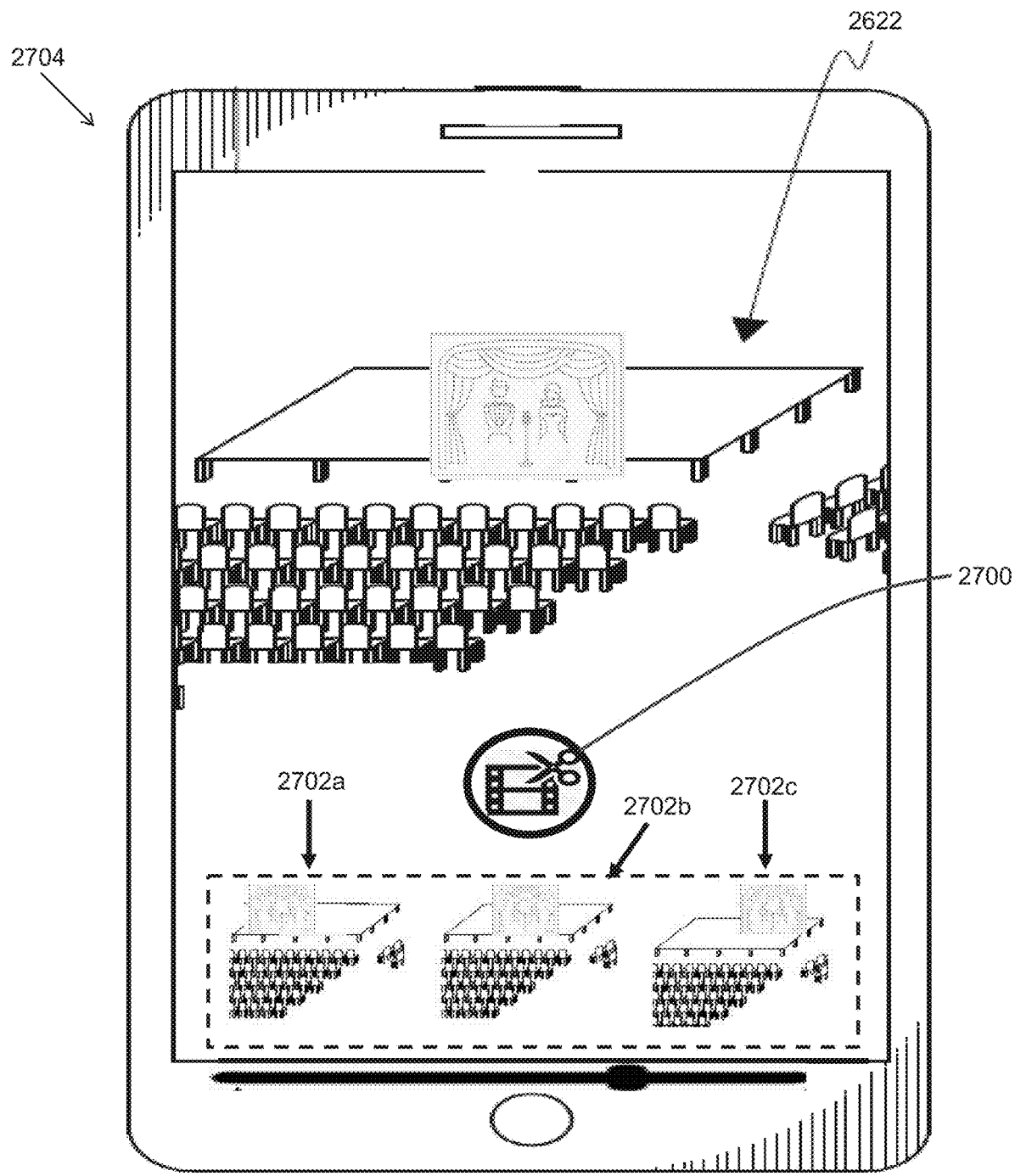
FIG. 27 is screenshot of a splice control cutting a main stream of video into multiple video clips.

FIG. 27 illustrates how the system 2600 enables the camera operator or system user to splice the main stream of video into multiple video clips 2702a-c for selective viewing, storage, editing, and labeling. The system 2600 may enable splicing of the main stream directly from a mobile communication device 2704, such as a smart phone, tablet, laptop, and the like. However, in other embodiments, the splicing function may also be performed directly from the camera. When accessed through the mobile communication device, a software application, or other end user program, allows for access and viewing of the main stream of video, along with access to the configured to a splice control 220 that is operatively coupled to the processor 2612; and thereby has access to the main stream of video.

Upon activation, through a touch screen button or mechanical switch/button, the splice control 220 allows the system user to splice the main stream of video into multiple video clips 2702a-c, and then label the video clips with a name. Thus, when the splice control 220 is active, a keyboard, such as a smartphone system keyboard, can appear to allow a stream name to be entered in a label name control 164, such as, for example, a text box. Once the name is selected, a done/save button can be pressed to save the name for the newly created label stream.

The splicing and labeling of the main stream of video is performed through various video editing means known in the art, including time stamps, slow motion video, deleting sections of video, and the like. Graphical slides, text entry, and other editing tools can be used to splice the main stream of video. In this manner, the system user can edit, re-splice, and otherwise customize the video clips 2702a-c through various video editing software known in the art. In this manner, the video clips 2702a-c can be arranged into any length or number that the system user desires. Finally, the spliced video clips 2702a-c can be labeled for easy access and appropriate content, as described above.

The splice control 220 allows the system user to customize the main stream of video into a narrative format, and then label the video clips. For example, multiple video clips 2702a-c consist of a video narrative for a medical procedure, such as a surgery. The video clips 2702a-c show different steps that a teacher or a main in the procedure follows. The video clips are initially created and labeled.

For example, a first video clip can be labeled "Incision", a second video clip can be labeled "Introducing Medical Device Into Incision", and a third video clip can be labeled "Sewing". By viewing the video clips 2702a-c, or selected video clips 2702a-c, a medical professional who has minimal experience in the medical procedure, or who needs to recall a forgotten the step of introducing a medical device into an incision, can selectively view the medical procedure video clip 2702a labeled "Introducing Medical Device"; thereby receiving instructions and lessons prior to performing the medical procedure.

In alternative embodiments, video clips 2702a-c can also be used to give instruction in other professional fields, such as auto mechanics, weaving, fishing, sporting lessons, and academic lessons. The splice control may be activated by a hard button, a touch display on a digital display, a joystick, or an iris sensor. However, as discussed below, a voice command, through a voice control can also be used for activation thereof.

Figure 28:
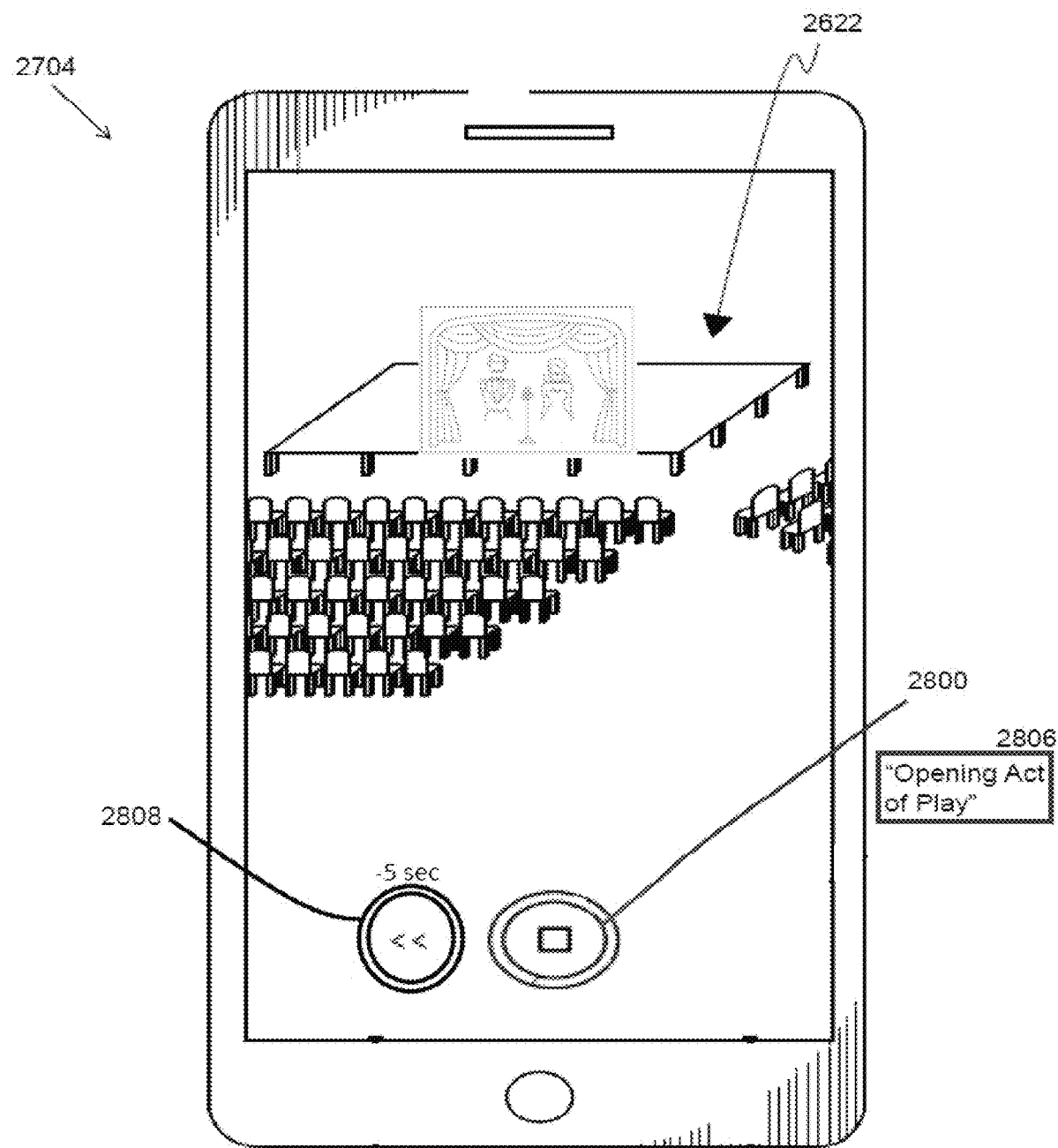
FIG. 28 is screenshot of a rewind control rewinding digital video frame data towards a start pointer of the video timeline.

Looking now at FIG. 28, the system 2600 provides a system user with the option of rewinding the main stream of video, so as to selectively label a video clip. The video clips may then be labeled with a rewind name 2806 to help identify desired sections of the video stream. For example, if a user forgets or is unable to create a new label stream when a particular act occurs (such as the opening act of a play) the user can create a new clip (using the cut clip control 2302 for example), and then go back a set period of time (such as five second) using the backup control 2808. The backup control 2808 is effective for allowing a user to create clips (or label streams) with a starting point that is actually earlier in time than the present moment, allowing the user to effectively capture the most important moments within label streams.

Upon activation, the backup control 2808 is adapted to rewind the starting point of a label stream. In one non-limiting embodiment, the backup control 2808 is configured to rewind the digital video frame data about 5 seconds, towards the start pointer of the video timeline. However, greater or lesser units of time may be rewound. Additionally, the digital video frame data can be rewound incrementally in seconds or minutes along the video timeline. The backup control may be activated by a hard button, a touch display on a digital display, a joystick, or an iris sensor. However, as discussed below, a voice command, through a voice control can also be used for activation thereof.

Figure 29:
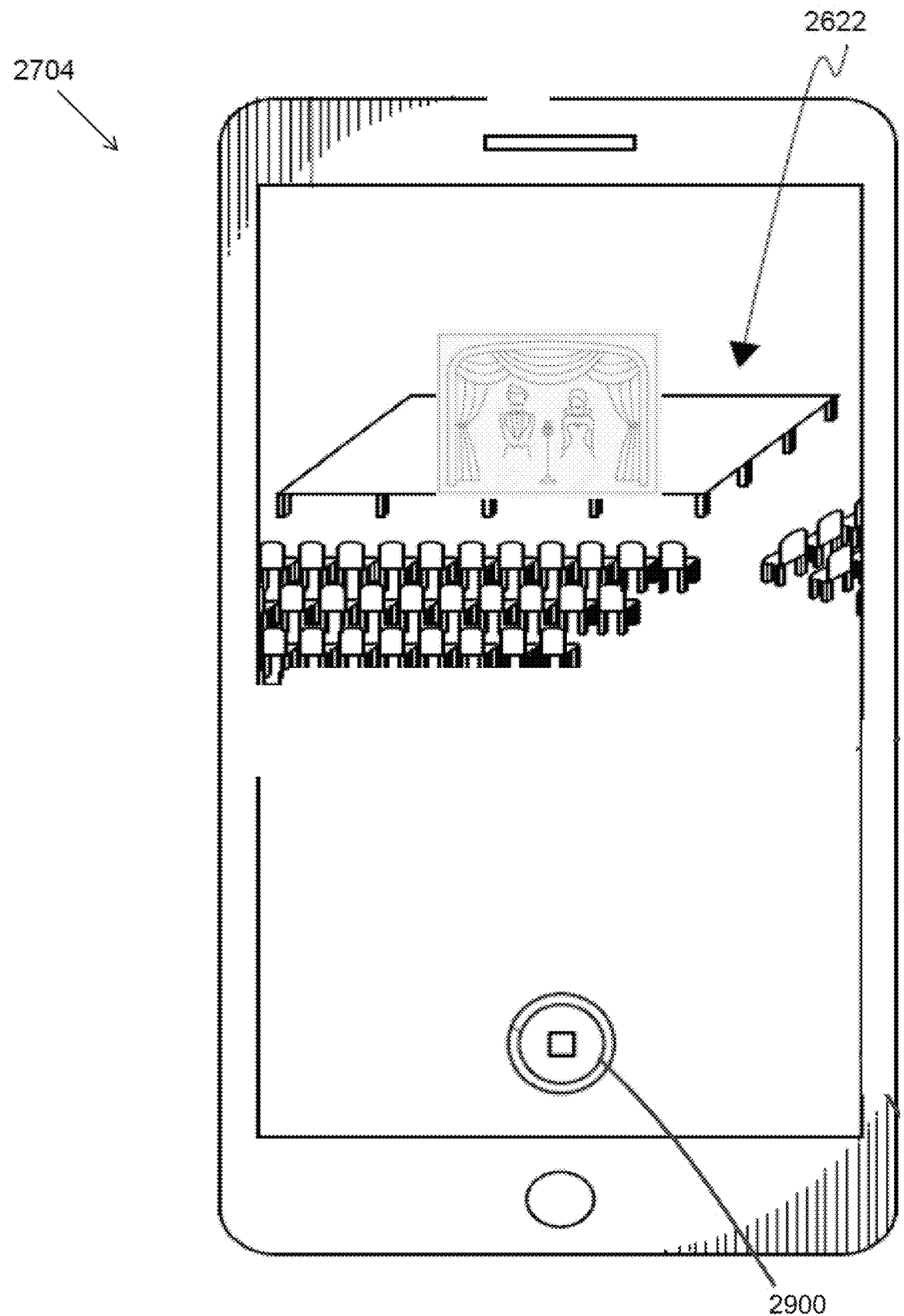
FIG. 29 is a screenshot of a software application displaying a record control

Also, upon activation of the backup control 2808, a desired section of video, or video clip, may be labeled with a rewind name 2806 for subsequent identification and facilitated viewing. The labeling function of the backup control 2808 occurs when, upon activation of backup control 2808, a second logical stream of rewound video is created. The second logical stream of rewind video is the video section where the main stream of video was rewound. FIG. 29 depicts a screenshot of the software application without the backup control 2808.

Figure 30:
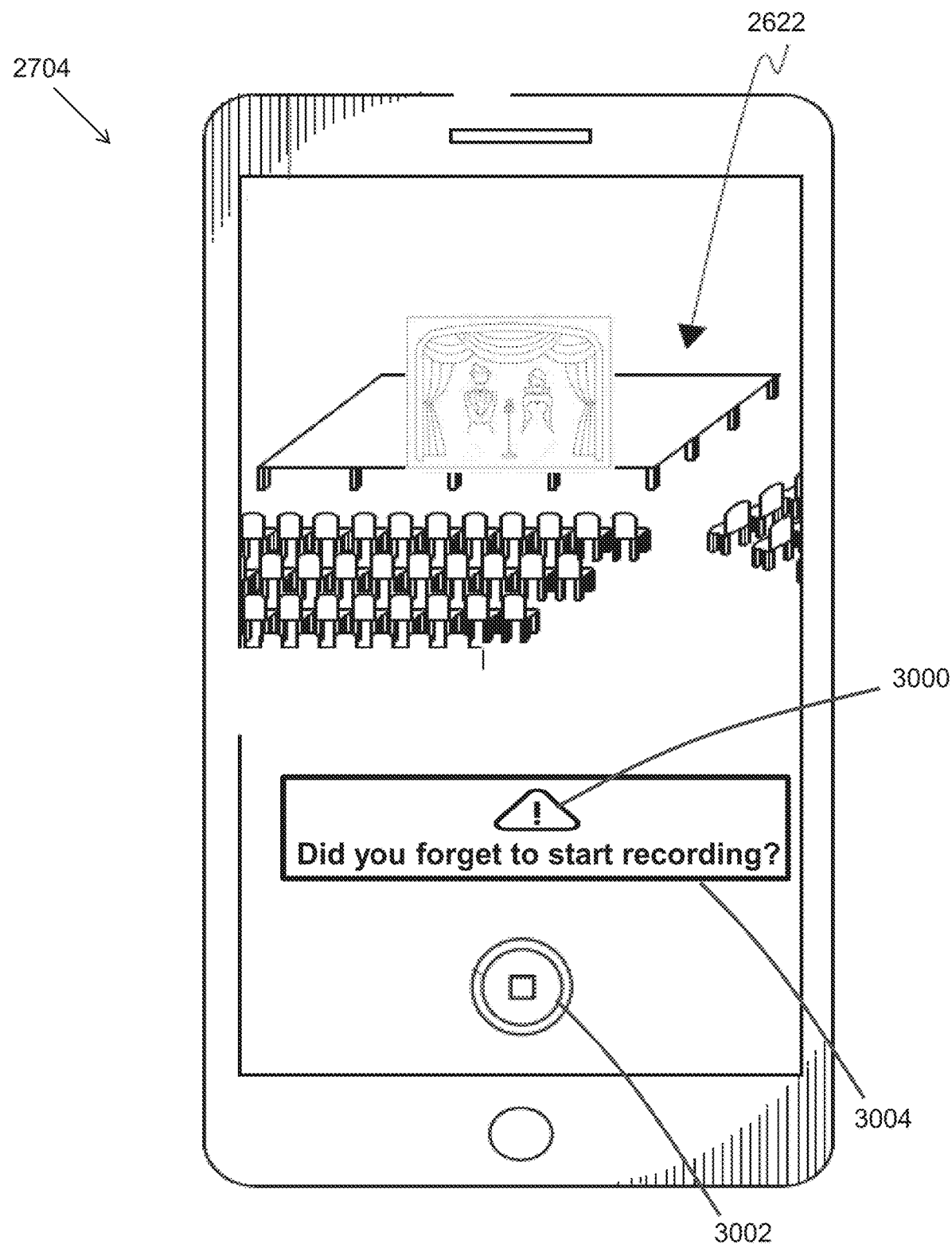
FIG. 30 is screenshot of a recording alert control automatically alerting a camera operator that the recording feature is not being employed.

Turning now to FIG. 30, the system 2600 also utilizes intelligent functions that help the camera operator record optimal videos with minimal setbacks. It is known in the art that operating a camera (e.g., manipulating the camera so as point the lens at a scene, and/or adjusting camera settings or components) without activating a record or image capture component is a wasted endeavor. Unfortunately, this step is often overlooked due to a hectic environment, or attention to other video capturing features, such as lighting and image focus. It would then be useful to remind the camera operator to activate the record control.

For example, the system 2600 provides a recording alert control 3000 that is configured to automatically remind, or alert, the camera operator that the recording feature is not being employed, after a duration of time. The camera operator may then activate a record control 3002 to initiate recording of the event. Similar to the other controls, the recording alert control operatively couples to the processor. In operation, after a non-recording duration. In one non-limiting embodiment, the non-recording duration is between 5 to 10 seconds. After the non-recording duration, the recording alert control 3000 actuates the display of a reminder message 3004 to the camera operator. Thus, the recording alert control displays the reminder message 3004 after the software application is opened, and no recording occurs.

The reminder message 3004 comprises a statement to the camera operator to produce the digital video frame data, i.e., activate the recording function. The reminder message 3004 indicates to the camera operator that the camera is not recording, even though the software application has been activated, or even after the camera has been operated in a manner that would indicate a desire to record.

The reminder message 3004 may include a dialogue box that appears on the digital display of the camera. The dialogue box could display a question, such as "Did you forget to start recording?". The reminder message 3004 may also include an audible alert, an illumination, a phone call, a text, an email, or other alert mechanism known in the art. The recording alert control 3000 may be activated by a hard button, a touch display on a digital display, a joystick, or an iris sensor. However, as discussed below, a voice command, through a voice control can also be used for activation thereof.

Figure 31:
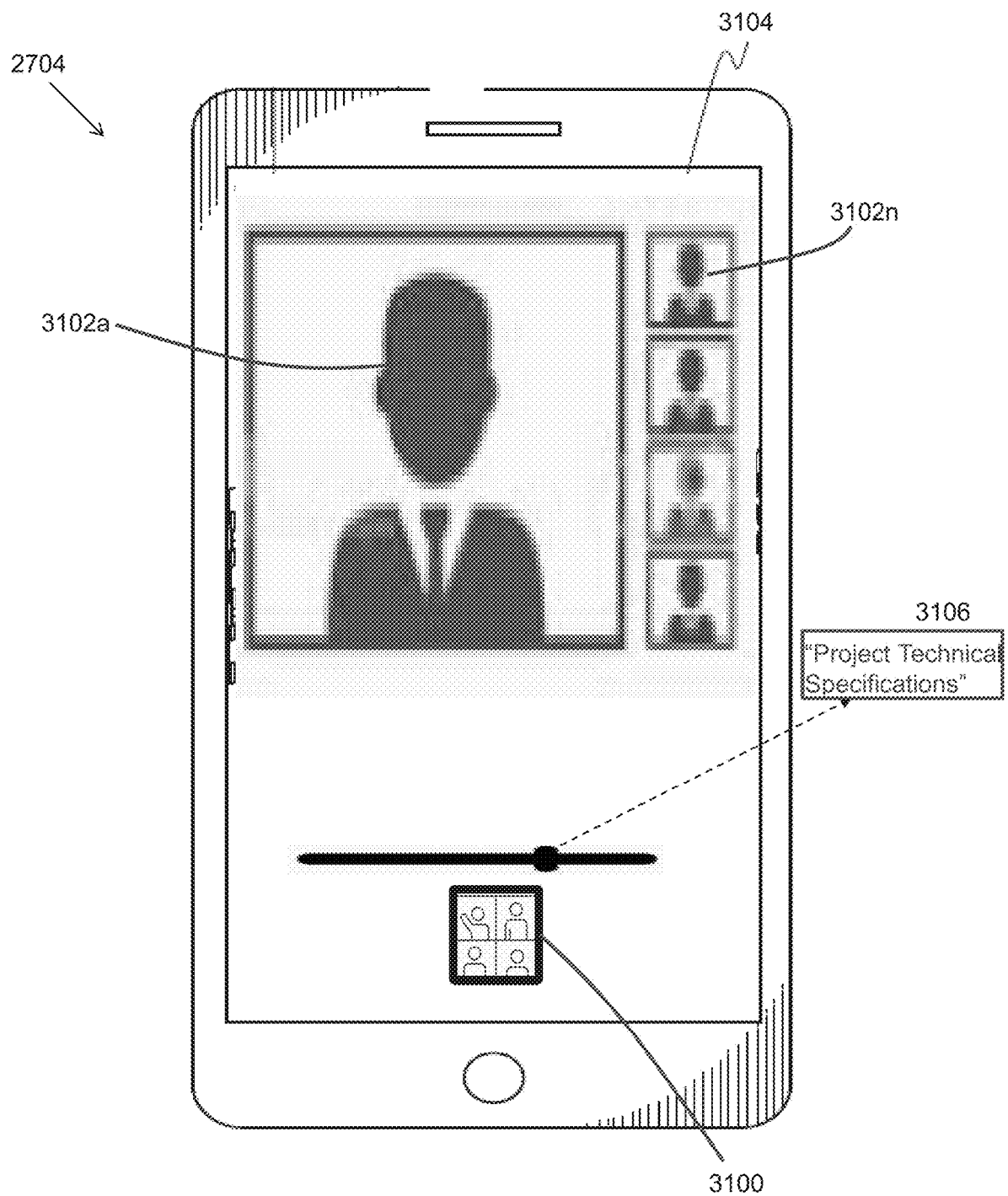
FIG. 31 is screenshot of a teleconference control initiating communications between multiple network members on a network.

As shown in FIG. 31, the system 2600 comprises a teleconference control 3100 that initiates a network communication 3104 between multiple network members 3102*a-n* on a network. The teleconference control 3100 also enables labeling sections of the networking communication in real time with a teleconference name 3106. Thus, as the networking communication 3104 progresses, the system user may label user-generated video clips along the video timeline for subsequent identification and viewing.

The teleconference control 3100 is operatively coupled to the processor 2612, such that the main stream of video generated during the network communication 3104 is accessible for processing and initiating. In one possible embodiment, the network members 3102*a-n* are disposed remote from one another and are linked by a telecommunications subsystem. In some embodiments, the networking communication may include a teleconference, a video-styled meeting, a screen recording, and other commercially known video meeting programs, like Zoom™, Microsoft Team™, and the like.

In operation, a camera operator activates the teleconference control 3100 and activates a record feature with the camera to record a speaker. The video of the speaker is then shared in real time, i.e., live with the network members. Any of the network members can create and label a video clip for future viewing, or to transmit to network members not available at the teleconference.

Additionally, multiple network members can record on individual systems to create a simultaneous conference in which network members view each other or share files between each other. Further, the entire main stream of video can be shared, or video clips can be shared live, or delayed. In yet another embodiment, the network members can determine which video clip to hide from other network members, so as to enable selective admittance into portions of the teleconference.

Upon activation of the teleconference control 3100, streams of digital video data produced by one or more network members 3102*a* are streamed for viewing by any of the other network members 3102*n*. The teleconference control 3100 also displays the subsequently generated main stream of video between the network members 3102*a-n*, so that the network communication 3104 may be viewed, edited, stored, and shared at a later time. The stored main stream of video can be recorded and edited at a later time.

Also, upon activation of the teleconference control 3100, a desired section of video, or video clip, is created and labeled with a teleconference name 3106 for subsequent identification and facilitated viewing. The labeling function of the teleconference control 3100 occurs when, upon activation of the teleconference control, a second logical stream of teleconference video is created through activation of the teleconference control 3100.

The second logical stream of teleconference video is the main stream of video for the network communication 3104 between the network members 3102*a-n*. For example, if the teleconference control 3100 is activated a first time during the network communication 3104, the main stream of video initiates a starting point along the video time line of the network communication 3104. The second logical stream of teleconference video comprises a second start pointer that is adapted to be set to the value of the end pointer of the logical main stream at the time that the second logical stream of rewind video is created. The second starter point is the initial point where the video clip of the network communication 3104 starts.

Further, the second logical stream of video further comprises a second end pointer. The second end point is the terminal point where the video clip of the network communication 3104 ends. The section from the second started pointer to the second end pointer represents the video clip for the network communication 3104. The second starter pointer and the second end pointer are created in real time, i.e., live, during the teleconference. Thus, on activation of the teleconference control 3100 a second time, the second end pointer is adapted to be set to the value of the end pointer at the time that the teleconference control 3100 was activated the second time.

Additionally, on activation of the teleconference control 3100 a second time, the second logical stream of rewind video is labeled with a teleconference name 3106. The teleconference name 3106 is the label for the video clip between the second start point and the second end point. In one embodiment, a keyboard, such as a smartphone system keyboard, appears to allow the teleconference name 3106 to be entered in a text box. Though other text entry means, including voice activation, described below, may also be used.

For example, a network member 3102*a* initiates a live teleconference with other network members 3102*n* and records the teleconference in the second logical stream of teleconference video. The network member 3102*a* clicks the teleconference control 3100 to initiate the teleconference, while a video timeline of the teleconference displays to enable reference between starting and ending times for the teleconference. At a desired point along the video timeline, the teleconference control 3100 is clicked a first time to indicate the second start pointer. A video clip of the teleconference is now being generated. At the desired ending of the video clip, the system user may click the teleconference control 3100 a second time to indicate a second end pointer.

In one possible embodiment, a smartphone system keyboard appears to allow a teleconference name 3106 to be entered in a text box or other data entry component. The system user may then type in a teleconference name 3106, such as "Project Technical Specifications", for example. Thus, the video clip is labeled "Project Technical Specifications" for subsequent viewing and easy identification after the teleconference is completed.

It is also significant to note that the teleconference control function can be repeated multiple times along the video timeline 2802, so as to create multiple video clips with unique subject matter. This can help network members identify sections of the teleconference for subsequent viewing. This can also be useful for when some network members are not available at the teleconference. The labeled video clips can be emailed to the unavailable network members for consumption.

Turning now to FIG. 32, the video recording system comprises a voice control 3200 to further assist the camera operator, or system user, in operating the camera and functions thereof. The voice control 3200 allows for voice commands 3202 or other assigned sounds to activate controls and other features in the camera. In one possible embodiment, the voice control 3200 couples to a speech software development module, and to the processor. The speech software development module can also be operatively coupled to a microphone, speaker, or speech recognition algorithm.

Upon activation, the voice control 3200 is configured to receive a voice signal, such as a verbal command from a system user. Upon receiving the voice signal, the speech software development module parses the voice signal to obtain a voice recognition result. The speech software development module then determines whether the voice recognition result matches one or more operating parameters. The operating parameters comprise commands to control various controls and features of the video recording system.

For example, the voice command 3004, "Rewind" is linked with an operating parameter that activates the rewind control, which rewinds the time stamp on the video timeline 5 seconds; i.e., it rewinds the logical start pointer of the present clip being recorded by 5 seconds. By using the voice command, the system user is not required to search for and press the rewind control, which leaves more focus on recording the video. In some embodiments, the teleconference control, the rewind control, and the time skip control are operatively connected to the speech software development module. This allows all of the controls to be activated by voice command.

In one possible embodiment, the system 2600 further comprises a network interface. The network interface couples to the processor and the Internet. The network command activates the voice control, the teleconference control, the rewind control, and the time skip control. Through the network interface, various network members can control the same camera, or remote cameras, and controls thereof. The systems communicate with a remote data storage unit, and with each other, through a network. The network may include, without limitation, an Internet, an IEEE 802.11 wireless network, a 4G cellular network, a 5G cellular network, and a wired network.

FIG. 33 is screenshot of an automated recording control 3300 that enables recording of a video, while automating the splicing of the video into multiple video clips. The recording is continuous, but the different video clips are automated to start and stop at predetermined time intervals. Thus, a first video clip, a second video clip, and a subsequent video clip are generated and labeled without real time control from the user. Through the text entry keyboard, the user can preset the number of video clips, and durations thereof, prior to commencing the recording.

For example, a user activates automated recording control 3300 by engaging a digital button, switch, or control. The system then provides a first inquiry box 3302 that asks the user how many video clips are needed; a second inquiry box 3304 that asks how long each clip runs; and a third inquiry box 3306 that asks how long of a break between each clip. The user inputs the video clip parameter commands through a text entry keyboard, voice command, or other data entry means known in the art. After the inputs are processed, the video recording starts and the screen shows the video clips during recording, i.e., 1/10, 2/10, etc. Also shown is a timer 3308 that counts down the amount of time before a break (9:30, 9:29, 9:28, etc.). Once the timer 3308 expires a break starts and recording stops.

During the break, the screen shows a timer that indicates the length of the video clip, break, or duration before starting a new video clip. i.e., 0:57, 0:56, 0:55, etc. Once the break finishes, the next video clip starts recording, and the same process occurs with the showing of the video clip, the timer, and the subsequent break to indicate termination of the video recording. This automated creation of video clips can be repeated indefinitely. In one exemplary use, a teacher can record, organize, and selectively display lessons, as needed. The automated recording control 3300 may include, without limitation, a hard button, a touch display on a smartphone, a voice control operable with voice recognition software, or another type of control.

Figure 32A:
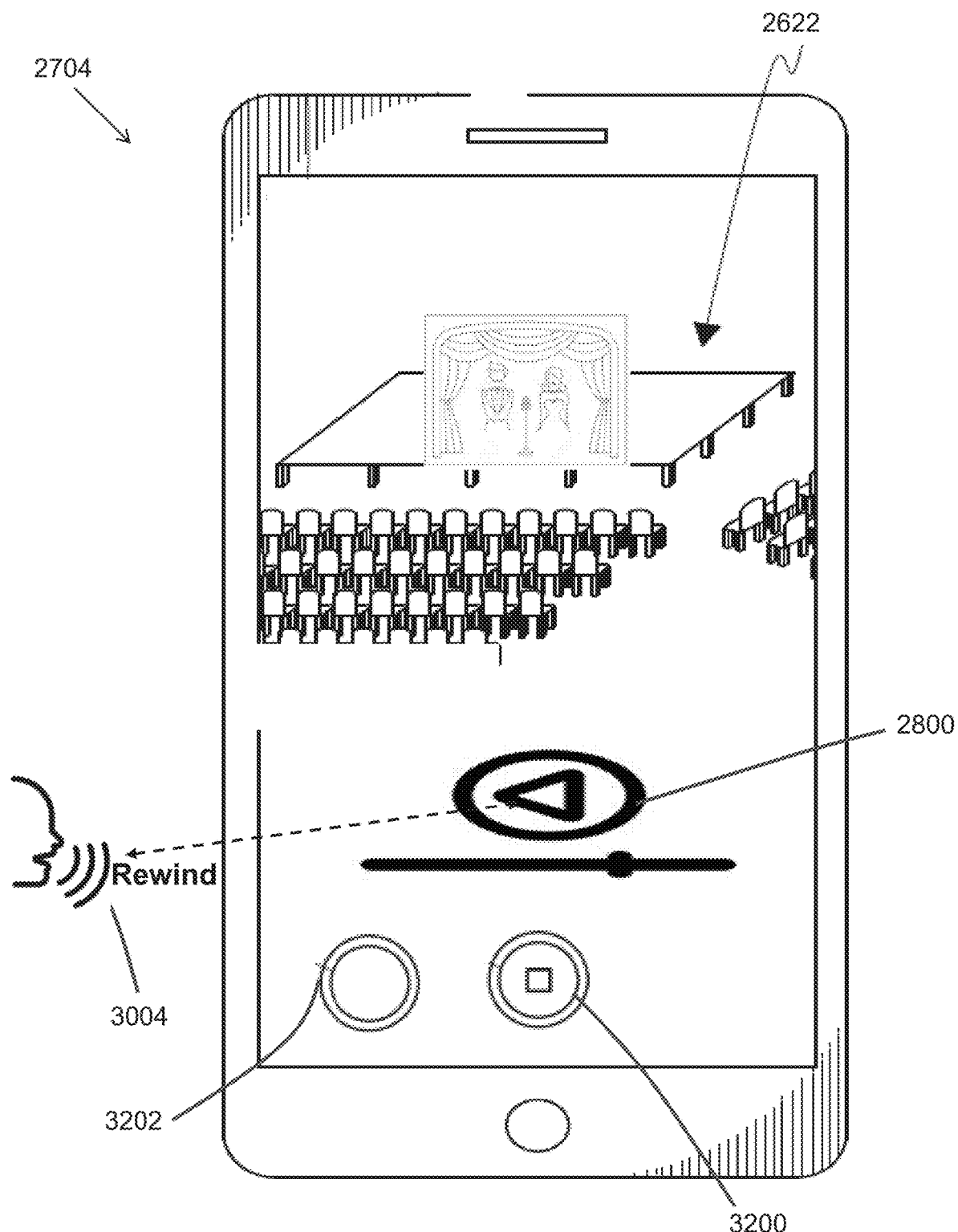
FIG. 32A is screenshot of a voice control allowing voice commands to activate various controls in the camera, and a pause control allowing new video segments to be generated during intervals between successive activations of the pause control.

With reference to FIG. 32A, still other embodiments of video recording systems that provide controls to resume recording video to a paused or completed main video recording stream at a later time or different location, so as to generate a discontinuous new video clip that will be automatically appended to the last clip of the paused or completed main video recording stream. For the case of resuming recording video to a paused main video recording stream, a video recording system 2600 providing unique pause control 3202 is illustrated in FIG. 32A and described below. For the case of resuming recording video to a completed main video recording stream, a video recording system providing a continue video control is illustrated in FIG. 32A.

In accordance with a paused-recording resumption embodiment, the video recording system 2600 provides a unique pause control 3202 that is used to pause the main video stream and/or the video clip. A user activating the pause control 3202 for a first time while a main video stream is active (i.e., between initiation and termination of the main video stream) causes the main video stream and/or the video clip to pause, i.e., temporarily cease recording. The main video stream then resumes recording, upon a next activation of the pause control. Between initiation of the main video stream and the first pause, and between each resumption and next pause, the system 100 automatically records durations of video clips. Thus, a new video clip is generated between the start of the main video stream and the first activation of the pause control 3202, between second and third activations of the pause control 3202, similarly between fourth and fifth activations, and thus during alternating intervals between successive activations of the pause control 3202. The newly generated video clips may then be labeled, stored, and viewed, as described above.

In operation, the user activates the pause control 3202 directly on the display screen (See FIG. 32A). This serves to pause the main stream, and if a video clip is active, the video clip stream. However, the pause control 3202 also creates a new physical file of a video clip that spans from the time index that recording of the main video stream or video clip was last resumed (a resume point) to the time recording of the main video stream or video clip was paused (a present time index). It is significant to note that the pause-generated file(s) can be labeled with a name, as described above.

Accordingly, the first time that the main video stream is paused, the new physical file spans from zero, when the main video stream starts recording, to the time index that pause control is subsequently activated. After resuming recording by pressing the pause control 3202 a second time, when the pause control 3202 is pressed a third time, a second new physical file spans from the time index of the second time the pause control 3202 was activated, which is the resume point referred to above, to the time index of the third time the pause control 3202 was pressed. Put another way, the second activation of the pause control 3202, and similarly thereafter, each even-numbered activation (2N-2) of the pause control 3202, begins the recording of an Nth clip of the main video stream, which continues until the next odd numbered activation (2N-1) of the pause control 3202, resulting in the creation of an Nth new physical file spanning from the time index of the activation numbered (2N-2) to the time index of the activation numbered (2N-1) of the pause control. In this manner, the pause control 3202 can be used multiple times to create multiple video clips, which can then be labeled. This unique feature may be useful for manually creating video clips of an untimed event. For example, the user can select which section of main video stream to splice into different video clips, simply by activating the pause control 3202.

In accordance with a stopped-recording resumption embodiment, a video recording system includes a "continue video" control, which allows a user to append new video to an existing video file created from a previously stopped recording; i.e., a previously terminated main video stream. With reference to the screenshot of a video file selection view shown in FIG. 32A, a user will have previously started and stopped multiple previous video recordings, resulting in the creation of multiple existing video files. At a later time or date, the user may select to continue recording video to a selected one of the video files by pressing the corresponding continue video control.

In response to the activation of the continue video control, the software application displays a video area 150 (see FIG. 11) with the real time scene captured by the lens (i.e., a digital viewfinder), a record control 156, a message with the words "Continue Video" or the like, so as to indicate to a user to activate the record control 156 to start recording new video to be appended to the existing video file. In addition, the software application displays a small thumbnail image of the representative (e.g., last captured) frame image of the selected video file, as a reminder and confirmation to the user to which video file the user will be appending the new video. Optionally, the thumbnail image is also a touch input control that allows a user to open and view the video file to further confirm the user's selection of the desired video file, in a viewing mode (not shown) from which the user may navigate back to the view in a single step, such as by either touching a prompt to return to the digital viewfinder to continue video or activating a "back" navigation control or the like. A user may then press the record control 156 once to start recording new video and then again to stop recording the new video.

In response to the user activating the record control 156 again to stop recording the new video, the software application automatically begins appending (or "merging") the new video to the video file to generate a merged video file (see FIG. 41) containing the merged content, and displays a message such as "Merging Videos" to indicate that the merging is in progress. In addition, the software application can display an abort control with a message such as "Stop Merging," which a user may touch to cancel the merging operation. Optionally, such automatic merging in response to the user stopping the recording of new video can be toggled on or off as an "auto-merge" option of the software application (such as in an options menu not shown), whereby a user may choose instead to configure the software application to prompt a user before beginning to merge the stopped new video recording to the existing video file.

Once the merge is complete, the software application is configured to display a message such as "Append Finished: Your new video is ready for Event '<Event Name>'", together with an interactive menu from which a user may touch-select options to "Preview" the merged video file before deciding what to do with the existing video file, to "Delete Previous Video" (i.e., to delete the existing file and replace it with the merged video file), or to "Keep Previous Video" (i.e., to keep the existing file as a separate video file from the newly created merged video file). In the latter case, the existing file may be maintained as a separate video file without the need to physically duplicate its physical bitstream content to a new storage location associated with a portion of the merged video file. That is, storage space may be conserved by maintaining only one copy of the previously recorded video, each of the existing file and the newly created merged file 712 being identified in part by the same logical start pointer to the storage location of the first frame of its existing physical main video stream, the existing file being further identified by a logical end pointer to the storage location of the last frame of its existing physical main video stream, and the merged video file being further identified by a logical end pointer to the storage location of the last frame of the newly recorded video clip, which will constitute the last from of its own physical main video stream, an initial portion of which the merged video file will share in common with the existing video file.

Figure 41:
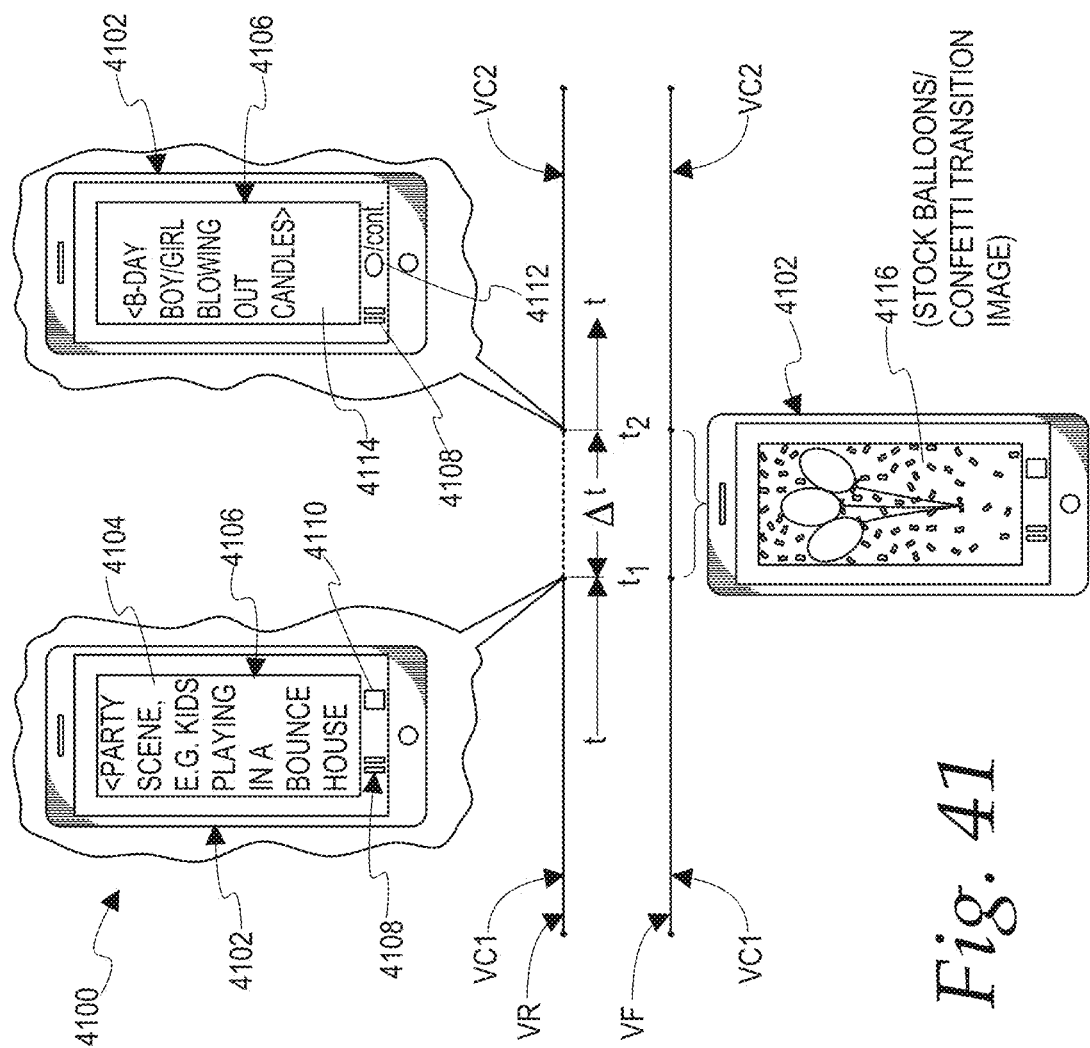
FIG. 41 is a schematic illustration of a video recording system that inserts a transition video clip between successive discontinuous recorded video clips of a main video recording stream when creating a main video file from the main video recording stream.

A merged video file can be \shown to be constructed of multiple spliced-together video or image clips as depicted in FIG. 41. A video file can be created using the pause control 3202 of the above described paused-recording resumption embodiment. (For example, the video recording system of the present stopped-recording resumption embodiment may further comprise the pause control 3202 that was used in the creation of the existing video file.) That is, a user may have first activated the pause control 3202 at a real time $\Delta t_1$ after starting to record, thus creating a first video clip, and then activated the pause control 3202 a second time, to resume recording after a pause of real time duration $\Delta t_2$, thereafter continuing to record for a real time of $\Delta t_3$, until finally activating a record control (such as the record control 156) to terminate the physical main video stream and create the existing video file, composed of the first and second video clips.

Alternatively, the existing video file may itself be a merged video file that was created using the video recording system by activating the record control 156 to stop the recording at real time $\Delta t_1$ and create a first video file comprising just the video clip, followed by activating a continue video control associated with the first video file to resume recording to the first video file after a further elapsed time $\Delta t_2$, and finally stopping the recording again after a still further elapsed time $\Delta t_3$, to create the second video clip and append it to the first video file. Either method would have resulted in the creation of the same existing video file, while the method using a continue video control according to the present embodiment would have also created a first video file (in alternative embodiments, the software application may likewise be configured to create a separate video file on odd-numbered activations of a pause control after a recording stream is initiated, comprising the video clip generated during the preceding interval between pause control activations) comprising the video clip, which a user could have selected to keep from the selection menu. The process of using the continue video control to record and further append the third video clip to the existing video file will be the same regardless of which control was used to build the existing video file from discontinuous clips. Likewise, the pause/resume control 3202 could be used during a video recording session that was initiated using the continue video control to append video to a first video file comprising just the first video clip, so that the video appended to the first video file comprises both the second and third video clips, ultimately resulting in the same merged file. Finally, the same merged video file can be created without using the continue video control at all, by activating the pause control 3202 a third time to end the second video clip at real time $\Delta t_1 + \Delta t_2 + \Delta t_3$, and again after a further elapsed real time $\Delta t_4$ to resume recording, followed by finally activating the record control 156 after a further elapsed real time $\Delta t_5$ to end the third video clip as well as ending a main video stream during which all three video clips were generated, resulting in the creation of a video file comprising the three video clips spliced together.

Regardless of which of the above described controls and methods were used to create the merged video file, the resulting video file will contain a physical main video stream of total time duration $\Delta t_1 + \Delta t_3 + \Delta t_5$, comprising the video clips spliced together in sequence. The merged video file will further comprise a logical main stream built of first, second, and third concatenated logical stream segments corresponding to the respective video clips. The logical main stream of the merged video file has a logical start pointer and a logical end pointer. The logical start pointer, which is also a logical start pointer of the first logical stream segment, points to the storage location of a first frame of the first video clip, which is also a first frame of the merged video file. In turn, the logical end pointer, which is also a logical end pointer of the third logical stream segment, points to the storage location of a last frame of the third video clip, which is also a last frame of the merged video file.

Analogously, a logical main stream of the existing video file is built of the first and second concatenated logical stream segments and has the same start pointer as the merged video file, while its end pointer is an end pointer of the second logical stream segment. The end pointer may also be (or immediately precede in a predefined order or by a rule for ordering logical pointers used by the software application, so as to sufficiently determine) a start pointer of the third logical stream segment. Similarly, the first logical stream segment has an end pointer, which may also be or sufficiently determine a start pointer of the second logical stream segment. Such intermediate end/start pointers are retained in the logical main stream of the merged video file and used by the software application to allow a user to label the spliced-together clips which make up the merged video file, to allow the user to extract a selected clip as a separate video file if one was not automatically created, and to allow the user to skip to the beginning or end of any of the clips during replay of the merged video file.

Finally, the existing video file and/or the merged video file may further include logical label streams, such as the illustrated first and second label streams, identifying video clips that were created without pausing or stopping the main recording. For example, a user may have created the logical label streams by a user activating the cut clip and stop clip controls of a previously described embodiment, during recording of the second video clip. The video clip of the first logical label stream spanning between the respective logical time indices of a start pointer and an end pointer, and that of the second logical label stream spans between those of a start pointer and an end pointer. Similarly to the use case illustrated in FIG. 4, a separate physical label stream, corresponding to the second logical label stream, can also be created by writing a copy of the corresponding physical main stream video content of the second video clip to a new storage location. In embodiments, the software application may be configured to create physical duplicate copies of such clip content automatically by design, automatically per a user-configured setting, and/or according to a prompted user selection.

In yet another embodiment, a video recording system may be configured so that recording to a main video stream, and to any active video clip, is paused and/or resumed automatically when a pause-triggering or resume-triggering condition occurs, with the same results as when a recording is paused and/or resumed manually by pressing the pause control 160 of the video recording system 100 or the pause control 3202 of the video recording system 3202, as described above. For example, the system may be configured so that a recording is paused automatically when a software application associated with the system is closed (for example, manually by a user, or by a device operating system in response to an error caused by the software application), when the software application merely "goes background" (meaning that the user has brought a different software application to the foreground) and/or when a smartphone or other telecommunications device running the system/software application receives a call, or when a user answers/picks up/connects/accepts the call. A recording that was thus paused automatically may then resume automatically upon the occurrence of a resume-triggering condition, which may correspond to the pause-triggering condition that caused the recording to pause. For example, the recording may resume automatically when the software application is re-opened or restored, or when the call terminates, as applicable. Alternatively, the recording may be manually resumed by a user, such as by pressing a pause control analogous to pause control 160 or pause control 3202. It may be desirable only allow the user to manually resume video recording as the camera of user's smartphone, tablet, watch, or other mobile device may be in an undesired position. In embodiments, the user may choose to enable or disable the automatic pause and/or resume functions of the system/software application. For example, shown in FIG. 36 is a screenshot of a video recording system 3600, illustrating a camera settings menu 3602 that includes an auto-pause toggle switch 3604. This function allows a user to continue recording to the same video file that the user was originally recording to before the pause-triggering condition, rather than recording to two separate files and combining them using a video editing program.

Figure 37:
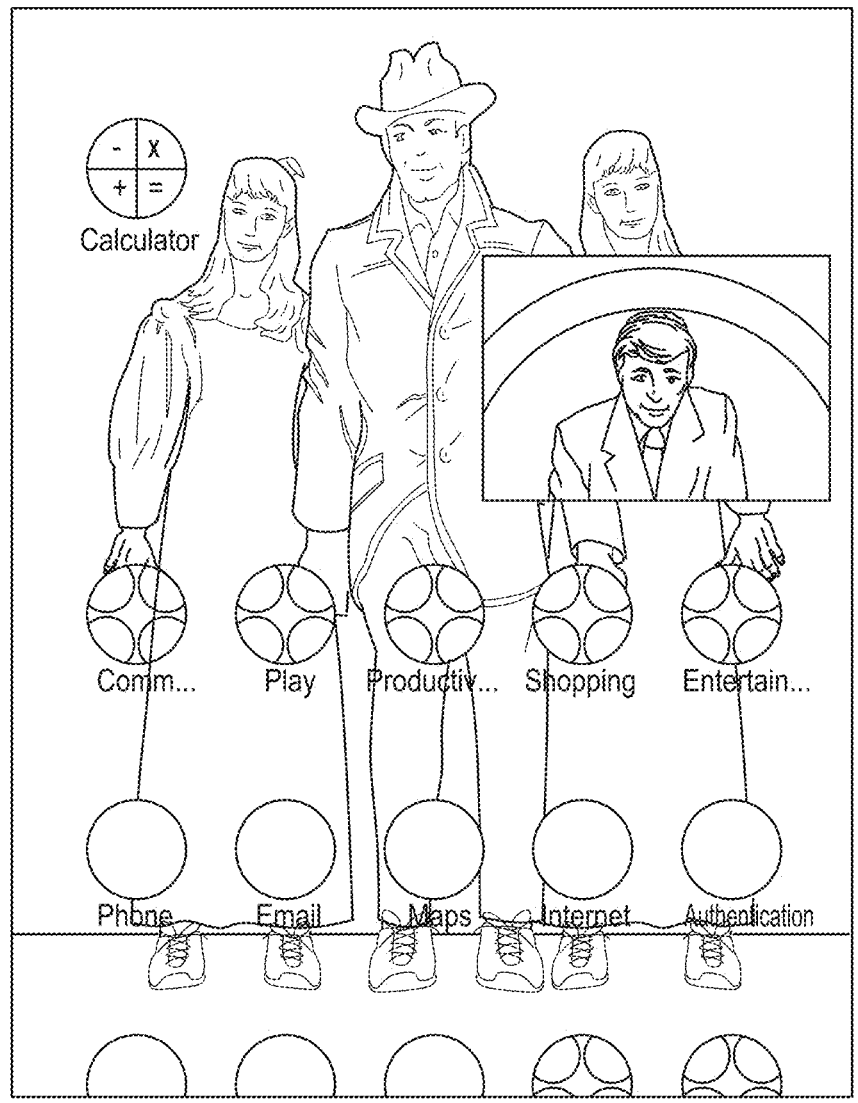
FIG. 37 is a screenshot of a video recording system that presents on a smart device as a minimized window while other functionality is being used.

An alternate embodiment is shown in FIG. 37. In particular, in the embodiment of FIG. 37, a video recording system may be configured so that recording to a main video stream, and to any active video clip, continues, but the video screen is minimized; i.e., presented in a less than full screen size, as depicted. For example, the system may be configured so that recording can continue (with the minimized software application being displayed) when a smartphone or other telecommunications device running the system/software application receives a call, or when a user answers/picks up/connects/accepts the call. This allows recording to continue while the user is fully aware of what is being recorded, while still allowing the user to continue to use the smartphone or other device for purposes other than recording video and/or audio. Similarly, this allows a user to record an important video without resorting to the use of "do-not-disturb" mode or "airplane" mode, and thereby continuing to enjoy the full functionality of the user's device.

As discussed above, the video streams and clips thereof are described as audio-video streams and clips. However, it should be understood that the principles described herein can be applied to streams and clips of purely audio or purely video. The system 100 provides the capacity to replay solely audio in the form of selected audio clips. The audio clips can be spliced, stored, replayed, and modified, similarly to the video clips. The audio clips may also be labeled, as discussed above. Further, the network members can access the audio streams and clips from a central storage site. Any of the network members can create and label a video clip for future viewing, or to transmit to network members.

For example, FIG. 34 references a screen shot of an exemplary audio function 3400 feature. The audio function 3400 allows the user to produce a main audio stream 3402, similar to the main video stream. The user activates an audio record control 3404 that couples to the processor. Upon initiation, the audio record control 3404 starts recording audio to generate the main audio stream 3402, which continues recording until the audio record control 3404 is engaged a second time. The audio function 3400 also provides an audio clip control 3406 to produce a label stream from the main audio stream 3402.

Upon a first activation of the audio clip control 3406, a first logical stream of audio is created, and an audio clip is initiated. The audio clip may be streamed for viewing by any of the other network members. The audio splice control 3406 also displays the subsequently generated main stream of audio between the network members, so that the audio streams may be viewed, edited, stored, and shared at a later time. Upon a second activation of the audio clip control 3406, a second logical stream of audio is created, and the first audio clip is completed. This can be repeated multiple times to achieve multiple audio clips in sequence as previously discussed herein.

The audio function 3400 also provides an audio label control 3408 for labeling the audio clips. Upon activation of the audio label control 3408, a desired audio clip is labeled with an audio name 3410 for subsequent identification and listening. The labeling function of the audio label control 3408 occurs when, upon activation of the audio clip control 3406, a logical stream of audio is created. After labeling the video clips, the audio name 3410 can be stored for subsequent listening.

Figure 35:
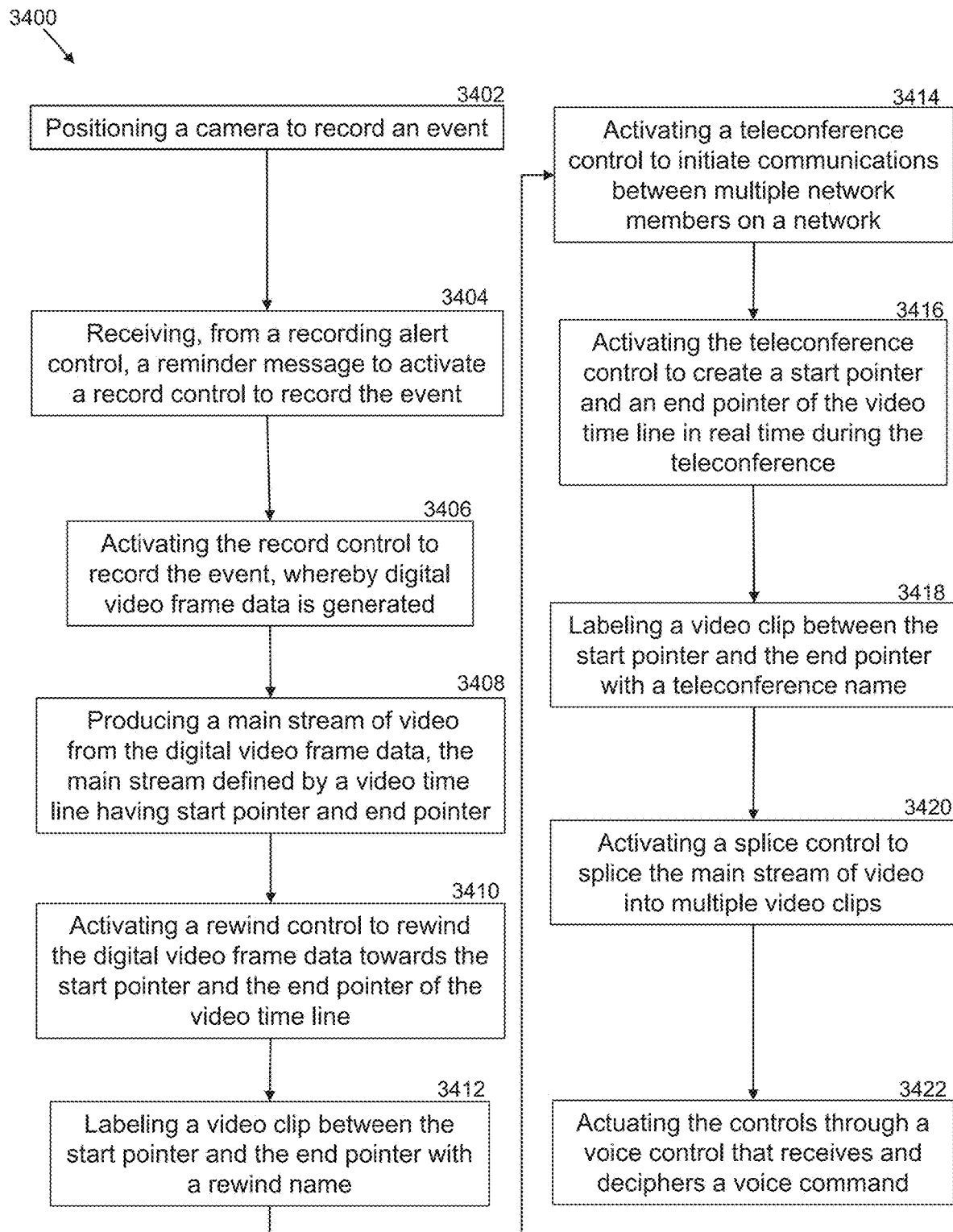
FIG. 35 a flowchart of an exemplary method for labeling networked meetings and video clips from a main stream of video.

FIG. 35 references a flowchart of an exemplary method 3500 for labeling networked meetings and video clips from a main stream of video. The method 3500 may include an initial Step 3502 of positioning a camera to record an event. The camera may be placed in front of, behind, to the side, proximal, or distally from the event. The method 3500 may further comprise a Step 3504 of receiving, from a recording alert control, a reminder message to activate a record control to record the event. A Step 3506 includes activating the record control to record the event, whereby digital video frame data is generated. The camera is then actuated to generate digital video frames that are produced into a main stream of video.

In some embodiments, a Step 3508 comprises producing a main stream of video from the digital video frame data, the main stream defined by a video timeline having a start pointer and an end pointer. A Step 3510 includes activating a rewind control to rewind the digital video frame data towards the start pointer and the end pointer of the video timeline. The rewind feature allows for flexibility in viewing selected sections of the video.

In some embodiments, a Step 3512 may include labeling a video clip between the start pointer and the end pointer with a rewind name. The rewind name is descriptive of the section of video clip between the pointers. In some embodiments, method 3500 comprises a Step 3514 of activating a teleconference control to initiate communications between multiple network members on a network. Upon activation of the teleconference control, streams of digital video data produced by one or more network members are streamed for viewing by one or more of the network members. The teleconference control also displays the subsequently generated main stream of video between the network members, so that the teleconference may be viewed, edited, stored, and shared at a later time.

A Step 3516 includes activating the teleconference control to create a start pointer and an end pointer of the video timeline in real time during the teleconference. Another Step 3518 may include labeling a video clip between the start pointer and the end pointer with a teleconference name. The teleconference name is descriptive of the selected section of teleconference. A Step 3520 comprises activating a splice control to splice the main stream of video into multiple video clips. Upon activation, through a touch screen button or mechanical switch/button, the splice control 220 allows the system user to splice the main stream of video into multiple video clips 2702a-c.

A final Step 3522 includes actuating the controls through a voice control that receives and deciphers a voice command, whereby a speech software development module matches the voice command with one or more operating parameters for the controls. The voice control 3200 allows for voice commands 3202 or other assigned sounds to activate controls and other features in the camera.

In another aspect, the present disclosure provides a software application or module stored on a storage device in a non-volatile storage medium, the software application or module comprising instructions for context-controlled automation of video quality settings. The present disclosure also provides a video camera system adapted and configured to execute the software application. In embodiments, the video camera system comprises a processor, typically a microprocessor, the processor being operatively connected to the non-volatile storage medium so that the program is readable and executable by the microprocessor to automate video quality settings actions. More particularly, the program includes quality settings rules for the video camera system to adjust (or to prompt a user to select whether to adjust or not) one or more video quality settings automatically in response to triggering conditions. In embodiments, the settings include one or more of a resolution setting, a frame rate setting, a color depth setting, and a bit rate setting. In one embodiment, the resolution setting permits a resolution to be set to a value selected from 720p, 1080p, and 2160p; the frame rate setting permits a frame rate to be set to a value selected from 24 fps, 30 fps, 50 fps, 60 fps, and 120 fps; the color depth setting permits a color depth to be set to a value selected from 16-bit, 24-bit, and 30-bit; and the bit rate setting permits a bit rate to be set as a fixed bit rate or a variable bit rate and the variable bit rate to be limited to no greater than a maximum value selected from, for example, 1 Mbps, 4 Mbps, and 50 Mbps, or another bit rate.

Figure 38:
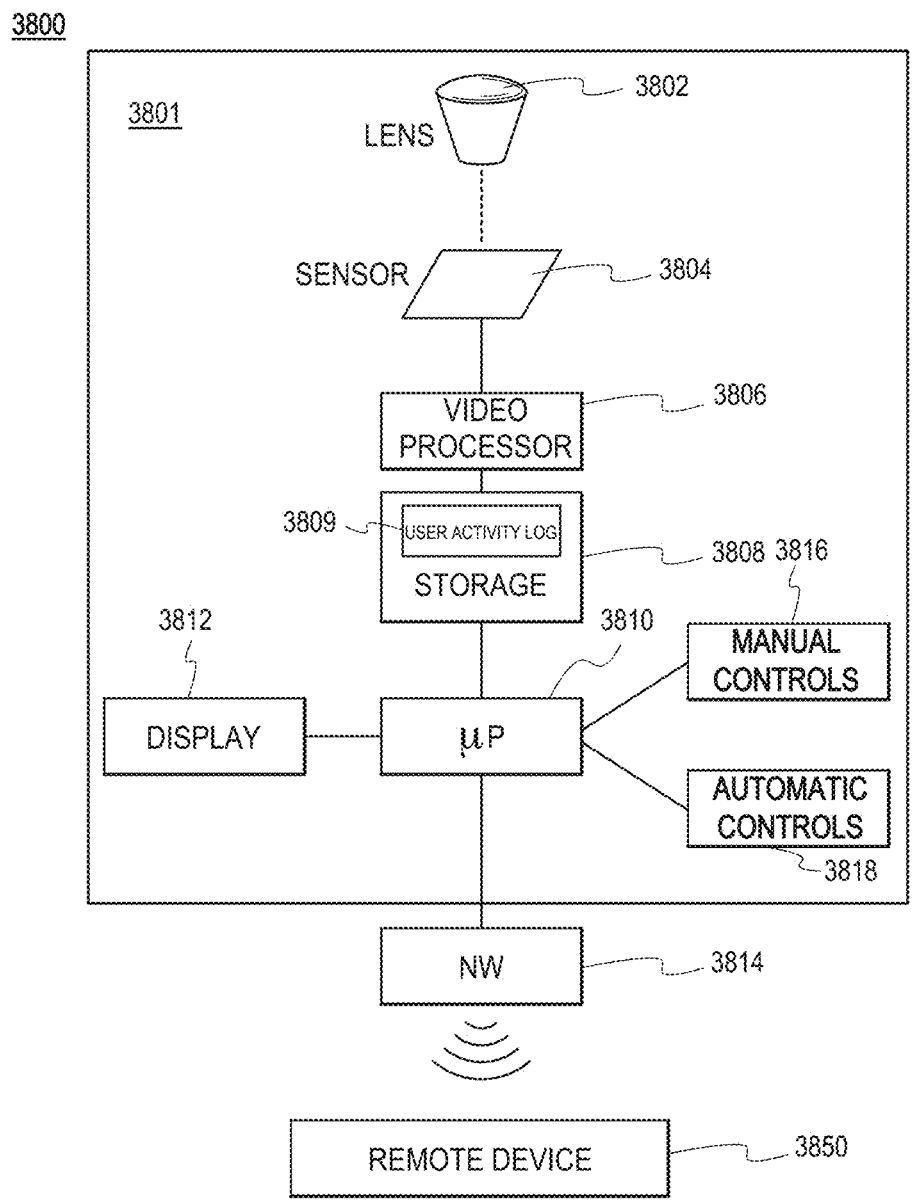
FIG. 38 is a simplified block diagram of a video recording system with automatic video quality settings control.

Shown in FIG. 38 is a simplified block diagram illustrating the general construction of a video camera system 3800 according to an embodiment of the disclosure. The video camera system 3800 includes a lens 3802. The lens 3802 can be, for example, a small, curved glass lens with a focal length of about 18 mm to 55 mm, although it should be noted that the characteristics of the lens 3802, and even the inclusion of a lens, is not a limitation of this disclosure. The lens 3802 focuses incoming light onto an image sensor 3804. The image sensor 3804 can be, for example, a CCD sensor, a CMOS sensor, or another equivalent image sensor. In addition, the size of the image sensor 3804 can vary from full-frame or larger down to arbitrarily small image sensors. Typically, the output of an image sensor 3804 will be processed by a video processor 3806, which will process the video from the image sensor 3804 and write or commit full frames of video to storage 3808. The video processor 3806 may process data from the image sensor 3804 at a frame rate, the frame rate being a context-controlled video quality setting in embodiments of this disclosure. The video processor 3806 may write frame data directly to storage 3808 via a DMA channel. However, the processor 3810 can also read data from the video processor 3806 (or directly from the image sensor 3804) and write the frame data to storage 3808. Accordingly, in certain embodiments of the disclosed video camera system 3800, the video processor 3806 is entirely extraneous and is not a limitation of this disclosure.

The storage 3808 used by the video camera system 3800 will typically be FLASH memory, although the primary limitation is that the write speed of the storage 3808 is sufficient for the frame rate at which the video camera system 3800 is operated. The amount of storage can vary, but 1 GB of storage can hold nearly 20 minutes of 1080P video at 60 FPS (frames per second). The FLASH memory modules may, for example, be UFS 3.1 FLASH memory or a similar type of FLASH memory that offers sufficient read/write performance.

The microprocessor 3810 reads frame data from storage 3808 and displays it in real-time on the display 3812. The microprocessor 3810 also performs housekeeping activities, such as configuring the video processor 3806, interfacing with external devices (not shown), accepting manual controls 3816 and automatic controls 3818, and interfacing with an external network 3814. The microprocessor 3810 can be any suitably fast microprocessor or microcontroller that has appropriate interface capabilities, ranging from an 8-bit device, such as a Microchip® PIC® variant, or similar device, to a 64 bit ARM or x86 device, such as, for example, an ARM Cortex A76 variant.

The display 3812 can be, for example, a Liquid Crystal Display (LCD), an LED or an OLED display, or another type of display as long as the display is of sufficient resolution and refresh rate for the video camera operator to obtain a reasonable view of the scene that is being recorded. In certain implementations, the display 3812 can be a touch-sensitive display, so that touch-sensitive input control components can be implemented as needed.

The network interface 3814 will typically be wireless using a variant of 802.11, although other wireless networking technology, or even a wired network, can be employed. For example, a 4G or 5G cellular network could also be used, as their transfer speeds are fast enough to accommodate the video streaming and transfer speed required of the network interface 3814. The network interface 3814 can be employed for a variety of purposes, including remote control by a remote operator. In such a scenario, the processor 3810 may run software, including a video server that will stream the recorded video to a remote site, as well as software to accept various network commands from the remote site. When utilized, the remote device 3850 can oversee the operation of the video camera system 3800. In certain implementations, the video may not be streamed to the remote site so that lower bandwidth implementations, like Bluetooth®, Zigbee®, or Z-Wave®, could be used.

The manual controls 3816 receive manual user inputs and transmit the manual user inputs to the microprocessor 3810 to allow the camera operator to control the operation of the video camera system 3800. The manual controls 3816 can include, for example, a touch screen system, or a collection of buttons, sliders, joysticks, gesture controls, voice controls, and other input control components, as are typical in video camera systems.

The automatic controls 3818 transmit inputs automatically to the microprocessor 3810, such as geolocation and user activity, as described below. The automatic controls can include, for example, a geolocation component operative to determine the geolocation of a camera device 3801, such as a GPS component retained by the camera device 3801, a clock, and/or one or more sensors such as a light sensor and/or a motion sensor retained by the camera device 3801. For purposes of this disclosure, where not stated otherwise, a "camera device" includes at least such components that are commonly understood as required to be present at or near the location of the subject(s) of the image frames captured in a video recording. More particularly, a camera device includes at least a lens and an image sensor optically coupled to the lens. In the illustrated embodiment, in addition to the lens 3802 and image sensor 3804, the camera device 3801 further includes the video processor 3806, the storage device 3808, the microprocessor 3810, the display 3812, the manual controls 3816 and the automatic controls 3818. In other embodiments, any of the latter group of components can be remotely coupled to a camera device.

The video camera system 3800 is programmed with instructions for the microprocessor 3810, in response to the automatic inputs, to determine whether a condition exists for adjusting a video quality setting, and when the condition exists, to cause the video quality setting to be adjusted. The programmed instructions may comprise software stored on any suitable storage medium that is operatively connected to the microprocessor 3810 so as to enable the microprocessor 3810 to read and execute the instructions. The storage medium may physically reside, for example, in the storage 3808 or in a remote device 3850 to which the microprocessor 3810 is operatively connected via the external network 3814.

The programmed instructions include auto-settings rules. The auto-settings rules define triggering conditions and triggered actions related to video quality settings. The triggered actions may include automatically adjusting and/or automatically prompting a user for input whether to adjust one or more settings to a value or values suggested for the triggering condition. In either case, the setting value(s) may be those of a settings preset configuration that is stored by the software application.

In an embodiment, the software application stores a plurality of such present configurations, which can be tagged with names describing video recording contexts in which their video quality settings are considered to be desirable, for example, "Scenic," "Scenic High Frame Rate," "Sports," "Children's Event," and "Web Streaming." More particularly, for example, the Scenic preset configuration can have a 2160p resolution, a 30 FPS frame rate, a 48-bit color depth, and a bit rate that is fixed at 512 Mbps. The Scenic High Frame Rate preset configuration can have a 2160p resolution, a 120 FPS frame rate, a 24-bit color depth, and a bit rate that is fixed at 512 Mbps. The Sports preset configuration can have a 1080p resolution, 120 FPS frame rate, a 16-bit color depth, and a bit rate that is fixed at 100 Mbps. The Children's Event preset configuration can have a 720p resolution, a 30 FPS frame rate, a 16-bit color depth, and a bit rate that is fixed at 1 Mbps. The Web Streaming preset configuration can have a 1080p resolution, a 30 FPS frame rate, a 16-bit color depth, and a bit rate that is variable up to a maximum of 4 Mbps.

A triggering condition for an automatic or prompted video quality settings adjustment can be any condition that can be automatically detected, or determined to exist, by the microprocessor 3810 as configured in the video camera system 3800, for example, by receiving input from the automatic controls 3818 indicating the condition. The programmed instructions are executable by the microprocessor 3810 so that, when the triggered condition is detected, the microprocessor 3810 initiates a corresponding triggered action. Advantageously, the auto-settings rules can be configured so that a stored preset configuration is automatically activated, or prompted for activation, in response to the automatic controls 3818 detecting a triggering condition that indicates that the corresponding video recording context is likely present. For example, a triggering condition may be that the video recording system is present at a scenic geolocation, such as the Grand Canyon, and the corresponding triggered action is to activate the "Scenic" preset configuration. In another embodiment, the triggered action is to prompt the user before activating the "Scenic" preset configuration, such as by displaying a prompt for a user input to accept/activate or reject/cancel the activation, and either activating the preset configuration or not based on the user input.

The auto-settings rules may be so configured by the original programming of the software application, manually defined or modified by a user, and/or created or modified automatically through machine learning based on observed patterns of user activity. Modifications to the auto-settings rules may include adjustments to the settings of a particular stored preset configuration and/or to stored definitions of triggering conditions that trigger its activation or prompting for activation. For example, when a user selects not to activate a preset configuration in response to a triggered prompt, the software application may apply a set of meta-rules to determine whether and how to redefine the triggering condition to better predict the context. On the other hand, if a user chooses to activate a preset configuration when prompted, or if the triggered action is to automatically activate the preset configuration, and the user subsequently makes manual adjustments to one or more of the preset settings, without reverting back to the settings as they were before the preset configuration was activated, the software application may observe these manual adjustments and, by applying the meta-rules, determine that the user's actions call for the preset values of the preset configuration settings to be modified.

Figure 39:
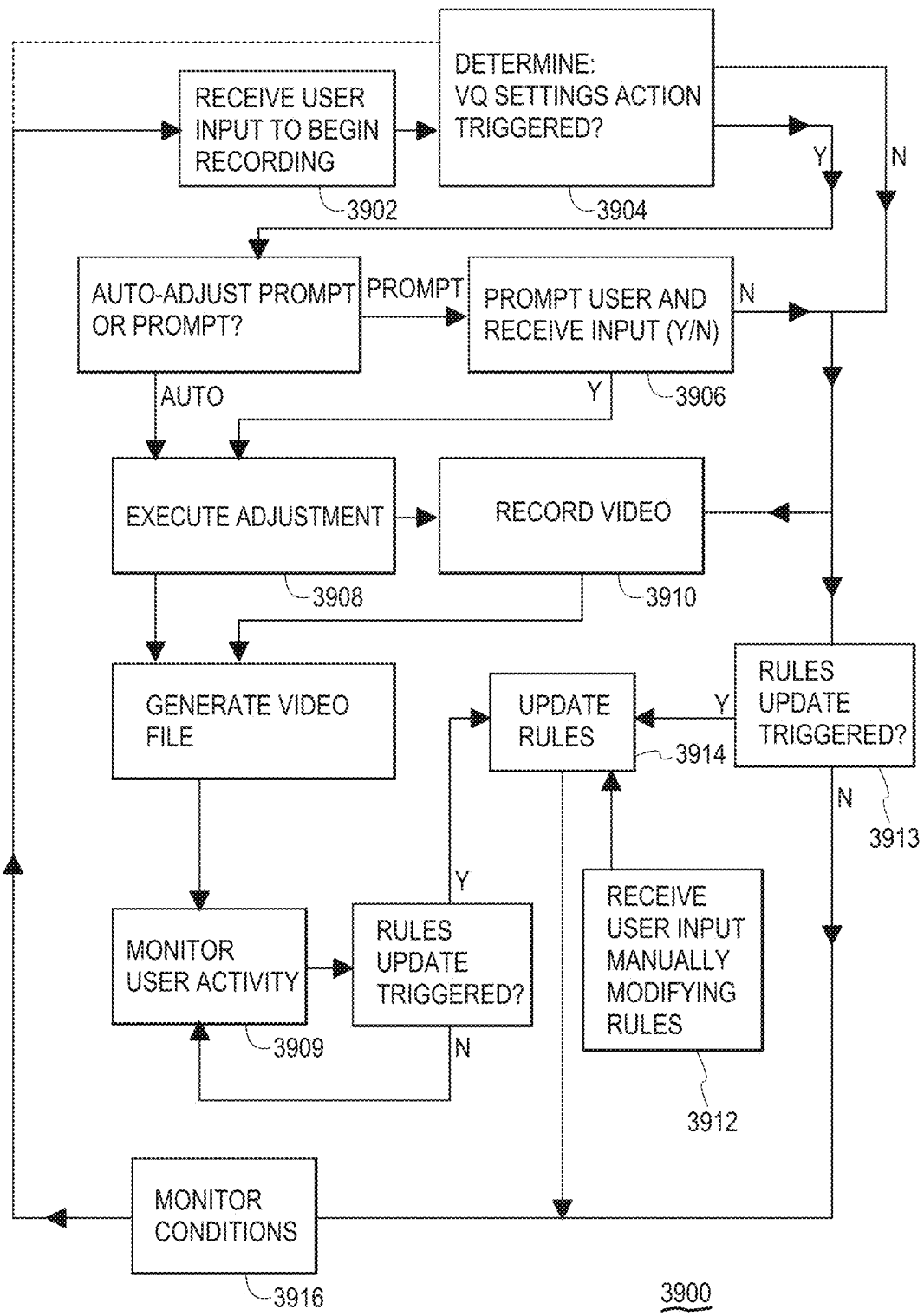
FIG. 39 is a simplified flowchart of an method of using the video recording system shown in FIG. 38 to automatically control video quality settings.

A method 3900 of automatically controlling a video camera system, such as the video camera system 3800 running a context-controlled video quality settings software application according to this disclosure, is illustrated in the simplified flowchart of FIG. 39. In a step 3902, the video camera system receives a user input to start recording video (i.e., receives a signal that the user has pressed or touched a record button, which may be labeled with the word "Record" and/or the corresponding circular symbol). In response, the video camera system proceeds to a step 3904 of applying video quality settings rules to determine whether a video quality settings action has been triggered.

In the determining step 3904, the software application may consider various types of data that can be detected, sensed, received, or measured by the automatic controls 3818, including a current geolocation, a present time, profile data of an active user, and other data that may predict a recording context to which certain video quality settings are well suited. Geolocation data can be the output of a geolocation function within a user's smart device, which typically will return approximate GPS coordinates. Time data can be the output of clock and calendar functions of a user's smart device, and thus may include not only a time of day but also a day of the week and calendar year, and a triggering condition may include that the present time falls within a triggering time period. The triggering time period may include a time interval, such as from 5:00 P.M. to 6:00 P.M., or from Friday at 4:30 P.M. to Monday at 8:30 A.M.; and/or a recurrence frequency for the time interval, such as daily, weekly, monthly, annually (e.g., to trigger an adjustment of video quality settings values preferred for recording video of annual family gatherings on holidays, birthdays, or other important dates), or never (as when a user manually schedules a video quality settings adjustment to values preferred for a one-time use). User profile data may include a video quality control manually created by a user and/or a video quality control automatically created by the software application by inferring a recording context from patterns or frequencies of prior user activity.

Geolocation can be sufficient in itself to constitute a video quality settings action triggering condition, as in the Scenic preset being triggered by a device being located in the Grand Canyon as mentioned above, or the Sports preset being triggered by the device being located in a sporting arena, or other types of presets being triggered as appropriate (settings appropriate for Times Square/Vegas or on a Cruise Ship or the Beach, etc.). In other examples, geolocation comprises part of a condition, as when presence of a user's smart device in a particular location and at a particular time, corresponding to the user's regular habit of recording videos to be uploaded to a web streaming platform, or for live streaming, may trigger the Web Streaming preset.

A user profile may include a rule manually created by a user for certain video quality settings to be applied under certain circumstances, and/or a user profile may contain a history of user activity that indicates a high probability under certain circumstances that the user is recording such content and/or will use the resulting video file in such a way that certain video quality settings are likely desirable.

As an example of a manually created video quality settings rule, a user may create a rule to apply a "Mabel's Dance Recital" preset configuration, with manually selected values for certain video quality settings, whenever recording in a specific dance studio or auditorium. This preset configuration will automatically be activated, or the user automatically prompted to activate or decline to activate it, whenever the user is logged into their profile on a device of a video recording system 3800 running the software application, and the automatic controls 3818 detect that the device is at that location.

In an embodiment, the video recording system 3800 is programmed by the software application to automatically create an video quality settings rule, or automatically modify an existing video quality settings rule, based on user activity feedback, as follows. When a user is logged into the software application on a device of the video recording system 3800, the microprocessor 3810, in conjunction with the automatic controls 3818, may be instructed by the software application to perform a step 3909 of monitoring user activity affecting video files in the storage 3808 (in an embodiment, without limitation as to whether or not the video files involved were created using the software application), such as the user creating, editing, renaming, moving, deleting, and/or exporting/uploading the video files, and writing a user activity log 3809 of the monitored user activity to a storage. In the illustrated embodiment, the user activity log 3809 is written to the storage 3808. In other embodiments, a user activity log can be written to remote storage, such as a storage managed by a cloud storage provider, alternatively to or in addition to being written to a local storage, such as the storage 3808. Further, the microprocessor 3810 can be instructed to check the user activity log 3809 for any emerging patterns on some recurring basis and, when a pattern is identified that triggers an automatic or prompted update of video quality settings rules according to meta-rules defined by the software application. That is to say, analogously to the video quality settings rules themselves, each meta-rule has a rules update triggering condition and a rules updating action, and the rules update triggering condition can include the microprocessor 3810 identifying a triggering pattern of user activity in the user activity log 3809, and the rules updating action can include performing a step 3914 of updating the video quality settings rules, such as by creating a new video quality settings rule or modifying an existing one, based on the identified pattern. The recurring basis may include checking for patterns each time the log 3809 is updated, checking for patterns after each number N of updates to the log 3809, checking for patterns after each number X of updates of a type x or different number Y of updates of a different type y, checking for patterns at set time intervals whenever an update to the log 3809 has occurred during the most recent time interval, checking for patterns at times when the microprocessor 3810 determines based on input from the automatic controls 3818 that doing so will not undesirably encumber one or more device resources, and/or checking for patterns subject to some combination of the foregoing conditions.

The software application can include instructions for the microprocessor 3810 to recognize a simple pattern of manual user activity in the user activity log 3809, such as at least a predetermined number of instances of a particular monitored user activity occurring over a time period. In embodiments, the microprocessor 3810 can also be instructed to recognize more complex patterns of user activity associated with certain conditions, such as time of day, day of the week, day of the year, and/or geolocation of a user mobile device running the software application. More detailed examples follow of simple and complex patterns of user activity that can be identified by the microprocessor 3810 running the software application, in response to which it can be instructed to perform a rules updating action, such as automatically updating the rules or prompting the user with a suggested rules update.

One example of a simple pattern that can be identified in the user activity log 3809 is the user repeatedly positing content to a specific platform on the web, suggesting the user generally prefers to post on that platform. Different social media and other streaming platforms have different requirements for videos—for example, YouTube prefers a 16:9 or 4:3 format, while Instagram prefers a square format. Facebook and Snapchat have their own preferences as well. The software application may be pre-loaded with information about these and other preferences or requirements of certain frequently used platform providers, and/or the software application may deduce the preferences or requirements themselves from the user activity log 3809, such as when the log 3809 reflects the user consistently manually converting files into the corresponding format(s) before uploading them to the respective provider's platform. Thus, for example, when the activity log 3809 indicates that a particular user generally shares a very high percentage of their recorded videos on Instagram, regardless of other variables, the software application can automatically create a new auto-settings rule to apply a square frame for video recording whenever a smart camera device of the video recording system 3800 is used to record video while running an instance of the software application logged into that user's profile.

Another user's activity log 3809 may reflect that user regularly editing video files using a video editor (Adobe Premier, Davinci Resolve, etc.), resulting in the similar creation of a new auto-settings rule to automatically activate (or prompt for activation) a preset configuration for that user that produces a high quality (i.e., in a large size, such as at a high frame-rate, etc.), generating a file containing a large amount of detail, and thus providing the user flexibility in the ways the user can use video editing software to refine or "edit down" from the large file. Another user's activity log 3809 may reflect the user regularly posting video files as originally created, without further modifying them, resulting in the creation of an auto-settings rule for that user to automatically activate or prompt for activation a preset configuration for that user that produces a compact file size, for efficient use of storage, faster uploading, etc As noted previously, the software application can also include instructions for the microprocessor 3810 to identify more complex patterns of user activity in the user activity log 3809. For example, another user's activity log 3809 may show the user repeatedly applying certain manual settings adjustments or manually activating a certain preset configuration, but only in the presence of certain conditions or combinations thereof (such as time of day and/or location corresponding to routines for recording certain types of video content). An auto-settings rule for that user can be automatically created based on the microprocessor 3810 such a pattern and defining the observed conditions or combinations of conditions as triggering conditions for a triggered action related to that preset configuration (e.g., automatic activation or automatic prompting). In a more specific example, the microprocessor 3810 may recognize a pattern in a user's activity log 3809 of the user manually activating a "Sports" preset configuration when recording at a particular park (as indicated by a detected geolocation of, for example, the lens 3802 and/or the image sensor 3804), causing the video camera system to automatically expand the definition of the Sports context to include presence of system components at the geolocation of that park, perhaps overriding another rule for applying a "Scenic" preset configuration at locations designated as parks, such as based on geographic/map data stored in the video recording system 3800, in a cloud server (i.e., in the remote device 3850, where all or some portion of the storage 3808 may be physically located), or in some other remote device, such as a third-party server, with which the video recording system 3800 operatively communicates for the limited purpose of querying its geographic/map data.

In the illustrated embodiment of the method 3900, the update rules step 3914 can also be triggered in other ways than by the microprocessor 3810 identifying patterns in the user activity log 3809, including by the video recording system 3800 receiving user input manually modifying the auto-settings rules in a step 3912, and in some cases receiving user input declining to apply a preset configuration after prompting the user in the step 3906, as determined in a step 3913 after the user's negative response to the prompting. For example, according to software application meta-rules applied in the step 3913, a rules update to remove (or to modify, such as in response to further user input prompted for in an additional step not shown) an auto-settings rule may not be triggered the first time a user declines to apply a suggested preset configuration, but may be triggered in response to the user declining a certain multiple number of times, or by the user choosing to remove the rule in response to further prompting (not shown). Such further prompting can likewise be triggered only after a certain plural number of times, or it can be triggered each time a user declines to activate a suggested preset configuration. In another embodiment, whether a user is prompted to activate a preset configuration or to remove a rule can itself be determined by user input in response to a prompt, such as by the user checking or declining to check a "do not ask again" or "do this every time" (referring to every time the triggering condition occurs) box (not shown) before pressing a yes or no button in response to a prompt, when the prompt is suggesting a preset configuration, when the prompt is suggesting a rules update, or in both cases.

The auto-settings rules having thus been described, including how those rules can be manually or automatically created and updated by the video camera system 3800, the description now turns to the determining step 3904, in which the video camera system 3800 applies the auto-settings rules. The determining step 3904 can include activating the automatic controls 3818 to detect or measure one or more variables of a type that may constitute a triggering condition for a triggered video quality settings action. In other embodiments, one or more of the automatic controls 3818 are continuously active by default whenever the context-controlled video quality software application or module is running. The automatic controls 3818 may thus continuously and/or periodically transmit data to the microprocessor 3810 of a type(s) that can constitute a triggering condition (s), rather than only in response to the step 3902 of receiving the record-start user input. In such cases, the step 3904 can include simply checking for data stored in the storage 3808, which has already been updated according to current input from the automatic controls 3818, and which indicates the presence or absence of a triggering condition. The method 3900 as illustrated in FIG. 39 includes a step 3916 of monitoring (for example, continuously) conditions of types that may trigger a video quality settings action (e.g., time, geolocation, environmental conditions). In embodiments, the determining step 3904 is performed in response to a change in a condition monitored in the monitoring step 3916, and if a video quality settings action is triggered, the video camera system performs the video quality settings action, including prompting for a settings adjustment in the step 3906 and/or executing the adjustment in a step 3908 when applicable, but not proceeding to the video recording step 3910 unless a recording has first been initiated in the step 3902.

If a triggering condition is determined to exist in the step 3904, the video camera system performs the corresponding triggered action in steps 3906 and/or 3908 as follows, then proceeding to record video in a step 3910. As mentioned previously, the triggered action can be an automatic settings adjustment or a settings adjustment prompt. If the triggered action is a settings adjustment prompt, then the video recording system prompts a user (such as by displaying on a touch screen the message, "Based on your location, it looks like you are about to record a sports video. Apply sports video recording settings, yes/no?" with corresponding "Yes" and "No" buttons) and receives a user input choice whether to adjust video quality settings in the step 3906, and when the user chooses to adjust the settings, proceeds to execute the settings adjustment in the step 3908 and then to record video in the step 3910. When a user chooses not to adjust the settings, the video recording system bypasses the settings adjustment step 3908 and proceeds directly to the video recording step 3910. As described above, the step 3913 of determining whether a rules update has been triggered is also performed in response to the user's negative response to the settings adjustment prompt. In embodiments, the rules update determining step 3913 can either be performed simultaneously with the video recording step 3910 or be deferred until the completion of the step 3910.

Figure 40:
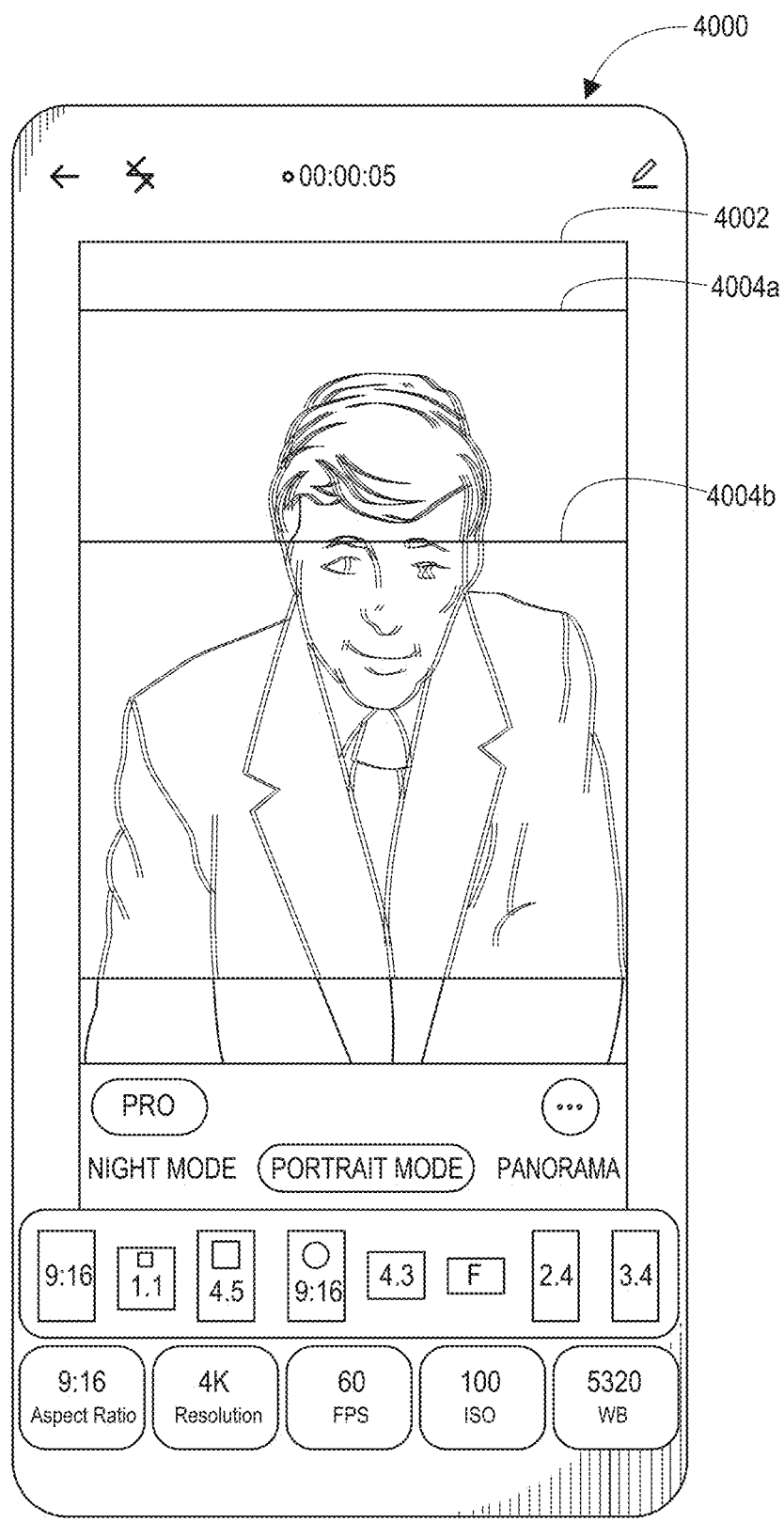
FIG. 40 is a screenshot of a video recording system that allows a user to display export boxes corresponding to portions of the video frame that will be exported to video files with different aspect ratios.

In another aspect, the present disclosure provides an application program running on a video camera system, such as the video camera system 3800, that allows a user to generate video files in a plurality of formats from a single video recording. A user interface screenshot 4000 of a video camera system according to this embodiment is shown in FIG. 40. The screenshot 4000 comprises a digital viewfinder display area 4002, in which a still frame of a video recording in progress is displayed. A plurality of export boxes 4004a, 4004b of different dimensions appear in the digital viewfinder display area 4002, the export boxes 4004a, 4004b circumscribing different portions of a video frame displayed in the digital viewfinder display area 4002, thereby indicating to a user the designation of those portions to be exported to a plurality of video files having a plurality of different aspect ratios, the aspect ratios being illustrated as 9:16 and 1:1 (square), respectively. Although two export boxes 4004a, 4004b are shown in the drawing figure, the application program may permit any number of export boxes to be displayed simultaneously during recording, corresponding to the simultaneous designation of as many different portions of the video frame, from which the frames of as many different video files are to be exported. In embodiments, the different video files are thus queued to be exported automatically, or a user prompt to confirm them to be exported is automatically generated, when a video recording is completed. In other embodiments, the different video files are created and continuously updated while the recording is in progress.

The plurality of export boxes 4004a, 4004b are displayed in a corresponding plurality of colors that are distinguishable from one another by a person of ordinary, unaided vision, as well as being labeled with indicia appearing in the corresponding colors, the indicia including standard numeric expressions of the corresponding aspect ratios (written, e.g., as "9:16" or "9×16"). Optionally, in addition to an expression of an aspect ratio, the indicia can further comprise one or more symbols identifying something else about a corresponding video file to be created. For example, as shown in the drawing, the indicia further comprise trademark symbols of companies to whose platforms the video files are intended to be exported and or set to be automatically exported. Thus, the 9:16 portion of the digital viewfinder display area 4002, circumscribed by the export box 4004a, may automatically be exported to a video file having a 9:16 aspect ratio upon completion of the video recording, to be uploaded to the TikTok® platform, the indicia comprising TikTok's logo. The application may be adapted and configured so that uploading the exported video file to a linked user account or profile on the corresponding platform can also be set to occur automatically, or to be initiated manually in a simplified manner, such as by a one-click or one-touch user input control (not shown). In embodiments, the one-touch or one-click control can be displayed in the same view in which a user can watch the video file to be uploaded and/or in the same view in which a user can select one or more video files to be uploaded, such as by touching or clicking an area of the application interface corresponding to a displayed filename of, and/or a thumbnail image extracted from, each video file.

As shown in FIG. 40, the export boxes 4004a, 4004b span a dimension, and more particularly a width dimension, of the digital viewfinder display area 4002. It will be understood that this permits the largest possible contiguous portion of the full video recording frame to be included in an exported video frame having the aspect ratio of the respective export box, while filling the entire exported video frame.

However, in embodiments, the application is programmed to cause a displayed export box to move, contract, and/or expand in response to manual user inputs, such as dragging, converging, or diverging touch screen inputs. For example, a user thus moving the export box partially outside the digital viewfinder display 4002 can result in each frame of the corresponding video file to be exported having an "empty" region, which may be "dark" or filled by a border (e.g., a solid color band or pattern). A user can thus "zoom out" by expanding the export box, albeit without enlarging the actual physical area recorded by the device camera, so that up to the full video recording frame can be included within the corresponding exported video frame, but scaled down to fit the exported frame, again with one or more empty margin bands. Conversely, a user can thus likewise "zoom in" by contracting the export box, albeit again without changing the actual physical area captured by the device camera, and consequently, without capturing detail at any higher resolution than that appearing in the corresponding portion of the full video recording frame. In an embodiment, a user can thus move export boxes so as to focus on different subjects within a recorded scene for exporting to different files, which may, for example, feature different members of an orchestra or choir in video files exported from the same master recording. It will be understood that, for that purpose, the application preferably permits even multiple export boxes of the same aspect ratio to be displayed simultaneously. In more particular embodiments, by moving, expanding, and/or contracting an export box while the recording is in progress, a user can thus dynamically alter the portion of each still frame image captured in the full video recording frame that will be exported to a frame of the corresponding video file, so as to simulate camera movements, as well as zooming in and out.

In embodiments, it will be understood that features of the video camera system 3800 and/or the corresponding software application can be combined into a single video camera system or software application with those of the video camera system 100 and/or its corresponding software application.

According to another aspect of the disclosure, a video camera system, such as the video camera system 100 or 3800, includes an auto-transition feature as follows. Illustrated schematically in FIG. 41 is a method 4100 according to this aspect. The method 4100 uses a camera-equipped device 4102, such as a smartphone or other mobile personal device with a camera component, running a software application. According to the method 4100, the camera-equipped device 4102 first receives a user input to pause or stop a video recording in progress. In response to the user input, the device terminates a first video clip VC1 of a main video recording stream VR in progress, so that the first video clip VC1 ends at a first time index $t_1$ with a terminal frame image 4104, such as a scene with children playing at a birthday party, which is displayed in a digital viewfinder/display frame 4106 when the user activates either a pause control 4108 or a stop control 4110. It will be understood that the pause control 4108 may be analogous to the special pause control 3202 of a previously described embodiment of the video recording system 2600, such that activating the pause control 4108 a first time creates a new physical file containing the first video clip VC1 of the video recording VR.

Subsequently, the device 4102 receives user input to resume recording video to follow the first video clip VC1, such as by the user activating the pause control 4108 again to resume recording, or by the user activating a record/continue recording control 4112. In the case of a resumption activation of the pause control 4108, the device 4102 responds by starting to record a second video clip VC2 beginning at a time index $t_2$. In the case of the user activating the record/continue recording control 4112, the device 4102 may respond by newly creating the main video recording stream VR out of an existing video file that the user had opened, selected, or otherwise designated when activating the record/continue recording control 4112, such that the newly created video recording stream VR begins with a newly defined video clip VC1 comprising the video content of the existing video file, the first time index $t_1$ being the time duration of the existing video file, and starting to record the second video clip VC2 beginning at the time index $t_2$ of the newly created video recording stream VR.

The second video clip VC2 begins with an initial frame image 4114 that is captured and displayed in the digital viewfinder/display frame 4106 when the user presses the record/continue recording control 4112. The initial frame image 4114 is an image that is different from, though perhaps related to, the terminal frame image 4104 of the first video clip VC1, such as a scene of the birthday boy or girl later blowing out a birthday candle at the same birthday party. Therefore, to present a smooth transition between the differing frame images 4104 and 4114 when replaying a main video file VF created from the main video recording stream VR, a transition video clip T of time duration $\Delta t = t_2 - t_1$ is inserted into the main video recording stream VR between the first video clip VC1 and the second video clip VC2. Typically, the transition video clip T can be a still image 4116 that is displayed for the entire time period between the first time index $t_1$ and the second time index $t_2$ when replaying the main video file VF. For example, the still image 4116 may be a solid color fill or pattern, or in some cases a selected stock image that fits a common theme of the main video file VF, such as an image of balloons and confetti for the illustrated example of a video file VF comprising video clips VC1 and VC2 captured at a child's birthday party. In embodiments, a transition video clip can be inserted between successive video clips in this manner, either as an automatic response to a user input to continue a paused recording (or to build a new recording out of an existing file, the existing file constituting a first video clip of the new recording), or as a response to a user selection, such as a user input prompted for (not shown) when a main video recording stream is ended and a main video file is to be created from the main video recording stream.

Although the process-flow diagrams show a specific order of executing the process steps, the order of executing the steps may be changed relative to the order shown in certain embodiments. Also, two or more blocks shown in succession may be executed concurrently or with partial concurrence in some embodiments. Certain steps may also be omitted from the process-flow diagrams for the sake of brevity. In some embodiments, some or all the process steps shown in the process-flow diagrams can be combined into a single process.

Throughout this disclosure, streams and clips are generally described as audio-video streams and clips. However, it should be understood that the principles described herein can be applied to streams and clips of purely audio or purely video.

In the preceding description of various examples of embodiments of the disclosed systems and methods, reference is made to the accompanying drawings, which form a part hereof, and in which are shown by way of illustration various example devices, systems, and environments in which aspects of the disclosed system and method can be practiced. Other specific arrangements of parts, example devices, systems, and environments, can be used, and structural modifications and functional modifications can be made without departing from the scope of the disclosed system and method.

The preceding description of the disclosure has been presented for purposes of illustration and description and is not intended to be exhaustive or to limit the disclosure to the precise form disclosed. The description was selected to best explain the principles of the present teachings and the practical application of these principles to enable others skilled in the art to best utilize the disclosure in various embodiments and various modifications as are suited to the particular use contemplated. It should be recognized that the words "a" or "an" are intended to include both the singular and the plural. Conversely, any reference to plural elements shall, where appropriate, include the singular.

It is intended that the scope of the disclosure not be limited by the specification but be defined by the claim(s) set forth below. In addition, although narrow claims may be presented below, it should be recognized that the scope of this disclosure is much broader than presented by the claim(s). It is intended that broader claims will be submitted in one or more applications that claim the benefit of priority from this application. Insofar as the description above and the accompanying drawings disclose additional subject matter that is not within the scope of the claim or claims below, the additional disclosures are not dedicated to the public and the right to file one or more applications to claim such additional disclosures is reserved.

What is claimed is:

1. A video recording system comprising:
a camera device including a lens and an image sensor, the image sensor being optically coupled to the lens;
a video processor, the video processor being operatively coupled to the camera device image sensor;
a storage comprising a non-volatile storage medium storing a software application;
an input control component adapted and configured to detect user input; and
a processor, the processor being operatively coupled to the camera device, the storage, and the input control component;
the camera device image sensor being operative, when activated, to produce a stream of digital video data from light passing through the lens and onto the image sensor, and the video processor being operative to process the recording stream of digital video data to produce digital video frame data;
the software application comprising instructions for the processor to:
activate the image sensor upon activation of a record control;
activate the record control in response to the input control component detecting user input corresponding to the record control;
write the recording stream of digital video data to the storage to create a video file in the storage;
read a plurality of video quality settings rules from the storage, each video quality settings rule having a triggering condition and a video quality settings action, the video quality settings rule instructing the processor to perform the video quality settings action in response to the triggering condition;
for each video quality settings rule, determine when the triggering condition exists, and in response to the triggering condition, perform the video quality settings action;
wherein the video quality settings action comprises one of an automatic settings adjustment routine and a prompted settings adjustment routine;
wherein the automatic settings adjustment routine comprises automatically performing an adjustment of one or more video quality settings according to the triggering condition, and the prompted settings adjustment routine comprises prompting a user to select whether to perform said adjustment, receiving a user input selection, and when the user input selection is to perform the adjustment, performing the adjustment in response to the user input selection; and
wherein the software application further comprises instructions for the processor to:
read meta-rules from the storage, each meta-rule having a rules update triggering condition and a rules updating action;
for each meta-rule, determine when the rules update triggering condition exists, and in response to the rules update triggering condition, perform the rules updating action;
wherein the rules updating action comprises one of an automatic rules updating routine and a prompted rules updating routine;
wherein the automatic rules updating routine comprises automatically performing a rules update according to the rules update triggering condition, the rules update comprising at least one of writing a new video quality settings rule to the storage and modifying an existing video quality settings rule in the storage, and the prompted rules updating routine comprising prompting a user to select whether to perform said rules update, receiving a user input selection, and when the user input selection is to perform the rules update, performing the rules update in response to the user input selection.

2. The video recording system of claim 1 wherein the rules update triggering condition of at least one of the meta-rules comprises the processor identifying a rules update triggering pattern of user activity, the software application further including instructions for the processor to:
- monitor user activity affecting at least one video file in the storage;
- write a user activity log of the monitored user activity to the storage;
- identify the rules update triggering pattern of user activity in the user activity log; and
- in response to identifying the rules update triggering pattern of user activity, perform the rules updating action of the corresponding meta-rule.

3. The video recording system of claim 2 wherein update triggering pattern of user activity comprises a user performing a monitored activity at least a predetermined number of times during a predetermined time period.

4. The video recording system of claim 1 wherein the rules update triggering condition comprises the processor receiving a user input selection not to perform the adjustment corresponding to the prompted settings adjustment routine of one of the video quality settings rules.

\* \* \* \* \*